United States Patent
Ishi et al.

(10) Patent No.: US 9,640,316 B2
(45) Date of Patent: May 2, 2017

(54) CONTACTLESS POWER TRANSFER SYSTEM, CONTACTLESS POWER TRANSFER DEVICE, CONTACTLESS POWER TRANSFER PROGRAM AND CONTACTLESS POWER TRANSFER METHOD

(75) Inventors: Tetsuya Ishi, Tsukuba (JP); Akio Shokaku, Tsukuba (JP); Koichiro Iwasa, Tokyo (JP); Masanori Nakamura, Takatsuki (JP)

(73) Assignee: Sekisui Chemical Co., Ltd., Osaka (JP)

( * ) Notice: Subject to any disclaimer, the term of this patent is extended or adjusted under 35 U.S.C. 154(b) by 718 days.

(21) Appl. No.: 14/123,867

(22) PCT Filed: Jun. 7, 2012

(86) PCT No.: PCT/JP2012/064683
§ 371 (c)(1),
(2), (4) Date: Dec. 4, 2013

(87) PCT Pub. No.: WO2012/169584
PCT Pub. Date: Dec. 13, 2012

(65) Prior Publication Data
US 2014/0175895 A1 Jun. 26, 2014

(30) Foreign Application Priority Data

Jun. 7, 2011 (JP) .................................. 2011-127257
Sep. 2, 2011 (JP) .................................. 2011-191694

(51) Int. Cl.
H02J 17/00 (2006.01)
H01F 38/14 (2006.01)
(Continued)

(52) U.S. Cl.
CPC .............. *H01F 38/14* (2013.01); *H02J 5/005* (2013.01); *H02J 7/025* (2013.01); *H02J 17/00* (2013.01)

(58) Field of Classification Search
CPC . H01F 38/14; H02J 5/005; H02J 7/025; H02J 17/00
(Continued)

(56) References Cited

U.S. PATENT DOCUMENTS 5,734,254 A * 3/1998 Stephens ................. H02J 7/025
320/106
8,285,502 B2 * 10/2012 Kenly ................ G01R 19/0092
702/108
(Continued)

FOREIGN PATENT DOCUMENTS

CN 101425703 5/2009
CN 101789636 7/2010
(Continued)

OTHER PUBLICATIONS

International Search Report issued Sep. 11, 2012 in International (PCT) Application No. PCT/JP2012/064683.
(Continued)

*Primary Examiner* — Jared Fureman
*Assistant Examiner* — Michael Warmflash
(74) *Attorney, Agent, or Firm* — Wenderoth, Lind & Ponack, L.L.P.

(57) ABSTRACT

A parent device power transmission unit determines a power to be supplied to a plurality of coils such that the power is proportional to an eigenvector of a real part of an impedance matrix which is based on a mutual inductance of the plurality of coils.

25 Claims, 25 Drawing Sheets

(51) Int. Cl.
*H02J 7/02* (2016.01)
*H02J 5/00* (2016.01)

(58) Field of Classification Search
USPC .......................................................... 307/104
See application file for complete search history.

(56) References Cited

U.S. PATENT DOCUMENTS

| | | | |
|---|---|---|---|
| 2003/0095115 A1* | 5/2003 | Brian .................... | G06F 3/0346 345/179 |
| 2005/0165297 A1 | 7/2005 | Anderson et al. | |
| 2005/0189910 A1 | 9/2005 | Hui | |
| 2007/0285109 A1 | 12/2007 | Niayesh et al. | |
| 2009/0284083 A1* | 11/2009 | Karalis .................... | H01Q 1/02 307/104 |
| 2010/0148589 A1* | 6/2010 | Hamam ............... | H04B 5/0037 307/104 |
| 2011/0018361 A1 | 1/2011 | Karalis et al. | |
| 2011/0130093 A1 | 6/2011 | Walley et al. | |
| 2012/0161543 A1* | 6/2012 | Reuven .................... | H04B 3/54 307/104 |
| 2012/0319498 A1* | 12/2012 | Silberberg ............. | H02J 5/005 307/104 |

FOREIGN PATENT DOCUMENTS

| | | |
|---|---|---|
| EP | 2 256 895 | 12/2010 |
| JP | 2008-283791 | 11/2008 |
| JP | 2011-517265 | 5/2011 |
| JP | 2012-75304 | 4/2012 |
| WO | 2008/030165 | 3/2008 |
| WO | 2009/122355 | 10/2009 |

OTHER PUBLICATIONS

Chinese Office Action issued Apr. 3, 2015 in corresponding Chinese Patent Application No. 201280026238.0. (English Translation).
Chinese Office Action issued Apr. 3, 2015 in Chinese Patent Application No. 201280026238.0, with English translation of the Search Report.
Supplementary European Search Report issued Apr. 20, 2015 in European Application No. 12797581.1.

* cited by examiner

| CURRENT RATIO | SWITCH TERMINAL | |
|---|---|---|
| 0 | S0 | — P1 |
| $0 < \gamma \leq 0.1$ | S1 | — P2 |
| . | | |
| . | | |
| . | | |
| $0.9 < \gamma \leq 1$ | S10 | — P10 |

CONTACTLESS POWER TRANSFER SYSTEM, CONTACTLESS POWER TRANSFER DEVICE, CONTACTLESS POWER TRANSFER PROGRAM AND CONTACTLESS POWER TRANSFER METHOD

TECHNICAL FIELD

The present invention relates to a contactless power transfer system, a contactless power transfer device, a contactless power transfer program and a contactless power transfer method.

BACKGROUND ART

In wireless power transfer, a contactless power transfer system using magnetic field resonance is known. A method for one-to-one power transfer between a transmission-side device (a parent device) and a reception-side device (a child device) is described in Patent Document 1. Further, in Patent Document 1, it is described that the child device transmits magnetic field or power information and positional information to the parent device using a communication means.

PRIOR ART DOCUMENTS

Patent Documents

Patent Document 1: Specification of US Patent Application Publication No. 2011/0018361
Patent Document 2: Japanese Unexamined Patent Application Publication No. 2012-75304
Patent Document 3: Japanese Unexamined Patent Application Publication (Translation of PCT Application) No. 2011-517265

DISCLOSURE OF INVENTION

Problem to be Solved by the Invention

Incidentally, a plurality of wireless home appliances (child devices) may be used in a room of a house or the like in which a plurality of parent devices are provided. In this case, efficiency of power transmission from the parent device to the child device may be degraded due to interference between a plurality of parent devices or between the parent device and the child device.

Further, in Patent Document 2, a coil resonance element is provided on a floor and a power transmission path for this coil resonance element is provided up to a position of the child device to transmit power to the child device.

However, in Patent Document 2, since a current flows through a coil resonance element on a power transmission path, an ohm loss is great and accordingly high efficiency energy cannot be transmitted.

Further, in Patent Document 3, it is disclosed that a current flows from a plurality of parent devices to a main coil, and a current flows in an opposite direction through at least one other coil to reduce a drifting magnetic field and strengthen a connection between the parent device and a child device.

However, in Patent Document 3, when a coil of the child device comes to a center of a grid of a base unit (a coil group of a parent device) in which four coils are arranged in a square grid shape, it is efficient to flow a current in the same direction through four coils, but efficiency decreases if the current flows in an opposite direction. Further, since it is necessary for a distance between the coil of the child device and the coil of the parent device to be equal to or less than ¼ of a diameter of the coil of the parent device, long-distance energy transmission is not possible. Further, since a universal algorithm for determining the current flowing through the coil is not disclosed in Patent Document 3, the current flowing through the coil cannot be determined efficiently. Further, in Patent Document 3, since control of an on state and an off state of 1 bit is performed, improvement of the efficiency is limited.

The present invention has been made in view of the aforementioned circumstances and provides a contactless power transfer system, a contactless power transfer device, a contactless power transfer program and a contactless power transfer method capable of improving power transmission efficiency.

Means to Solve the Problem

In addition, all contents which are mathematically equivalent to the following items are included in the scope.
(1) The present invention is made to solve the above-described problem, one aspect of the present invention is a contactless power transfer system including N parent device power transmission units (N is an integer equal to or more than 2), at least one child device power reception unit, and a distribution determination unit which determines an electrical signal to be supplied to the N parent device power transmission units, characterized in that the electrical signal has a current, a voltage or a linear combination amount of the current and the voltage as a component, in case that an N-dimensional vector having the electrical signal to be supplied to each parent device power transmission unit as a component is X, the distribution determination unit sets a matrix A as a regularized Hermitian matrix of N rows×N columns, and $$\tilde{X}^* A X \qquad (1)$$

in case that a scalar of Equation (1) (~ denotes a transposed matrix and * denotes a complex conjugate) is non-negative, a quadratic form matrix of the electrical signal in case that the child device power reception unit functions is a matrix B which expresses dissipation of energy and which is Hermite of N rows×N columns having a coefficient thereof as a component, a scalar of Equation (2) expresses energy consumption, $$\tilde{X}^* B X \qquad (2)$$

and the matrix A is expressed as shown in Equation (3), $$A = \tilde{C}^* C \qquad (3)$$

the distribution determination unit determines the electrical signal to be proportional to a component of a vector $C^{-1}Y$ obtained by multiplying a linear combination of an eigenvector Y for a non-zero eigenvalue of a matrix D expressed by Equation (4) by the matrix $C^{-1}$ from the left.

$$D = \tilde{C}^{*-1} B C^{-1} \qquad (4)$$

(2) In addition, one aspect of the present invention is the contactless power transfer system, characterized in that the matrix B is a matrix of a real part of an impedance matrix or a real part of an admittance matrix for a terminal of each parent device power transmission unit in case that the child device power reception unit functions, and the distribution determination unit determines the electrical signal to be supplied to the N parent device power transmission units based on a reference matrix which is a Hermitian matrix with definite positive values indicating a quadratic form of the electrical signal and the matrix B.

(3) In addition, one aspect of the present invention is the contactless power transfer system, characterized in that the distribution determination unit determines the electrical signal to be supplied to the N parent device power transmission units to be proportional to a component of the vector $C^{-1}Y$ calculated based on the eigenvector Y for a maximum eigenvalue of the matrix D or to be proportional to the component of the vector $C^{-1}Y$ calculated based on the eigenvector Y for a minimum eigenvalue of the matrix D.

(4) In addition, one aspect of the present invention is the contactless power transfer system, characterized in that the matrix A is a unit matrix.

(5) In addition, one aspect of the present invention is the contactless power transfer system, characterized in that the matrix A is a real part of the impedance matrix or a real part of the admittance matrix in case that there is no child device power reception unit.

(6) In addition, one aspect of the present invention is the contactless power transfer system, characterized in that the matrix A is one of an imaginary part of the impedance matrix, a real part of the capacitance matrix, and a real part of the inductance matrix of each parent device power transmission unit.

(7) In addition, one aspect of the present invention is the contactless power transfer system, characterized in that the scalar of Equation (1) of the quadratic form is a sum of energies of a field accumulated in a space of a specific area.

(8) In addition, one aspect of the present invention is the contactless power transfer system, characterized in that the distribution determination unit determines the electrical signal to be supplied to the N parent device power transmission units so that a current corresponding to a component having a maximum absolute value among components of the eigenvector is a current rating or so that a voltage corresponding to a component having a maximum absolute value among components of the eigenvector is a voltage rating.

(9) In addition, one aspect of the present invention is the contactless power transfer system, characterized in that the reference matrix is a real part of the impedance matrix or a real part of the admittance matrix in case that there is no child device power reception unit or a real part of the inductance matrix between the N parent device power transmission units, or an imaginary part of the impedance matrix between the parent device power transmission units or an imaginary part of the admittance matrix between the parent device power transmission units is a Hermitian coefficient matrix in case that energy induced to a specific area in a space is expressed in a quadratic form of the electrical signal.

(10) In addition, one aspect of the present invention is the contactless power transfer system, characterized in that the vector Y in the distribution determination unit determines the electrical signal to be supplied to the N parent device power transmission units to converge on the eigenvector of the matrix D.

(11) In addition, one aspect of the present invention is the contactless power transfer system, characterized in that the child device power reception unit has a power reception refusal mode to limit power transfer from the N parent device power transmission units.

(12) In addition, one aspect of the present invention is the contactless power transfer system, characterized in that the contactless power transfer system includes a control unit which limits the supplied electrical signal and outputs a resultant electrical signal to the parent device power transmission unit.

(13) In addition, one aspect of the present invention is the contactless power transfer system, characterized in that the control unit limits the electrical signal using an element whose energy dissipation is negligible in comparison with the energy of the electrical signal.

(14) In addition, one aspect of the present invention is the contactless power transfer system, characterized in that the parent device power transmission unit includes a power transmission unit, the child device power reception unit includes a power reception unit, each of the power transmission unit and the power reception unit includes an inductor, and magnetic field coupling is made by resonance based on the inductor of the power transmission unit and the inductor of the power reception unit.

(15) In addition, one aspect of the present invention is the contactless power transfer system, characterized in that the parent device power transmission unit includes a power transmission unit, the child device power reception unit includes a power reception unit, each of the power transmission unit and the power reception unit includes a capacitor, and capacitive coupling is made by resonance based on the capacitor of the power transmission unit and the capacitor of the power reception unit.

(16) In addition, one aspect of the present invention is the contactless power transfer system, characterized in that the control unit includes a plurality of capacitors and a plurality of switching units, the plurality of capacitors includes one terminals connected to one another, and other terminals connected to input terminals of the respective switching units, output terminals of the plurality of switching units are connected to one another, and a connection point thereof is connected to a coil, and the distribution determination unit determines distribution of the electrical signal to be supplied to the N parent device power transmission units, based on information indicating a voltage applied to the coil in case that the switching units are sequentially switched and information indicating a current flowing through the capacitor.

(17) In addition, one aspect of the present invention is the contactless power transfer system, characterized in that the control unit includes: a plurality of capacitors; and a plurality of switching units each including first to third ports and including a port switching switch which switches a connection between the first or second port with the third port among first to third ports, in the plurality of switching units, the first ports are connected to one another, a first connection point thereof is connected to a power supply unit, the second ports are connected to one another, each second port is grounded, and the third port is connected to one terminal of one of the plurality of capacitors, in the plurality of capacitors, the other terminals are connected to one another, and a second connection point thereof is connected to a coil, and the switching unit determines distribution of the electrical signal to be supplied to the N parent device power transmission units based on information indicating a current flowing through the second connection point in case that the switching units are sequentially switched and information indicating a voltage applied to a coil.

(18) In addition, one aspect of the present invention is the contactless power transfer system, characterized in that the electrical signal is supplied from a smaller number of power supplies than the number of parent device power transmission units.

(19) The present invention is made to solve the above-described problem, one aspect of the present invention is a contactless power transfer system including N parent device power transmission units (N is an integer equal to or more than 2), at least one child device power reception unit, and a distribution determination unit which determines an electrical signal to be supplied to the N parent device power transmission units, characterized in that the electrical signal has a current, a voltage or a linear combination amount of the current and the voltage as a component, and the distribution determination unit determines the electrical signal to be supplied to the N parent device power transmission units to be proportional to a component of an eigenvalue vector for a non-zero eigenvalue of a matrix B of a real part of an impedance matrix or a real part of an admittance matrix in case that there is the child device power reception unit.

(20) The present invention is made to solve the above-described problem, one aspect of the present invention is a contactless power transfer device including N parent device power transmission units (N is an integer equal to or more than 2), at least one child device power reception unit, and a distribution determination unit which determines an electrical signal to be supplied to the N parent device power transmission units, characterized in that the electrical signal has a current, a voltage or a linear combination amount of the current and the voltage as a component, in case that an N-dimensional vector of N rows×1 column having the electrical signal to be supplied to each parent device power transmission unit as a component is X, the distribution determination unit sets a matrix A as a regularized Hermitian matrix of N rows×N columns, and $$\tilde{X}^*AX \qquad (5)$$

in case that a scalar of Equation (5) (~ denotes a transposed matrix and * denotes a complex conjugate) is non-negative, a quadratic form matrix of the electrical signal in case that the child device power reception unit functions is a matrix B which expresses dissipation of energy and which is Hermite of N rows×N columns having a coefficient thereof as a component, a scalar of Equation (6) expresses energy consumption, $$\tilde{X}^*BX \qquad (6)$$

and the matrix A is expressed as shown in Equation (7), $$A=\tilde{C}^*C \qquad (7)$$

the distribution determination unit determines the electrical signal to be proportional to a component of a vector $C^{-1}Y$ obtained by multiplying a linear combination of an eigenvector Y for a non-zero eigenvalue of a matrix D expressed by Equation (8) by the matrix $C^{-1}$ from the left.

$$D=\tilde{C}^{*-1}BC^{-1} \qquad (8)$$

(21) The present invention is made to solve the above-described problem, one aspect of the present invention is a contactless power transfer device including N parent device power transmission units (N is an integer equal to or more than 2), at least one child device power reception unit, and a distribution determination unit which determines an electrical signal to be supplied to the N parent device power transmission units, characterized in that the electrical signal has a current, a voltage or a linear combination amount of the current and the voltage as a component, and the distribution determination unit determines the electrical signal to be supplied to the N parent device power transmission units to be proportional to a component of an eigenvalue vector for a non-zero eigenvalue of a matrix B of a real part of an impedance matrix or a real part of an admittance matrix in case that there is the child device power reception unit.

(22) The present invention is made to solve the above-described problem, one aspect of the present invention is a contactless power transfer program for causing a computer of a contactless power transfer device of a contactless power transfer system in which an electrical signal has a current, a voltage or a linear combination amount of the current and the voltage as a component and which includes N parent device power transmission units (N is an integer equal to or more than 2), at least one child device power reception unit, and a distribution determination unit which determines the electrical signal to be supplied to the N parent device power transmission units to execute a procedure in which: in case that an N-dimensional vector of N rows×1 column having the electrical signal to be supplied to each parent device power transmission unit as a component is X, the distribution determination unit sets a matrix A as a regularized Hermitian matrix of N rows×N columns, and $$\tilde{X}^*AX \qquad (9)$$

in case that a scalar of Equation (9) (~ denotes a transposed matrix and * denotes a complex conjugate) is non-negative, a quadratic form matrix of the electrical signal in case that the child device power reception unit functions is a matrix B which expresses dissipation of energy and which is Hermite of N rows×N columns having a coefficient thereof as a component, a scalar of Equation (10) expresses energy consumption, $$\tilde{X}^*BX \qquad (10)$$

and the matrix A is expressed as shown in Equation (11), $$A=\tilde{C}^*C \qquad (11)$$

the distribution determination unit determines the electrical signal to be proportional to a component of a vector $C^{-1}Y$ obtained by multiplying a linear combination of an eigenvector Y for a non-zero eigenvalue of a matrix D expressed by Equation (12) by the matrix $C^{-1}$ from the left.

$$D=\tilde{C}^{*-1}BC^{-1} \qquad (12)$$

(23) The present invention is made to solve the above-described problem, one aspect of the present invention is a contactless power transfer program for causing a computer of a contactless power transfer device of a contactless power transfer system in which an electrical signal has a current, a voltage or a linear combination amount of the current and the voltage as a component, and which includes N parent device power transmission units (N is an integer equal to or more than 2), at least one child device power reception unit, and a distribution determination unit which determines an electrical signal to be supplied to the N parent device power transmission units to execute a procedure in which: the distribution determination unit determines the electrical signal to be supplied to the N parent device power transmission units to be proportional to a component of an eigenvalue vector for a non-zero eigenvalue of a matrix B of a real part of an impedance matrix or a real part of an admittance matrix in case that there is the child device power reception unit.

(24) The present invention is made to solve the above-described problem, one aspect of the present invention is a contactless power transfer method in a contactless power transfer device of a contactless power transfer system in which an electrical signal has a current, a voltage or a linear combination amount of the current and the voltage as a component and which includes N parent device power transmission units (N is an integer equal to or more than 2), at least one child device power reception unit, and a distribution determination unit which determines an electrical signal to be supplied to the N parent device power transmission units, the contactless power transfer method including: a procedure in which, in case that an N-dimensional vector of N rows×1 column having the electrical signal to be supplied to each parent device power transmission unit as a component is X, the distribution determination unit sets a matrix A as a regularized Hermitian matrix of N rows×N columns, and $$\tilde{X}^*AX \quad (13)$$

in case that a scalar of Equation (13) (~ denotes a transposed matrix and * denotes a complex conjugate) is non-negative, a quadratic form matrix of the electrical signal in case that the child device power reception unit functions is a matrix B which expresses dissipation of energy and which is Hermite of N rows×N columns having a coefficient thereof as a component, a scalar of Equation (14) expresses energy consumption, $$\tilde{X}^*BX \quad (14)$$

and the matrix A is expressed as shown in Equation (15), $$A=\tilde{C}^*C \quad (15)$$

the distribution determination unit determines the electrical signal to be proportional to a component of a vector $C^{-1}Y$ obtained by multiplying a linear combination of an eigenvector Y for a non-zero eigenvalue of a matrix D expressed by Equation (16) by the matrix $C^{-1}$ from the left.

$$d=\tilde{C}^{*-1}BC^{-1} \quad (16)$$

(25) The present invention is made to solve the above-described problem, one aspect of the present invention is a contactless power transfer method in a contactless power transfer device of a contactless power transfer system in which an electrical signal has a current, a voltage or a linear combination amount of the current and the voltage as a component and which includes N parent device power transmission units (N is an integer equal to or more than 2), at least one child device power reception unit, and a distribution determination unit which determines the electrical signal to be supplied to the N parent device power transmission units, the contactless power transfer method including: a procedure in which the distribution determination unit determines the electrical signal to be supplied to the N parent device power transmission units to be proportional to a component of an eigenvalue vector for a non-zero eigenvalue of a matrix B of a real part of an impedance matrix or a real part of an admittance matrix in case that there is the child device power reception unit.

Effect of Invention

According to the present invention, it is possible to improve power transmission efficiency.

BEST MODE FOR CARRYING OUT THE INVENTION

First Embodiment

Hereinafter, embodiments of the present invention will be described in detail with reference to the drawings.

Figure 1:
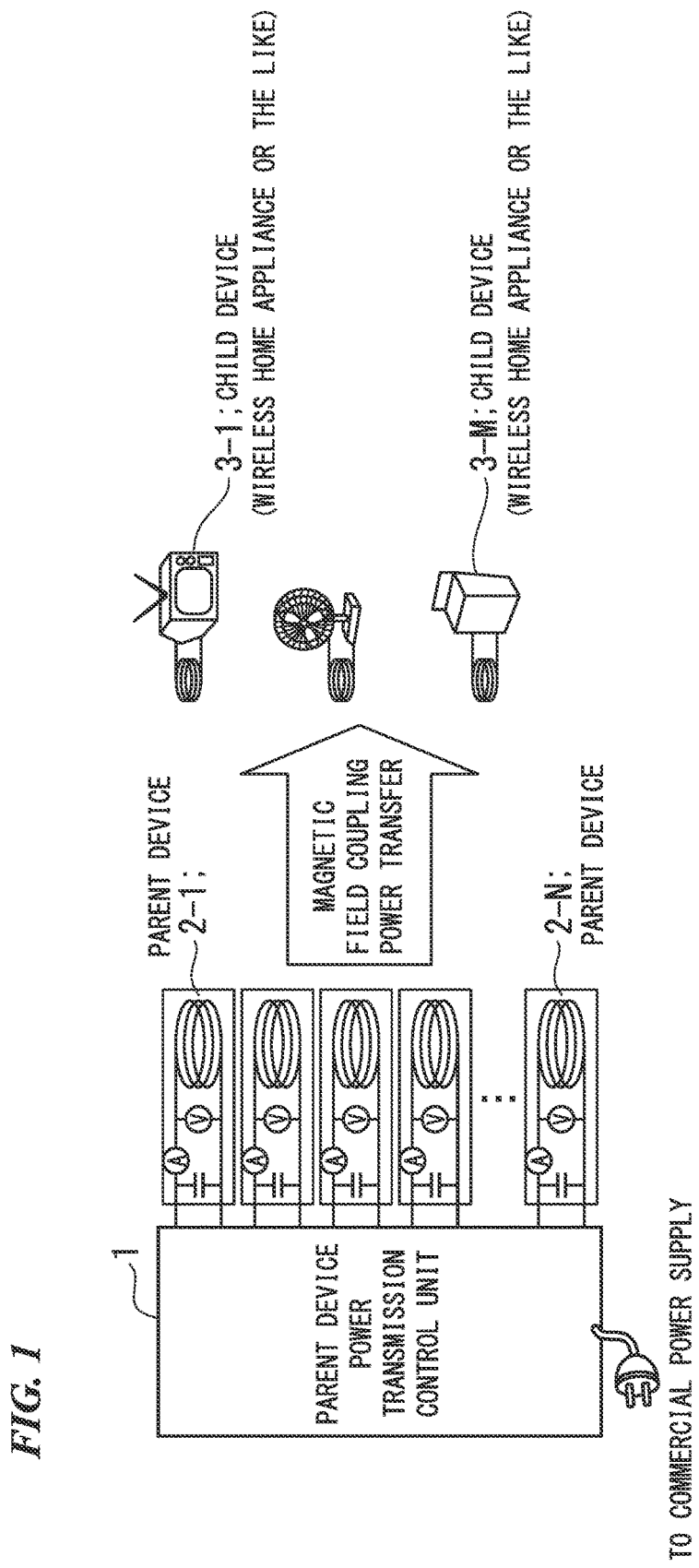
FIG. 1 is a schematic diagram illustrating a wireless power transfer system according to a first embodiment of the present invention.

FIG. 1 is a schematic diagram illustrating a wireless power transfer system according to a first embodiment of the present invention.

In FIG. 1, a wireless power transfer system includes a parent device power transmission control unit 1, N parent devices 2-1 to 2-N (each referred to as a parent device 2-$n$), and M child devices 3-1 to 3-M (each referred to as a child device 3-$m$).

The parent device power transmission control unit 1 controls a current to be supplied to the plurality of parent devices 2-$n$. Here, the parent device power transmission control unit 1 controls the current based on an eigenvector corresponding to an eigenvalue that is not "0" or "substantially 0" of a real impedance matrix Z including a real part of a matrix produced by a real part of an impedance (a value related to resistance) matrix between the parent devices in the presence of the child device. For example, the parent device power transmission control unit 1 controls the current based on the eigenvector in which an absolute value of the eigenvalue is equal to or more than 5% of an absolute value of a maximum eigenvalue (referred to as a maximum eigenvalue) among the eigenvalues of the real impedance matrix Z.

Accordingly, in the wireless power transfer system, it is possible to transfer power in consideration of effects of a mutual inductance among the plurality of parent devices 2-$n$ and improve efficiency of power transmission from the plurality of parent devices 2-$n$ to the child device 3-$m$.

The parent device 2-$n$ converts power (a current) into a magnetic field and generates the magnetic field toward a space according to control of the parent device power transmission control unit 1. The child device 3-$m$ converts energy of the magnetic field radiated by the plurality of parent devices 2-$n$ to power and receives the power. The child device 3-$m$ performs various operations using the received power.

<Parent Device 2-$n$ and Child Device 3-$m$>

Figure 2:
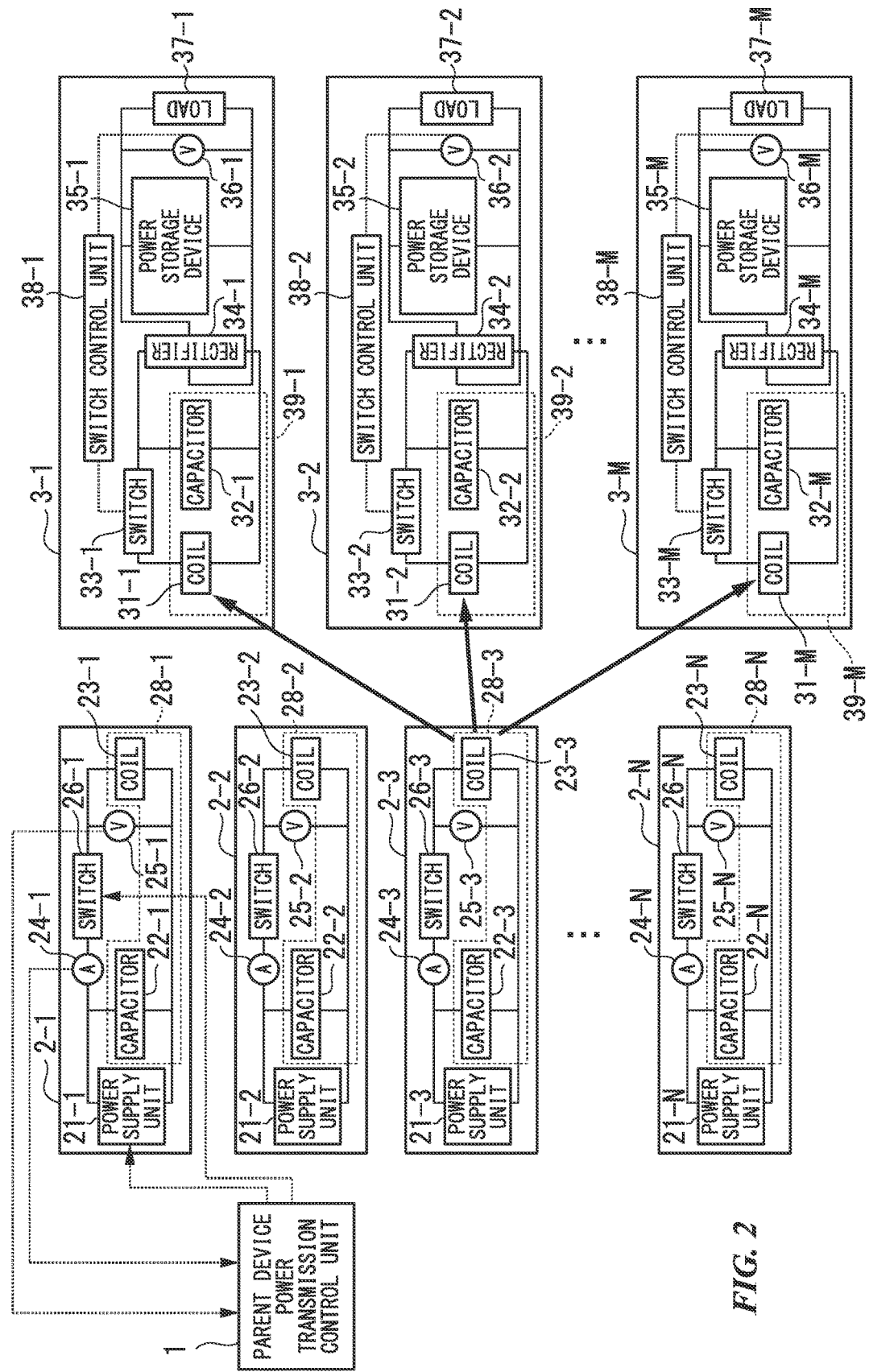
FIG. 2 is a schematic block diagram illustrating a configuration of a parent device and a child device according to the present embodiment.

FIG. 2 is a schematic block diagram illustrating a configuration of the parent device 2-$n$ and the child device 3-$m$ according to the present embodiment. In FIG. 2, the parent device 2-$n$ includes a power supply unit 21-$n$, an ammeter 24-$n$, a voltmeter 25-$n$, a switch 26-$n$ and a power transmission unit 28-$n$. The power transmission unit 28-$n$ includes a capacitor 22-$n$ and a coil 23-$n$. Further, in FIG. 2, signal lines indicate only a connection between the parent device power transmission control unit 1 and the parent device 2-1, but the signal lines are similarly connected to the parent device power transmission control unit 1 and the other parent device 2-$n$, and synchronization is made.

The power supply unit 21-$n$ supplies a current input from the parent device power transmission control unit 1 to a circuit of the parent device 2-$n$. Here, the current input from the parent device power transmission control unit 1 is a current whose amplitude is the same as a current ratio of a unique current vector and whose phase is set so that phases of currents flowing through the coils 23-$n$ of the respective parent devices 2-$n$ (i.e., phases of currents flowing through the ammeter 24-$n$) are the same, as will be described below. This is because it is necessary for the currents supplied to the coils 23-$n$ of the respective parent devices to match in not only a frequency but also the phase. The capacitor 22-$n$ is a passive element which accumulates charges using capacitance or rereleases the charges. The coil 23-$n$, for example, is a coil obtained by winding a conductive wire in a spiral form. The coil 23-$n$ is a passive electrical part which accumulates or rereleases energy using a magnetic field generated by the flowing current. The ammeter 24-$n$ is an instrument which measures a magnitude of a complex current and can measure a current amplitude and phase thereof at the same time. Further, the power supply unit 21-$n$ may be a connector which receives the current input from the parent device power transmission control unit 1.

The ammeter 24-$n$, for example, may output a real-time waveform of the current, like an analog-digital converter. In other words, the ammeter 24-$n$ is an instrument which measures the complex current and can measure the current amplitude and phase thereof at the same time. For example, the voltmeter 25-$n$ may output a real-time waveform of a voltage, like an analog-digital converter. The switch 26-$n$ performs opening or closing of the electric circuit. In other words, the voltmeter 25-$n$ is an instrument which measures a complex voltage and can measure a voltage amplitude and phase thereof at the same time. However, it is considered that a negative current is the same in phase and negative in amplitude.

In FIG. 2, one terminal of the power supply unit 21-$n$ is connected to one terminal of the capacitor 22-$n$ and connected to one terminal of the coil 23-$n$ via the ammeter 24-$n$ and the switch 26-$n$. One terminal of the capacitor 22-$n$ is connected to the one terminal of the power supply unit 21-$n$ and connected to the one terminal of the coil 23-$n$ via the ammeter 24-$n$ and the switch 26-$n$. One terminal of the voltmeter 25-$n$ is connected to the one terminal of the coil 23-$n$.

The other terminal of the power supply unit 21-$n$ is connected to the other terminal of the capacitor 22-$n$, the other terminal of the voltmeter 25-$n$ and the other terminal of the coil 23-$n$. The other terminal of the capacitor 22-$n$ is connected to the other terminal of the power supply unit 21-$n$ and the other terminal of the coil 23-$n$. The other terminal of the voltmeter 25-$n$ is connected to the other terminal of the coil 23-$n$.

The one terminal of the ammeter 24-$n$ is connected to the one terminal of the power supply unit 21-$n$ and the one terminal of the capacitor 22-$n$. The other terminal of the ammeter 24-$n$ is connected to the one terminal of the voltmeter 25-$n$ and the one terminal of the coil 23-$n$ via the switch 26-$n$.

In other words, the circuit of the parent device 2-$n$ is a resonant circuit in which the coil 23-$n$ and the capacitor 22-$n$ are connected in parallel. In the circuit of the parent device 2-$n$, a current flowing through the coil 23-$n$ is changed based on the current input from the power supply unit 21-$n$ such that a magnetic field is generated in the coil 23-$n$.

Further, the ammeter 24-$n$ measures the current flowing through the coil 23-$n$. The voltmeter 25-$n$ measures the voltage applied to the coil 23-$n$. When the switch 26-$n$ is opened, the switch 26-$n$ separates the coil 23-$n$ and the voltmeter 25-$n$ from the power supply unit 21-$n$, the capacitor 22-$n$, and the ammeter 24-$n$. Accordingly, the voltmeter 25-$n$ can measure the voltage (e.g., the magnitude $V_{ij}$ of the voltage which will be described below) generated in the coil 23-$n$ without being affected by the power supply unit 21-$n$ or the capacitor 22-$n$.

In FIG. 2, the child device 3-$m$ includes a switch 33-$m$, a rectifier 34-$m$, a power storage device 35-$m$, a voltmeter 36-$m$, a load 37-$m$, a switch control unit 38-$m$ and a power reception unit 39-$m$. The power reception unit 39-$m$ includes a coil 31-$m$ and a capacitor 32-$m$.

The coil 31-$m$ is a passive electrical part which accumulates or rereleases energy using a magnetic field formed due to the flowing current. The capacitor 32-$m$ is a passive element which accumulates or releases charges using a capacitance. The switch 33-$m$ performs opening or closing of the electric circuit. The rectifier 34-$m$ converts AC power into a DC current. The power storage device 35-$m$ is a storage element that can be repeatedly used by charging, and a power storage battery or a capacitor may be used.

Further, the power storage device (referred also to as a power storage battery) 35-$m$ included in each child device 3-$m$ may have a different storage capacity (capacitance). The voltmeter 36-$m$ is an instrument which measures the voltage. The load 37-$m$ consumes electric energy.

The switch control unit 38-$m$ performs opening or closing of the switch based on the voltage measured by the voltmeter 36-$m$. Specifically, the switch control unit 38-$m$ opens the switch 33-$m$ when the voltage measured by the voltmeter 36-$m$ is equal to or more than a previously determined threshold. On the other hand, the switch control unit 38-$m$ closes the switch 33-$m$ when the voltage measured by the voltmeter 36-$m$ is less than the previously determined threshold.

One terminal of the coil 31-$m$ is connected to one terminal of the capacitor 32-$m$ and one terminal of the input side of the rectifier 34-$m$ via the switch 33-$m$. The one terminal of the capacitor 32-$m$ is connected to the one terminal of the coil 31-$m$ via the switch 33-$m$, and is connected to the one terminal of the input side of the rectifier 34-$m$.

The other terminal of the coil 31-$m$ is connected to the other terminal of the capacitor 32-$m$ and the other terminal of the input side of the rectifier 34. The other terminal of the capacitor 32-$m$ is connected to the other terminal of the coil 31-$m$ and is connected to the other terminal of the input side of the rectifier 34-$m$.

One terminal of the output side of the rectifier 34-$m$ is connected to one terminal of the power storage battery 35-$m$, one terminal of the voltmeter 36-$m$ and one terminal of the load 37-$m$. The one terminal of the power storage battery 35-$m$ is connected to the one terminal of the output side of the rectifier 34-$m$, the one terminal of the voltmeter 36-$m$, and the one terminal of the load 37-$m$. The other terminal of the voltmeter 36-$m$ is connected to the other terminal of the output side of the rectifier 34-$m$, the other terminal of the power storage battery 35-$m$, and the other terminal of the load 37-$m$. The one terminal of the load 37-$m$ is connected to the one terminal of the rectifier 34-$m$, the one terminal of the power storage battery 35-$m$, and the one terminal of the voltmeter 36-$m$.

The other terminal of the output side of the rectifier 34-$m$ is connected to the other terminal of the power storage battery 35-$m$, the other terminal of the voltmeter 36-$m$, and the other terminal of the load 37-$m$. The other terminal of the power storage battery 35-$m$ is connected to the other terminal of the output side of the rectifier, the other terminal of the voltmeter 36-$m$, and the other terminal of the load 37-$m$. The other terminal of the voltmeter 36-$m$ is connected to the other terminal of the output side of the rectifier 34-$m$, the other terminal of the power storage battery 35-$m$, and the other terminal of the load 37-$m$. The other terminal of the load 37-$m$ is connected to the other terminal of the output side of the rectifier 34-$m$, the other terminal of the power storage battery 35-$m$, and the other terminal of the voltmeter 36-$m$.

The coil 31-$m$ constitutes a resonant circuit with the capacitor 32-$m$ and is resonant with the magnetic field generated by the coils 23-$n$ of the plurality of parent devices 2-$n$. Accordingly, an induced current is generated in the coil 31-$m$. The generated induced current (AC) is converted into a DC current by the rectifier 34-2. The converted DC current is accumulated in the power storage battery 35-$m$ or is supplied to the load 37-$m$. The power accumulated in the power storage battery 35-$m$ is supplied to the load 37-$m$.

<Parent Device Power Transmission Control Unit 1>

Figure 3:
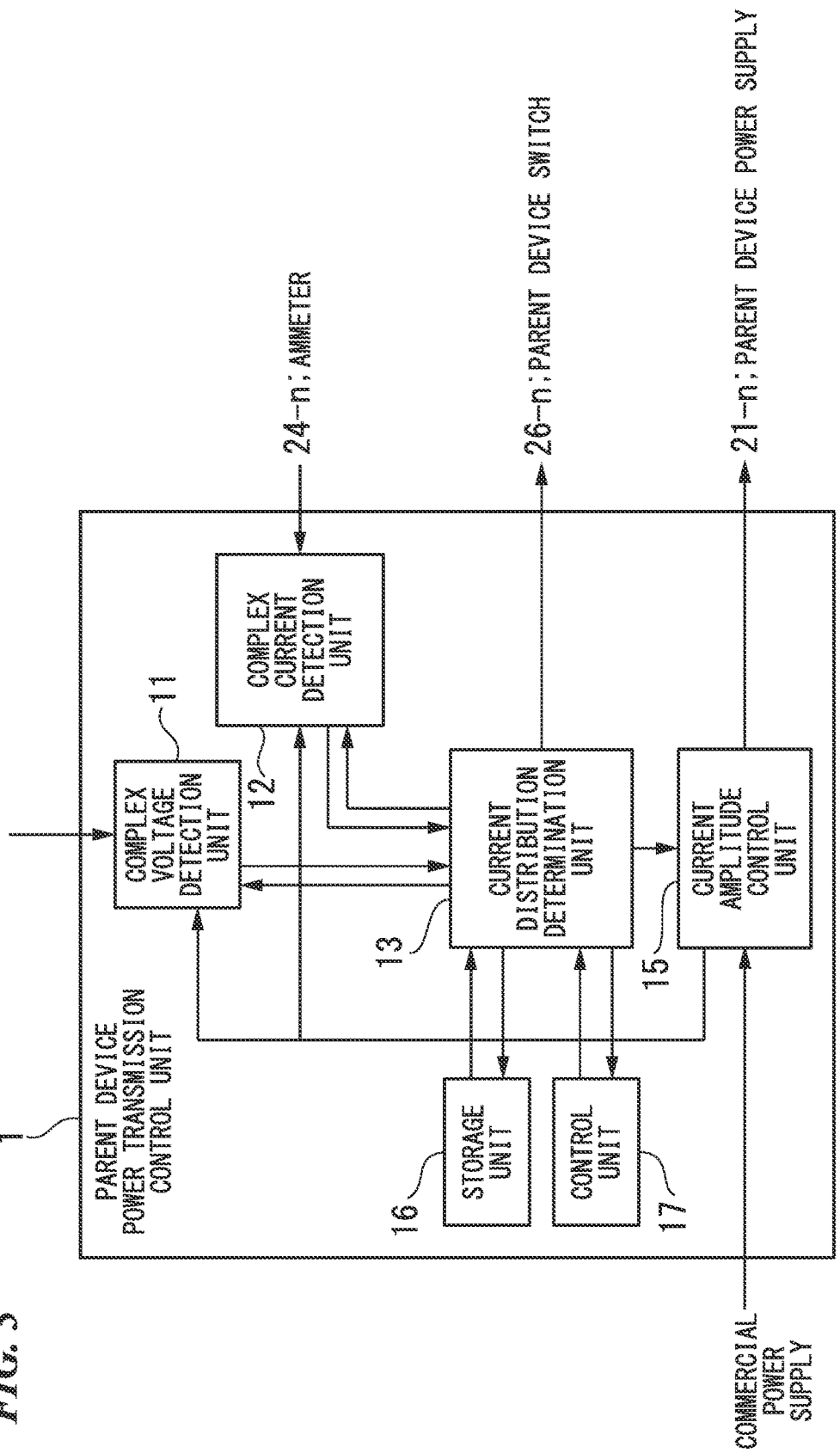
FIG. 3 is a schematic block diagram illustrating a configuration of a parent device power transmission control unit according to the present embodiment.

FIG. 3 is a block diagram illustrating a configuration of the parent device power transmission control unit 1 according to the present embodiment. In FIG. 3, the parent device power transmission control unit 1 includes a complex voltage detection unit 11, a complex current detection unit 12, a current distribution determination unit (a distribution determination unit) 13, a current amplitude control unit 15, a storage unit 16, and a control unit 17.

The complex voltage detection unit 11 receives voltage information indicating a voltage measured by the voltmeter 25-$n$ from each voltmeter 25-$n$ of the parent device 2-$n$. When the current is A cos ω$t$, the complex voltage detection unit 11 multiplies a voltage indicated by voltage information input from the voltmeter 25-$n$ by cos ω$t$ and sin ω$t$ at the same frequency as a frequency of the voltage, extracts a low frequency component or a DC component through a low pass filter, and sets them as a real component and an imaginary component. The complex voltage detection unit 11 outputs complex voltage information indicating the calculated amplitude and phase components of the voltage to the current distribution determination unit 13. When the voltage includes a single frequency component, the complex voltage detection unit 11 may set a voltage value when the current takes a positive maximum as a real component, and a voltage value at a time delayed by a ¼ period from this as an imaginary component. When the current includes a single frequency component, the complex current detection unit 12 may set a current value when the voltage takes a positive maximum value as a real component and a current value at a time delayed by ¼ period from this as an imaginary component.

The complex current detection unit 12 receives the current information indicating the current measured by the ammeter 24-$n$ from each ammeter 24-$n$. The complex current detection unit 12 multiplies the current indicated by the current information input from the ammeter 24-$n$ by cos ω$t$ and sin ω$t$ at the same frequency as a frequency of the current, extracts a low frequency component or a DC component through a low pass filter, and calculates an amplitude component and a phase component based on the extracted low frequency component or DC component. The complex current detection unit 12 outputs complex current information indicating the calculated amplitude and phase component of the current to the current distribution determination unit 13 and the current amplitude control unit 15.

When a conduction command for flowing the current is input from the control unit 17, the current distribution determination unit 13 outputs a switch switching signal to the switch 26-$n$ (1≤$n$≤N) to close only the switch 26-$j$ of one parent device 2-$j$ and open the switch 26-$n$ of the other parent device 2-$n$ ($n \neq j$). Here, the current distribution determination unit 13 outputs the switch switching signal sequentially from $j=1$ to $j=N$.

When the switch 26-$j$ is closed based on the switch switching signal, the current distribution determination unit 13 writes the information measured by the parent device 2-$i$ ($i=1$ to N) to the storage unit 16. Specifically, when the switch 26-$j$ is closed based on the switch switching signal, the current distribution determination unit 13 writes the complex voltage information (a magnitude of the voltage measured by the voltmeter 25-$i$ is indicated by $V_{ij}$) input from the complex voltage detection unit 11 and complex current information (indicated by a magnitude $I_{ij}$ of the current measured by the ammeter 24-$i$. In the present embodiment, $I_{ii}=I_0$) input from complex current detection unit 12 to the storage unit 16.

After outputting the switch switching signal, the current distribution determination unit 13 reads the complex voltage information and the complex current information from the storage unit 16, and determines a current ratio to be supplied to each of a plurality of parent devices 2-$n$ based on the read information (referred to as current determination process). The current distribution determination unit 13 outputs the information indicating the determined current ratio to the current amplitude control unit 15. Further, after the current determination process ends, the current distribution determination unit 13 outputs a switch switching signal to the switches 26-$n$ to close all the switches 26-$n$.

The current amplitude control unit 15 receives power from a commercial power supply. The current amplitude control unit 15 assigns a current supplied from a commercial power supply to the parent device 2-$n$ based on the current ratio indicated by the information input from the current distribution determination unit 13. The current amplitude control unit 15 supplies the assigned current (electrical signal) to the power supply unit 21-$n$ of the parent device 2-$n$. Further, the current amplitude control unit 15 controls a current to be supplied to the power supply unit 21-$n$ so that the phases of currents flowing through the respective coil 23-$n$ (i.e., the ammeter 24-$n$) are the same based on the complex current information calculated by the complex current detection unit 12. However, the amplitude of the current also includes the negative amplitude. Further, the same phases of the currents include 0 degrees or 180 degrees. Further, the current amplitude control unit 15 may output a signal for controlling the amplitude and phase of the current flowing through the coil 23-$n$ to the power supply unit 21-$n$. The power supply unit 21-$n$ may control an amplitude and phase of an output current based on the input signal for controlling the amplitude and phase of the current. Further, the current amplitude control unit 15 may assign the current so that a sum of the currents to be supplied to the parent devices 2-$n$ does not exceed a rating current of the commercial power supply. Further, the current amplitude control unit 15 may assign the current so that a sum of squares of the currents to be supplied to the parent devices 2-$n$ does not exceed an allowable loss of an antenna. Further, the current amplitude control unit 15 may assign the current so that a maximum current among the currents to supply to the respective parent devices 2-$n$ does not exceed a rating current of the parent device. Further, the electrical signal in the present invention may be a voltage or a linear combination amount of a current and the voltage.

The control unit 17 outputs an update command to the current distribution determination unit 13 at the time of the start-up of the wireless power transfer system or regularly.

Figure 4A:
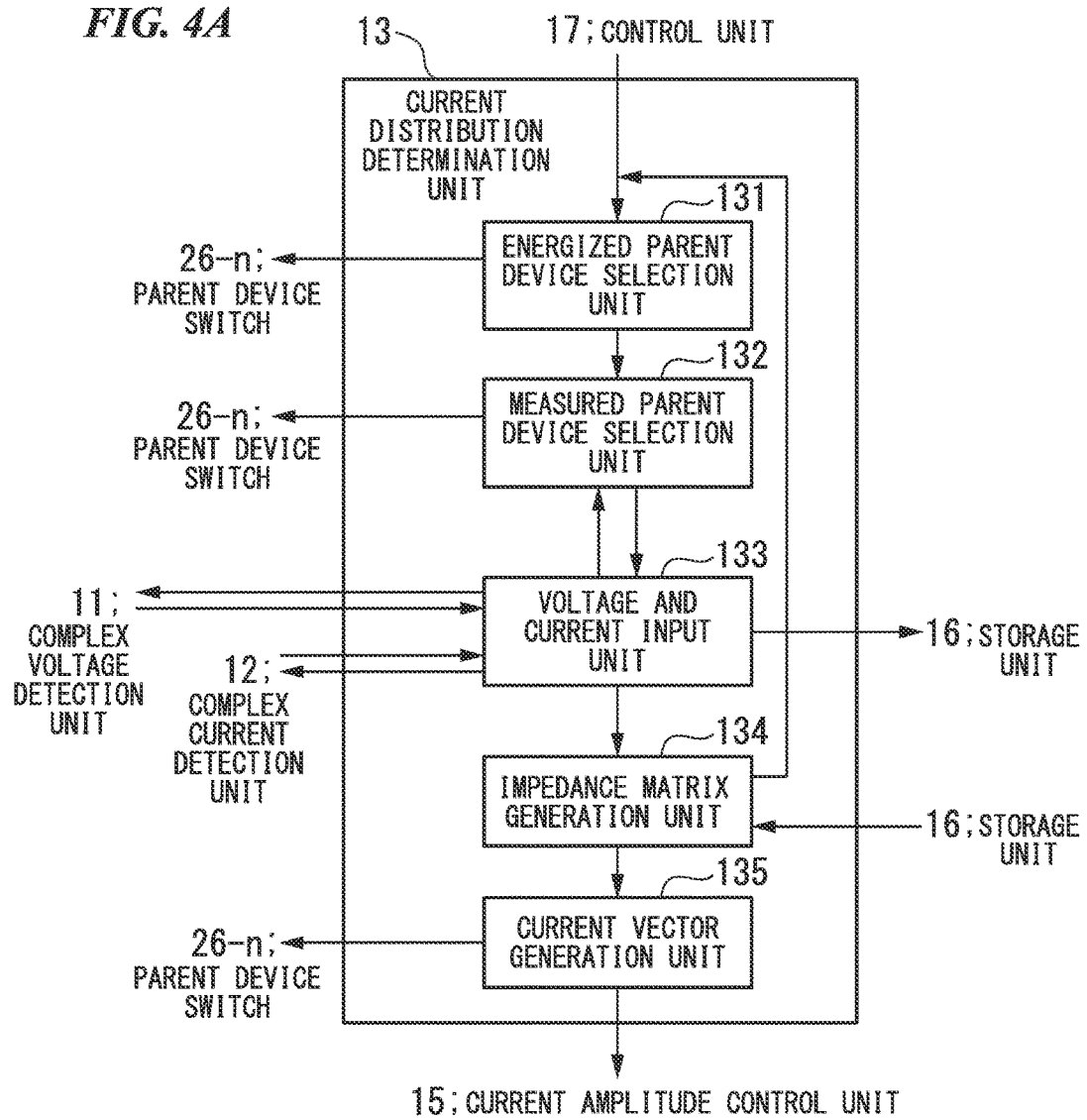
FIG. 4A is a schematic block diagram illustrating a configuration of a current distribution determination unit according to the present embodiment.

FIG. 4A is a block diagram illustrating a configuration of the current distribution determination unit 13 according to the present embodiment. In FIG. 4A, the current distribution determination unit 13 includes an energized parent device selection unit 131, a measured parent device selection unit 132, a voltage and current input unit 133, an impedance matrix generation unit 134, and a current vector generation unit 135.

The energized parent device selection unit 131 selects one parent device 2-$j$ and outputs a switch switching signal to the switch 26-$j$ to close only the switch 26-$j$ of the selected parent device 2-$j$. While closing only the switch 26-$j$, the energized parent device selection unit 131 supplies a current (a magnitude of the current in the ammeter 24-$j$ is $I_0$ and an angular frequency is $\omega_0$) whose current value is known to the parent device 2-$j$.

While the switch 26-$j$ of the parent device 2-$j$ is closed, the measured parent device selection unit 132 sequentially selects the parent device 2-$i$ ($1 \leq i \leq N$).

The voltage and current input unit 133 writes, to the storage unit 16, the complex current information (a magnitude $V_{ij}$ of the voltage) input from the complex voltage detection unit 11 and the complex voltage information (a magnitude $I_{ij}$ of the current) input from the complex current detection unit 12 for the parent device 2-$i$ selected by the energized parent device selection unit 131.

The impedance matrix generation unit 134 generates an impedance matrix Z (a circuit matrix which includes a value related to resistance and whose real part of a component indicates dissipation of energy) based on the magnitude $V_{ij}$ of the voltage indicated by the complex voltage information stored in the storage unit 16. Specifically, the impedance matrix generation unit 134 generates an i row and j column component $Z_{ij}$ of the impedance matrix Z using Equation (17) below.

$$Z_{ij} = \frac{V_{ij}}{I_0} \qquad (17)$$

The impedance matrix generation unit 134 outputs impedance information indicating the generated impedance matrix Z to the current vector generation unit 135.

The current vector generation unit 135 calculates an eigenvalue and an eigenvector (referred to as a current vector I; an $i^{th}$ component is indicated by $I_i$) corresponding thereto for a matrix (a real impedance matrix) produced by a real component of the impedance matrix Z indicated by the impedance information. In other words, the current vector generation unit 135 calculates an eigenvector of the impedance matrix Z and determines power to be supplied to a plurality of parent devices 2-$n$ based on the eigenvector.

Specifically, the current vector generation unit 135 calculates the current vector I expressed by Equation (18) below. Further, the current vector I is a real vector.

$$Re(Z)I = \lambda I \qquad (18)$$

The current vector generation unit 135 calculates the current vector I from a transformation matrix obtained at the same time by solving a secular equation of an eigenvalue problem expressed by Equation (18). Further, the current vector generation unit 135 calculates the current vector I using an LR decomposition method, but the present invention is not limited thereto and the current vector generation unit 135 may calculate the current vector I using a known scheme such as a QR decomposition method. In other words, the current vector generation unit 135 determines a current to be supplied to the plurality of parent devices 2-*n* (the coils 23-*n*) to be proportional to the eigenvector of the real component of the impedance matrix Z.

The current vector generation unit 135 selects the current vector I when the eigenvalue for the current vector I becomes a maximum value (referred to also as a maximum eigenvalue) from among the calculated current vectors I. In other words, the current vector generation unit 135 determines the power to be supplied to the plurality of coils 23-*n* so that the eigenvalue for the current vector I is maximized.

The current vector generation unit 135 divides the selected current vector I by an absolute value |I| of I, and determines $I_i/|I|$ which is an i component after the division as a ratio (a current ratio) of the current to be supplied to the parent device 2-*i*. In other words, the current vector generation unit 135 determines the current ratio for supply to each of the plurality of parent devices 2-*n*. Further, the current ratio also includes a –(negative) value.

The current vector generation unit 135 outputs information indicating the determined current ratio to the current amplitude control unit 15. The current vector generation unit 135 outputs a switch switching signal to the switches 26-*n* to close all the switches 26-*n*. Further, since Re(Z) in Equation (18) is real symmetric, the eigenvalue λ also becomes a real number. Further, since all components of the corresponding eigenvector become real numbers, the current ratio becomes a drive control signal for driving the current and the voltage in the same phase. (Further, the phases of currents from the power supply units 21-*n* are not the same.)

<Operational Effects>

Hereinafter, operational effects when the current at the current ratio determined by the current vector generation unit 135 is supplied to the parent device 2-*n* will be described.

(Inductance Matrix and Impedance Matrix)

There are a total of N coils 23-1 to 23-N in the parent devices 2-1 to 2-N and a total of M coils 31-1 to 31-M in the child devices 3-1 to 3-M. Each of the coils 23-1 to 23-N and 31-1 to 31-M has a self-inductance. There is a mutual inductance between the respective coils. When this is written in the form of an (N+M)×(N+M) inductance matrix L, Equation (19) is obtained.

$$L = \begin{pmatrix} L_0 & l_{01} & \cdots & l_{0M}, \\ l_{10} & 1_1 & & 0 \\ \vdots & & \ddots & \vdots \\ l_{M0} & 0 & \cdots & 1_M \end{pmatrix} \quad (19)$$

Here, the vector $l_{0m}$ is an (N×1) matrix and is a mutual inductance with the coil 23-*n* of each parent device 2-*n* viewed from the coil 31-*m* of the child device 3-*m*. Further, the vector $l_{m0}$ is an (1×N) matrix and is a transposed matrix of $l_{0m}$. $l_m$ is a self-inductance of the coil 31-*m* of the child device 3-*m*. A mutual inductance between the child devices 3-*m* is on a power receiving side and is neglected since its value is small. Here, the matrix of $[l_{0m}, \ldots, l_{0M}]$ is referred to as $L_{PC}$. $L_{PC}$ is an (N×M) matrix. A matrix of $[l_{m0}, \ldots, l_{M0}]^T$ is referred to as $L_{CP}$. $L_{CP}$ is an (M×N) matrix, and is a mutual inductance with the coil 31-*m* of each child device 3-*m* viewed from the coil 23-*n* of the parent device 2-*n*. A matrix of $[1_1, \ldots, 0, \ldots, 0, \ldots, 1_m]$ is referred to as $L_{CC}$. $L_{CC}$ is an (M×M) matrix. The matrix of $L_0$ is referred to as $L_{PP}$. $L_{PP}$ is an (N×N) matrix and is a mutual inductance between the parent devices 2-*n*. $L_0$ is an inductance matrix of the parent device expressed as shown in Equation (20) below.

$$L_0 = \begin{pmatrix} L_1 & L_{12} & \cdots & L_{1N}, \\ L_{21} & L_2 & & \vdots \\ \vdots & & \ddots & \vdots \\ L_{N1} & & \cdots & L_N \end{pmatrix} \quad (20)$$

$L_i$ denotes a self-inductance of the coil 23-*i*, and $L_{ij}$ denotes a mutual inductance between the coil 23-*i* and the coil 23-*j*. Thus, in the wireless power transfer system according to the present embodiment, the inductance matrix L is an [N+M]×[N+M] dimensional matrix, as expressed in Equations (19) and (20). An impedance matrix indicating the impedance of each coil 23-*n* when a current at an angular frequency of flows through the parent device 2-*n* expressed by this inductance matrix is an N×N-dimensional matrix expressed as shown in Equation (21) below.

$$Z = j\omega L + \sum_m \omega^2 \frac{l_{m0} \tilde{l}_{0m}}{\zeta_m + j\omega l_m} \quad (21)$$

Here, j is an imaginary unit, ω denotes the angular frequency of the current flowing through the coil, and $\zeta_m$ denotes an impedance including a matching circuit of the child device 3-*m* viewed from the coil 31-*m* of the $n^{th}$ child device 3-*m*. Further, $l_m$ denotes a self-inductance of the $n^{th}$ child device, and the vector $l_{0m}$ denotes a mutual inductance with each parent device of the $m^{th}$ child device. In other words, the impedance matrix Z is based on the plurality of coils 23-*n*.

(Consumption Energy of Coil of Parent Device)

Then, energy consumed in the coil 23-*n* of the parent device 2-*n* is expressed by an expression using a current and an impedance matrix. The energy consumed in the coil 23-*n* of the parent device 2-*n* is a sum of energies transmitted to the child device by the magnetic field generated by a current flowing through the coil 23-*n* and an ohm loss due to resistance of the coil 23-*n*. Since the ohm loss is smaller than the energy transmitted to the child device by the magnetic field, the ohm loss is incorporated as perturbation in the impedance matrix Z. Energy P transmitted in all the coils 23-1 to 23-N is as shown in Equation (22).

$$\begin{aligned} P &= \frac{1}{2}(\tilde{I}^* V + \tilde{I} V^*) = \frac{1}{2}(\tilde{I}^* Z I + \tilde{I} Z^* I^*) \\ &= \frac{1}{2}\{[\text{Re}(\tilde{I}) - j\text{Im}(\tilde{I})][\text{Re}(Z) + j\text{Im}(Z)][\text{Re}(I) + j\text{Im}(I)] + \\ &\quad [\text{Re}(\tilde{I}) + j\text{Im}(\tilde{I})][\text{Re}(Z) - j\text{Im}(Z)][\text{Re}(I) - j\text{Im}(I)]\} \\ &= \text{Re}(\tilde{I})\text{Re}(Z)\text{Re}(I) + \text{Im}(\tilde{I})\text{Re}(Z)\text{Im}(I) \\ &= [\text{Re}(\tilde{I}), \text{Im}(\tilde{I})]\begin{bmatrix} \text{Re}(Z) & 0 \\ 0 & \text{Re}(Z) \end{bmatrix}\begin{pmatrix} \text{Re}(I) \\ \text{Im}(I) \end{pmatrix} \\ &= \tilde{I}^*[\text{Re}(Z)]I \end{aligned} \quad (22)$$

Therefore, a current vector (a current ratio flowing through the coil 23-*n* of each parent device) in which consumption energy (proportional to energy of the magnetic field) of the coils 23-1 to 23-N is maximized when P is maximized is given. In this case, since a loss, usually, is mainly an ohm loss of the coils 23-1 to 23-N of the parent device, a condition for constant loss is imposed when the coils are the same by imposing $|I|^2$=constant (standardization condition). Further, since Z is a symmetric matrix, ReZ becomes a real symmetric matrix.

Further, when the electrical signal to be supplied to the parent device 2-n is a voltage, the standardization condition is $|V|^2$=constant.

Figure 4B:
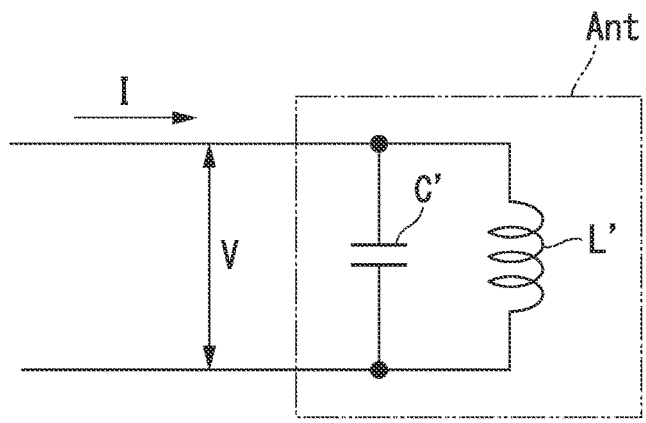
FIG. 4B is a diagram illustrating an equivalent circuit when a coil has a floating capacitance according to the present embodiment.

FIG. 4B is a diagram illustrating an equivalent circuit when the coil 23-n has a floating capacitance according to the present embodiment. In FIG. 4B, a coil L' is a coil having floating capacitance C', C' is a floating capacitance of the coil L', and Ant is an equivalent circuit of the antenna.

When the coil 23-n has floating capacitance as illustrated in FIG. 4B, a linear combination of a current I flowing through the equivalent circuit of the antenna in place of the current I flowing through the coil 23-n and the voltage V is expressed as shown in Equation (23) below.

$$I' = I - j\omega c'V \qquad (23)$$

In Equation (23), I' denotes a current flowing through a coil L' part of the equivalent circuit Ant of the antenna. Therefore, a current vector (a current ratio flowing through the coil 23-n of each parent device) in which consumption energy (proportional to the energy of the magnetic field) of the coils 23-1 to 23-N is maximized when P is maximized can be calculated by using this current-coupled current I' in place of I in the procedure described above.

(Calculation of Current Vector)

Under a condition of $|I|^2$=constant, obtaining the current vector I maximizing Equation (22) is mathematically equivalent to obtaining the current vector I having the maximum eigenvalue of a secular equation (24) shown below.

$$Re(Z)I = \lambda I \qquad (24)$$

Therefore, a plurality of eigenvalues and current vectors corresponding to the respective eigenvalues are obtained by diagonalizing a real matrix ReZ of Equation (24). In other words, the current vector generation unit 135 determines power to be supplied to the plurality of parent devices 2-n (coils 23-n) so that a sum of the square of currents flowing through the plurality of parent devices 2-n (coils 23-n) is constant. Here, since Re(Z) is a real symmetric matrix, all λ are real numbers. Therefore, the child device only consumes the energy, and the eigenvalue takes a positive value.

The current vector corresponding to the maximum eigenvalue among these eigenvalues and current vectors is a current vector giving the maximum power transfer efficiency.

Here, a direct product of mutual inductances of the $m^{th}$ child device 3-m appearing in a second term of Equation (21) with the respective parent devices 2-1 to 2-N is an N×N-dimensional matrix, as shown in Equation (25).

$$\vec{l}_{n0}\vec{l}_{0n} \qquad (25)$$

A rank of this matrix is usually the number M of the parent devices. Therefore, M eigenvalues among the eigenvalues of (the real part of) the impedance matrix are positive and the other N-M eigenvalues are 0.

Since the current vector whose eigenvalue corresponds to 0 cannot send power to all the child devices 3-m, and only causes the ohm loss in the coils 23-1 to 23-N, it is useless to flow a current expressed by a linear combination of the currents indicated by such a current vector into the coils 23-1 to 23-N.

<Operation of Wireless Power Transfer System>

Figure 5:
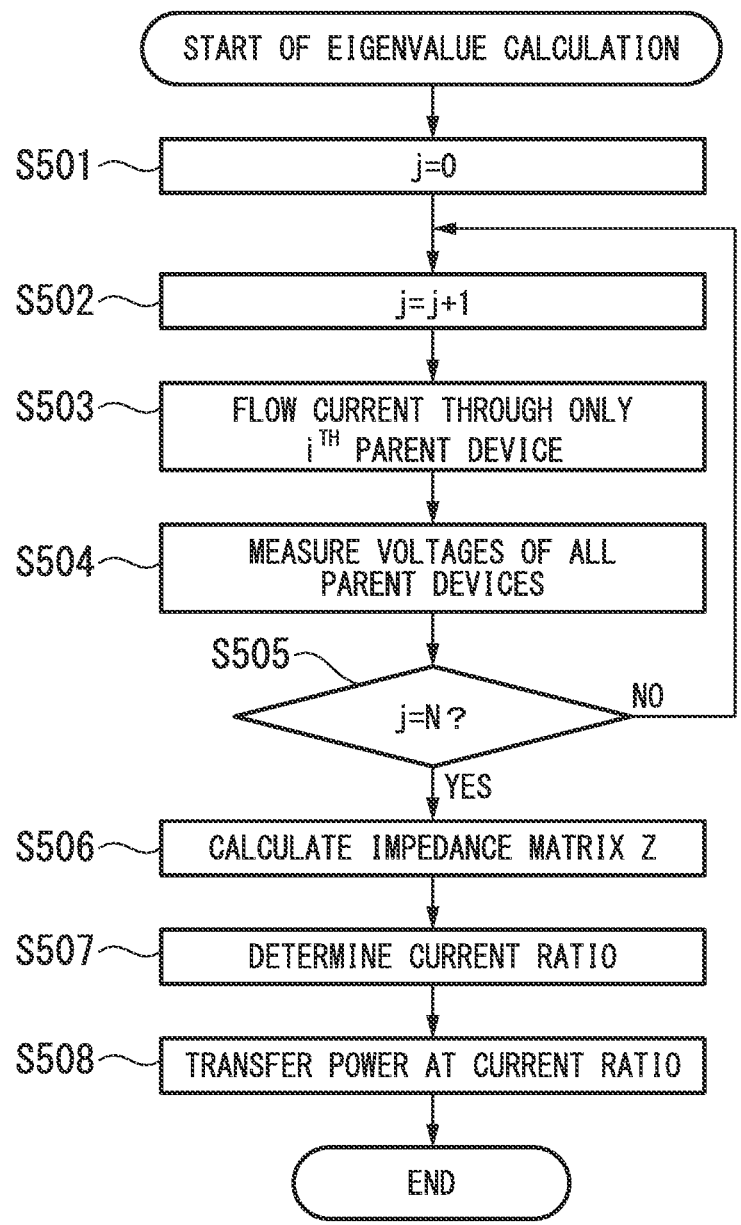
FIG. 5 is a flowchart illustrating an example of operation of a current distribution determination unit according to the present embodiment.

FIG. 5 is a flowchart illustrating an example of operation of the current distribution determination unit 13 according to the present embodiment.

(Step S501) When an update command is input, the energized parent device selection unit 131 substitutes 0 for the parent device selection counter j of the current vector storage unit 16. The process then proceeds to step S502.

(Step S502) The energized parent device selection unit 131 increases the parent device selection counter j of the storage unit 16 by 1. The process then proceeds to step S503.

(Step S503) The energized parent device selection unit 131 closes the switch 26-j of the parent device 2-j and opens the switch 26-n of the other parent device 2-n (n≠j). The process then proceeds to step S504.

(Step S504) The current distribution determination unit 13 supplies a current to the coil 23-j of the parent device 2-j. The complex voltage detection unit 11 receives voltage information indicating a voltage ($V_{ij}$) measured by each voltmeter 25-i of the parent device 2-i from the voltmeter 25-i. The complex current detection unit 12 receives current information indicating a current ($I_{ij}$) measured by each ammeter 24-i from the ammeter 24-i. Here, $I_{ij}=0$ when i≠j. The process then proceeds to step S505.

(Step S505) The impedance matrix generation unit 134 determines whether j=N. When it is determined that j=N, the process proceeds to step S506. When it is determined that j≠N, the process returns to S502.

(Step S506) The impedance matrix generation unit 134 calculates a matrix in which $V_{ij}$ obtained in step S504 is a component, as a matrix V. The impedance matrix generation unit 134 calculates a matrix in which $I_{ij}$ obtained in step S504 is a component, as a matrix I. The impedance matrix generation unit 134 calculates a component $Z_{ij}$ of the impedance matrix Z using Equation (26) below.

$$Z_{ij} = \frac{V_{ij}}{I_0} \qquad (26)$$

The process then proceeds to S507.

(Step S507) The current vector generation unit 135 solves a secular equation (24) for the impedance matrix Z calculated in step S506 under a condition that a sum of squares of a total current be constant ($|I|^2$=constant). A solution obtained in this way is an eigenvalue and a current vector I corresponding to the eigenvalue. The current vector generation unit 135 selects the current vector I when the eigenvalue for the current vector I becomes a maximum value (referred to also as a maximum eigenvalue) among the calculated current vectors I.

The current vector generation unit 135 divides the selected current vector I by an absolute value |I| of I and determines an i component of $I_i/|I|$ after the division as the current ratio for supply to the parent device 2-i.

(Step S508) The current vector generation unit 135 outputs information indicating the determined current ratio to the current amplitude control unit 15. The current amplitude control unit 15 supplies a current at the current ratio indicated by the input information to each parent device 2-n. Specifically, the current proportional to $I_i/|I|$ is supplied to the coil 23-i of the parent device 2-i.

Thus, according to the present embodiment, in the wireless power transfer system, the power to be supplied to the plurality of coils 23-n is determined so that the real impedance matrix produced by the real component of the impedance matrix Z based on the mutual inductance of the plurality of coils 23-$n$ has the maximum eigenvalue. Specifically, in the wireless power transfer system, the eigenvector (current vector I) of the impedance matrix Z is calculated and a current is supplied to the plurality of coils 23-$n$ based on the current vector I. Accordingly, in the wireless power transfer system, it is possible to transfer the power in consideration of effects of the mutual inductance between a plurality of parent devices 2-$n$ and improve efficiency of power transmission from the plurality of parent devices 2-$n$ to the child device 3-$m$.

Further, according to the present embodiment, in the wireless power transfer system, the power to be supplied to the plurality of coils 23-$n$ is determined so that the sum of squares of the magnitudes I of the currents flowing through the plurality of coils 23-$n$ becomes constant. Accordingly, in the wireless power transfer system, it is possible to supply the power from the plurality of parent devices 2-$n$ to the child device 3-$m$ with maximum energy efficiency under a constant energy loss (proportional to a sum of the squares of the magnitudes I of the currents) in the coil 23-$n$.

Further, according to the present embodiment, in the wireless power transfer system, the power to be supplied to the plurality of coils 23-$n$ is determined so that the eigenvalue for the current vector I is maximized. Accordingly, in the wireless power transfer system, it is possible to maximize the power to be supplied by the plurality of parent devices 2-$n$ and improve the efficiency of power transmission from the plurality of parent devices 2-$n$ to the child device 3-$m$.

Further, in the embodiment, the current vector generation unit 135 may determine the power to be supplied to the plurality of coils 23-$n$ to be linear combination of non-zero components of the eigenvector (current vector I) of the impedance matrix Z.

Further, in the embodiment, the current vector generation unit 135 may select the current vector I corresponding to the eigenvalue other than the maximum eigenvalue. For example, the current vector generation unit 135 may select the current vector I corresponding to the eigenvalue whose value is the second greatest (referred to as a second eigenvalue).

In this regard, a building or the like includes a building having a rebar structure. In a room of this building, the maximum eigenvalue may be a maximum eigenvalue corresponding to power transfer for the rebar. As the current vector generation unit 135 selects the second eigenvalue, in the wireless power transfer system, it is possible to prevent power from being supplied to the rebar even in the room of the building having the rebar structure. In other words, in the wireless power transfer system, it is possible to prevent power from being supplied to conductors other than child device 3-$m$ by selecting the current vector I corresponding to various eigenvalues and to improve the efficiency of power transmission from the parent device 2-$n$ to the child device 3-$m$.

Further, the eigenvector corresponding to the third or subsequent eigenvalue may be selected.

<Simulation>

Figure 6A:
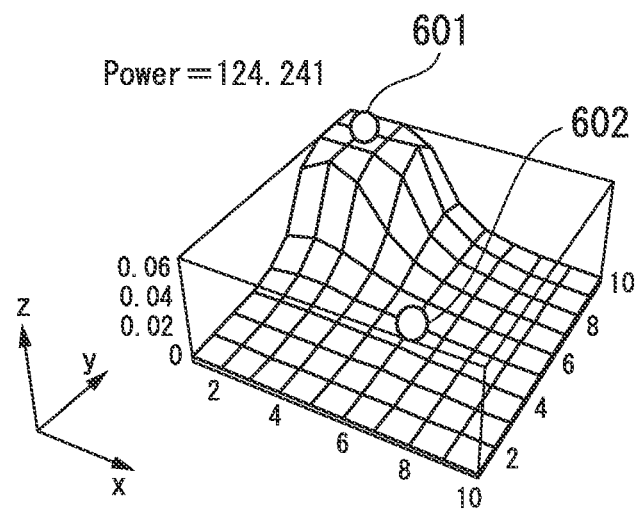
FIG. 6A is a diagram illustrating a result of simulation according to the present embodiment.
Figure 6B:
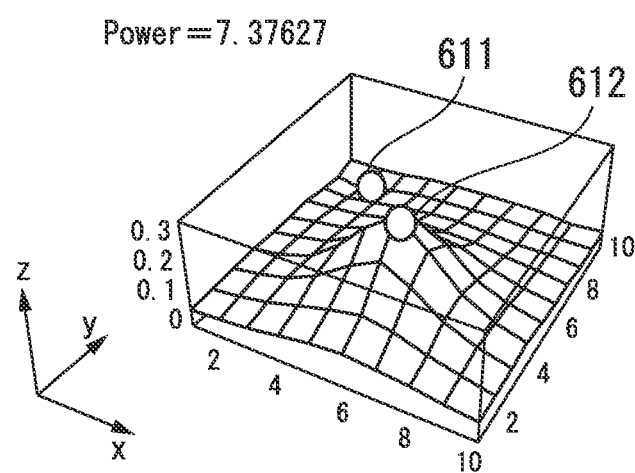
FIG. 6B is a diagram illustrating a result of simulation according to the present embodiment.

FIGS. 6A and 6B are diagrams illustrating results of simulation according to the present embodiment. In FIGS. 6A and 6B, an x-axis and a y-axis indicate spatial coordinates, and an xy plane is a surface parallel to a floor. A z-axis indicates a magnitude of a power. In the simulation of FIGS. 6A and 6B, a current pattern when 10×10 (at intervals of 450 mm) coils 23-$n$ are provided on the floor and power is transmitted to child device antenna in positions of 1 m and 0.5 m from the floor is shown. In the simulation of FIGS. 6A and 6B, calculation was performed on the assumption that the size of the coils 23-$n$ and 31-$m$ was the same in the parent device 2-$n$ and the child device 3-$m$ and a diameter of the coils was sufficiently small.

In FIGS. 6A and 6B, the child device 3-1 is installed at a height at which the distance from the floor is 0.5 m at a point 601 denoted with a reference numeral 601 and a point 611 denoted with a reference numeral 611. The child device 3-2 is installed at a height at which the distance from the floor is 1 m at a point 602 denoted with a reference numeral 602 and a point 612 denoted with a reference numeral 612.

FIG. 6A is a diagram when the current vector generation unit 135 selects the current vector I corresponding to the maximum eigenvalue. In FIG. 6A, power in the child device 3-1 was 124.241.

FIG. 6B is a diagram when the current vector generation unit 135 selects the current vector I corresponding to the second eigenvalue. In FIG. 6B, power in the child device 3-2 was 7.37623 on any scale.

Thus, the current vector generation unit 135 can select the child device 3-$m$ to which the power is to be supplied by selecting the current vector I corresponding to each eigenvalue.

Figure 7:
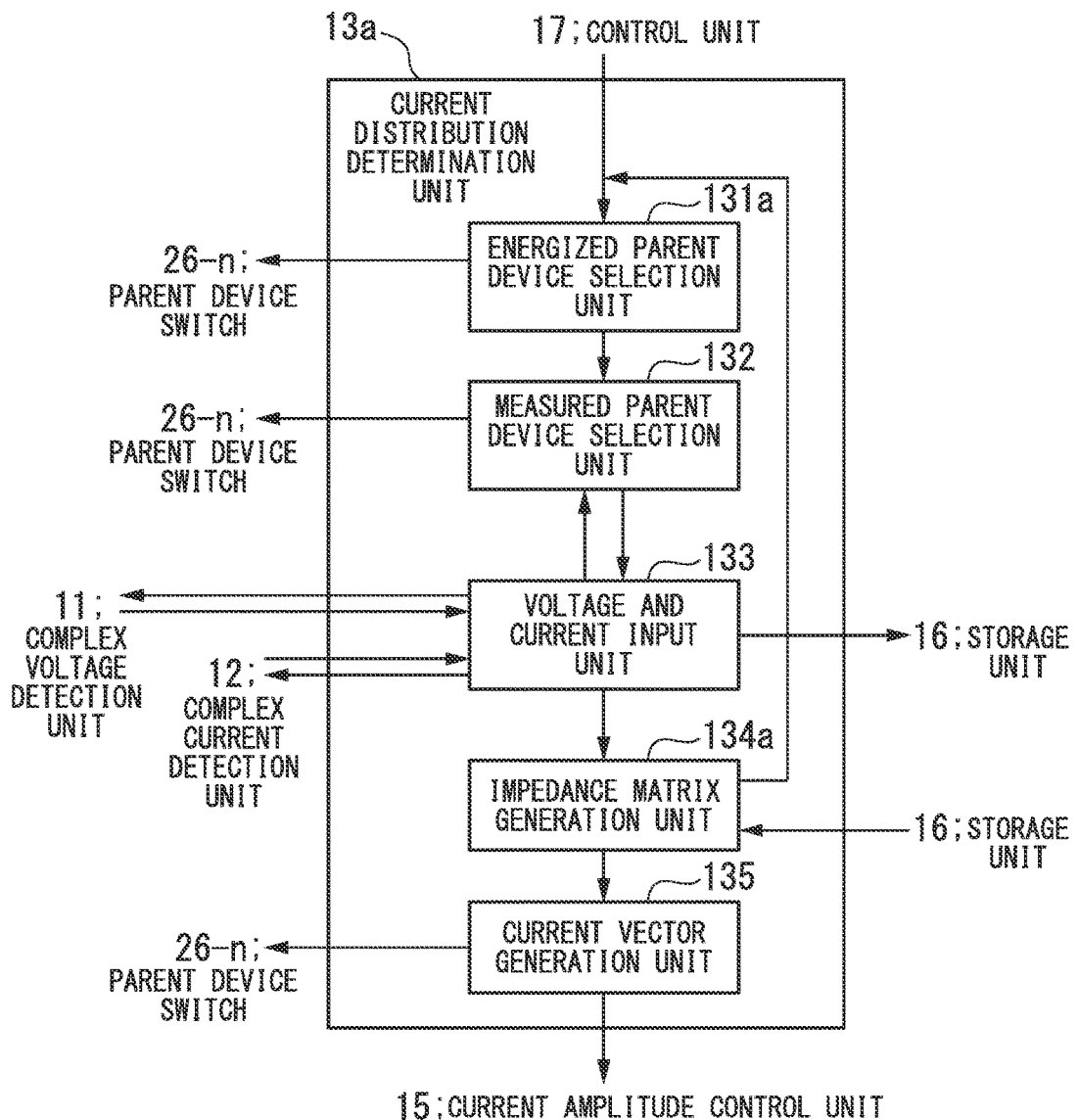
FIG. 7 is a schematic block diagram illustrating a configuration of a current distribution determination unit according to a modification 1 of the present embodiment.

FIG. 7 is a block diagram illustrating a configuration of the current distribution determination unit 13$a$ according to a modification 1 of the present embodiment. If FIGS. 7 and 4A are compared, an energized parent device selection unit 131$a$ and an impedance matrix generation unit 134$a$ of the current distribution determination unit 13$a$ differ. Since functions of other configurations are the same, an explanation of the other configurations will be omitted.

The energized parent device selection unit 131$a$ outputs a switch switching signal to the switches 26-$n$ to close the switches 26-$n$ of all the parent devices 2-$n$. The energized parent device selection unit 131$a$ selects one parent device 2-$j$ and supplies a current whose current value is known (a magnitude of the current in the ammeter 24-$j$ is $I_0$ and an angular frequency is $\omega_0$) to the parent device 2-$j$. Further, while the current is being supplied to the parent device 2-$j$, the measured parent device selection unit 132 sequentially selects the parent device 2-$i$ and writes its complex voltage information and complex current information to the storage unit 16. The energized parent device selection unit 131$a$ and the measured parent device selection unit 132 perform the same process on all j.

Figure 8:
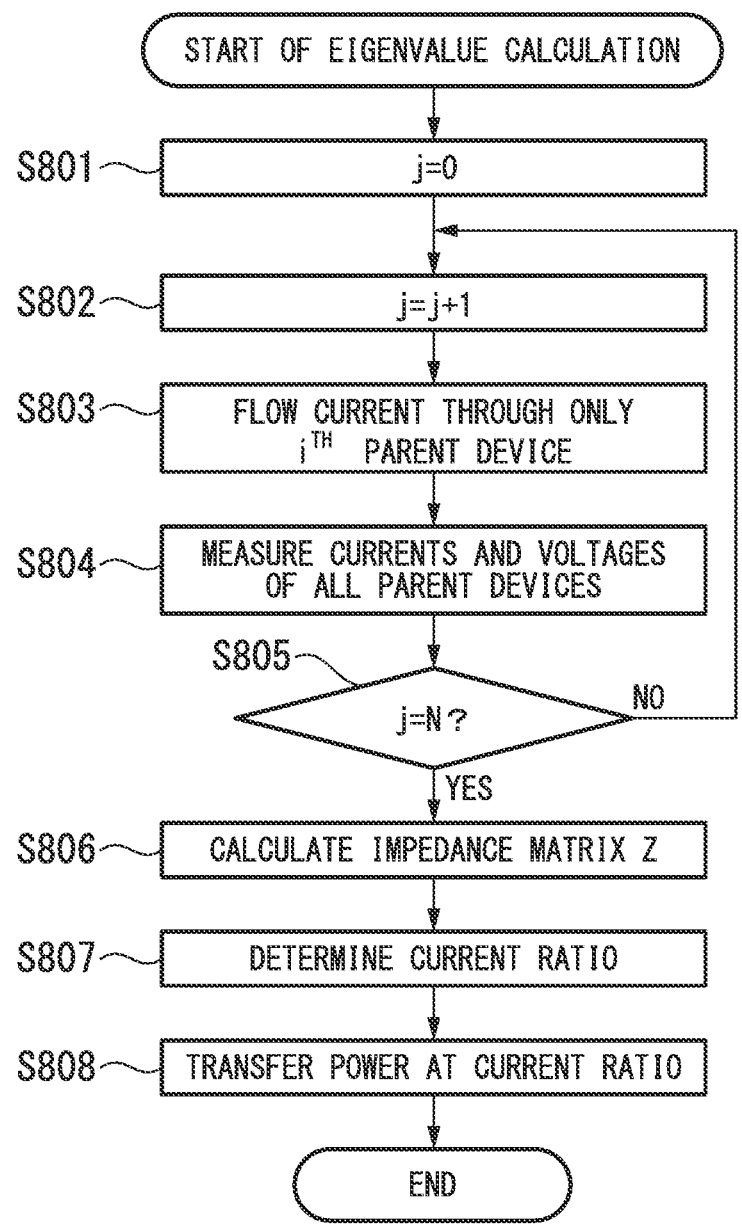
FIG. 8 is a flowchart illustrating another example of operation of the current distribution determination unit according to the modification 1 of the present embodiment.

FIG. 8 is a flowchart illustrating another example of operation of the current distribution determination unit 13$a$ according to the modification 1 of the present embodiment. The present modification is applied to a case in which there is no switch 26-$n$ in the parent device 2-$n$ (i.e., the switch 26-$n$ is always on).

(Step S801) When an update command is input, the energized parent device selection unit 131$a$ substitutes 0 for the parent device selection counter j of the current vector storage unit 16. The process then proceeds to step S802.

(Step S802) The energized parent device selection unit 131$a$ increases the parent device selection counter j of the storage unit 16 by 1. The process then proceeds to step S803.

(Step S803) The current distribution determination unit 13$a$ supplies a current to the coil 23-$j$ of the parent device 2-$j$. The process then proceeds to step S804. In this case, an induced current may also flow through the power supply unit 21-$n$ of the parent device of n≠i, but this may also be allowed.

(Step S804) The complex voltage detection unit 11 receives voltage information indicating the voltage ($V_{ij}$)

measured by the voltmeter 25-*i* from each voltmeter 25-*i* of the parent device 2-*i*. The complex current detection unit 12 receives current information indicating a current ($I_{ij}$) measured by the ammeter 24-*i* from each ammeter 24-*i*. The process then proceeds to step S805.

(Step S805) The impedance matrix generation unit 134*a* determines whether j=N. When it is determined that j=N, the process proceeds to step S806. When it is determined that j≠N, the process returns to step S802.

(Step S806) The impedance matrix generation unit 134*a* calculates a component $Z_{ik}$ (k is an integer from 1 to N) of the impedance matrix Z using Equation (27) below.

$$V_{ij} = \sum_{k=1}^{N} Z_{ik} I_{kj} \quad (27)$$

Here, Equation (27) is N×N simultaneous equations having N×N unknown $Z_{ik}$.

The impedance matrix generation unit 134*a* obtains a component $Z_{ik}$ of the impedance matrix Z by solving this simultaneous equation (27). Further, since $Z_{ik}$ is a target matrix, an independent component is N×(N−1)/2. However, this is neglected herein to solve the simultaneous equation. In this case, $Z_{ik}=Z_{ki}$ in a complex range. The process then proceeds to step S807.

(Step S807) The current vector generation unit 135 solves the secular equation (24) for the impedance matrix Z calculated in step S806 under a condition that a sum of squares of a total current is constant ($|I|^2$=constant). A solution obtained in this way is an eigenvalue and a current vector I corresponding to the eigenvalue. The current vector generation unit 135 selects the current vector I in which a corresponding eigenvalue is a maximum eigenvalue among the calculated current vectors I. The current vector generation unit 135 calculates $I_i/|I|$ based on the selected current vector I, and determines the calculated $I_i/|I|$ as the current ratio for supply to the parent device 2-*i*.

(Step S808) The current vector generation unit 135 outputs the information indicating the determined current ratio to the current amplitude control unit 15. The current amplitude control unit 15 supplies the current at the current ratio indicated by the input information to each parent device 2-*n*. Specifically, the current proportional to $I_i/|I|$ is supplied to the coil 23-*i* of the parent device 2-*i*.

Thus, according to the modification 1 of the present embodiment, the current vector I can be calculated even when there is no switch 26-*n* in the parent device 2-*n*. Therefore, the current can be supplied to the coil 23-*i* of the parent device 2-*i* according to the current ratio indicated by the current vector I.

A function of the switch 33-*m* of the child device 3-*m* illustrated in FIG. 2 in the embodiment described above will be described. When the charged voltage measured by the voltmeter 36 is greater than a threshold determined in advance, the switch control unit 38 determines that charging has been completed in a period (S508 or S808) in which the parent device does not perform impedance measurement, i.e., a period in which the parent device performs power transfer. When it is determined that charging has been completed, the switch control unit 38 outputs an opening or closing signal to open the switch 33-*m*, and the switch 33-*m* opens and charging no longer occurs. Further, a frequency of switching of the switch 33-*m* of the child device 3-*m* is sufficiently larger than an updating interval of the impedance matrix of the parent device 2-*n*, and the switch 33-*m* of the child device 3-*m* may not be switched in the updating interval. Alternatively, switching of the switch 33-*m* may be synchronized with the update of the impedance matrix of the parent device 2-*n*. In this case, a device which performs transmission and reception of a synchronization signal, such as a radio, is necessary between the parent device 2-*n* and the child device 3-*m*.

Here, when the current distribution determination unit 13 determines the current ratio again in response to the update command of the control unit 17, the impedance matrix Z in which the child device 3-*m* whose switch 33-*m* opens is neglected is calculated. In this case, the current distribution determination unit 13 selects the current vector I not to supply the power to the child device 3-*m*. For example, the power is mainly supplied to the child device 3-1 in the wireless power transfer system by the current distribution determination unit 13 selecting the current vector I corresponding to the maximum eigenvalue. When the child device 3-1 opens the switch, the current distribution determination unit 13 then selects the current vector I corresponding to another maximum eigenvalue. Accordingly, in the wireless power transfer system, for example, the power begins to be mainly supplied to the child device 3-2.

Thus, the child device 3-*m* to which high power is to be supplied can be sequentially selected in the wireless power transfer system by opening or closing the switch 33-*m* of the child device 3-*m*.

However, even when there is no switch 33-*m*, the child devices 3-*m* to which high power is to be supplied can be sequentially selected in the wireless power transfer system.

Figure 9:
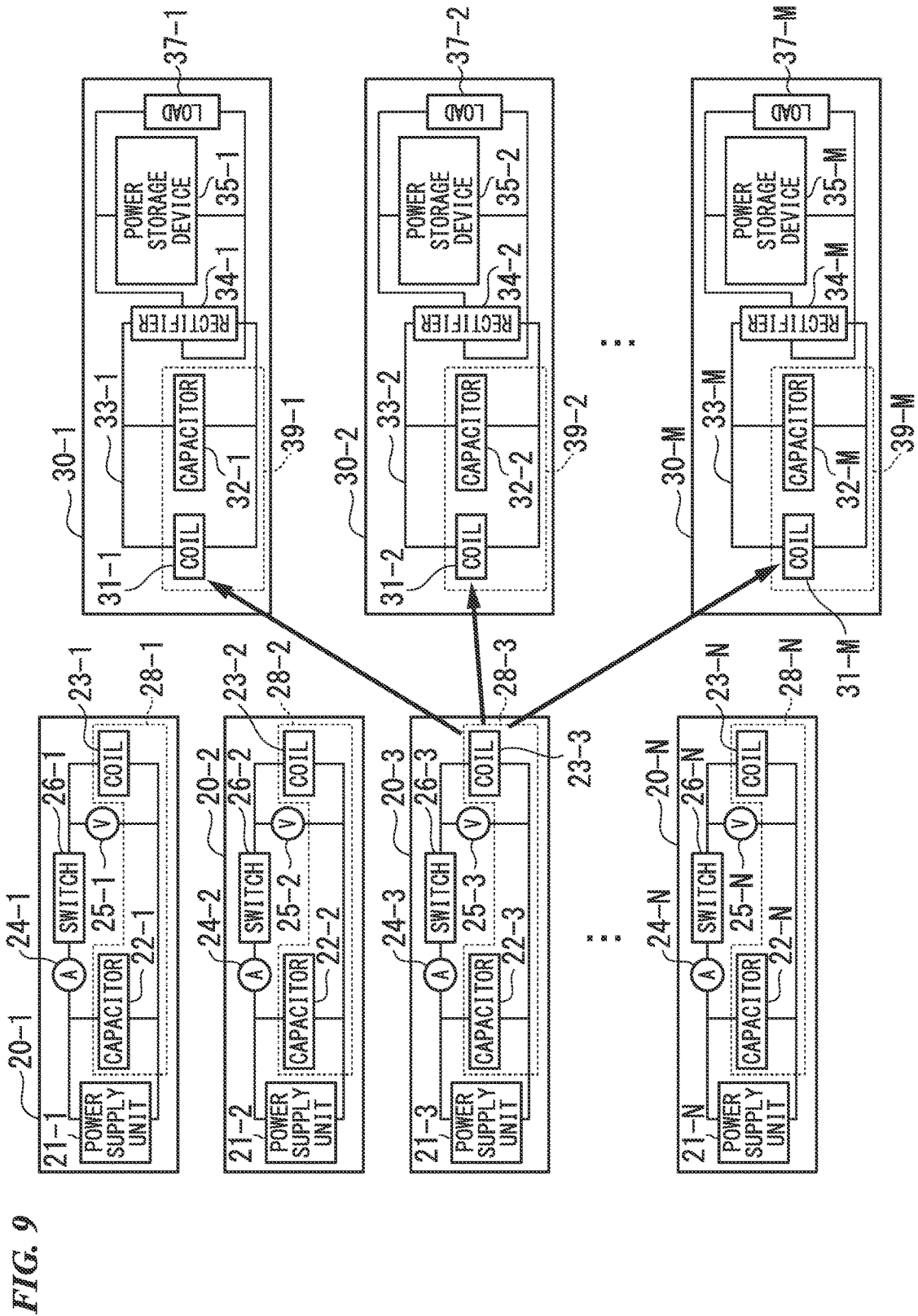
FIG. 9 is a schematic block diagram illustrating a configuration of a parent device and a child device according to a modification 2 of the present embodiment.

FIG. 9 is a schematic block diagram illustrating a configuration of a parent device and a child device according to a modification 2 of the present embodiment. FIG. 9 is a diagram illustrating a case in which there is no switch in the child device 3-*m*. In FIG. 9, signal lines of the parent device power transmission control unit I not illustrated and the parent device 20-*n* are connected and synchronization is made. In FIG. 9, an ammeter 24-1 is an instrument which measures a complex current and can measure a current amplitude and phase of the complex current at the same time. A voltmeter 25-1 is an instrument which measures a complex voltage and can measure a voltage amplitude and phase of the complex voltage at the same time. Further, a power supply unit 21-*n* may be a connector which receives a current input from the parent device power transmission control unit 1.

In this case, charging in the power storage battery 35-*m* can continue. As a charging state is higher, the real part of the impedance when the load is viewed from the capacitor 32-*m* is considered to increase and the eigenvalue viewed from the parent device is considered to decrease. In other words, in the wireless power transfer system, a priority of power transfer is naturally lowered and power transfer is not performed (a power reception refusal mode). Further, in this case, cost for introduction of the switch 33-*m* can be reduced in the wireless power transfer system. Further, there may be both the child device 3-*m* having the switch 33-*m* and the child device 3-*m* having no switch 33-*m*.

Second Embodiment

Hereinafter, a second embodiment of the present invention will be described. A wireless power transfer system according to the present embodiment determines power to be supplied to coils of a plurality of parent devices to converge on an eigenvector corresponding to a maximum eigenvalue of an impedance matrix Z. A parent device 2-n and a child device 3-m according to the present embodiment are the same as those in the first embodiment. A parent device power transmission control unit 1 differs in that the parent device power transmission control unit 1 includes another type of the current distribution determination unit 13b in place of the current distribution determination unit 13. However, since the other configuration in the parent device power transmission control unit 1 is the same as that in the first embodiment, an explanation thereof is omitted.

Figure 10:
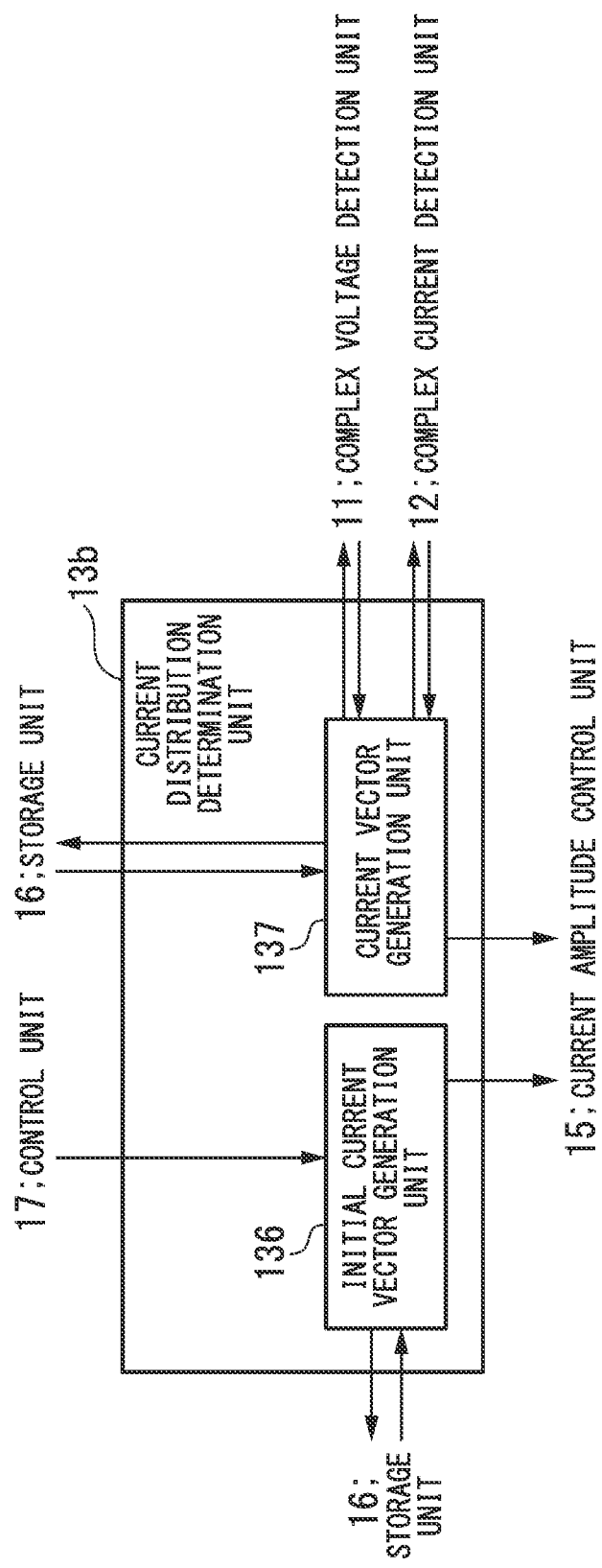
FIG. 10 is a schematic block diagram illustrating an example of a configuration of a current distribution determination unit according to a second embodiment of the present invention.

FIG. 10 is a block diagram illustrating an example of a configuration of the current distribution determination unit 13b according to the second embodiment of the present invention. In FIG. 10, the current distribution determination unit 13b includes an initial current vector generation unit 136 and a current vector generation unit 137.

When an update command is input from the control unit 17, the initial current vector generation unit 136 supplies a current of the same amplitude I(0) and the same phase as an initial value of exponentiation multiplication to all coils 23-n. Specifically, the initial current vector generation unit 136 outputs information indicating a current ratio for the same ratio to the current amplitude control unit 15. However, the initial current may not have the same amplitude and the same phase.

The current vector generation unit 137 extracts a component having the same phase as the complex current, of the complex voltage of each parent device based on the complex voltage information input from the complex voltage detection unit 11 and the complex current information input from the complex current detection unit 12, and determines a current ratio proportional to the component (referred to also as a current determination process). The current vector generation unit 137 outputs information indicating the determined current ratio to the current amplitude control unit 15. The current vector generation unit 137 then repeats the current determination process.

Figure 11:
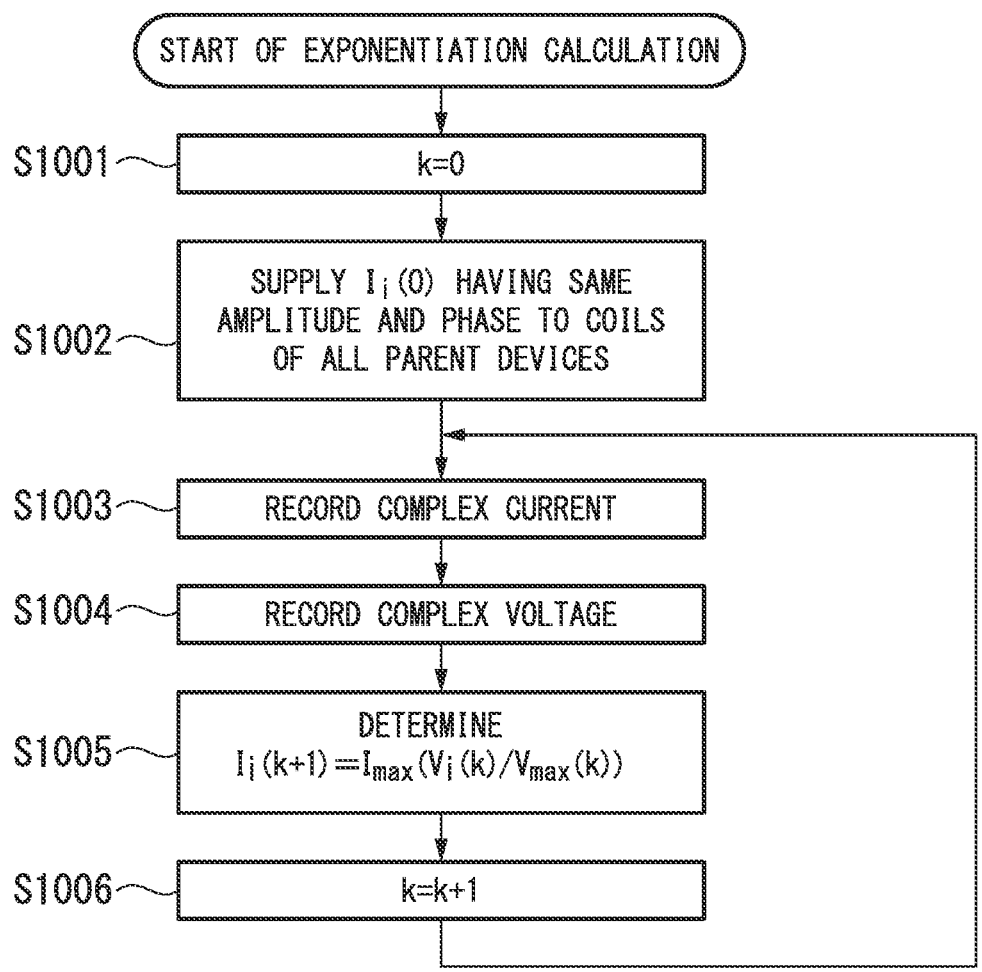
FIG. 11 is a flowchart illustrating an example of operation of a current distribution determination unit according to the present embodiment.

FIG. 11 is a flowchart illustrating an example of operation of the current distribution determination unit 13b according to the present embodiment.

(Step S1001) When an update command is input, the initial current vector generation unit 136 substitutes 0 for a counter k indicating the number of repetitions. The process then proceeds to step S1002.

(Step S1002) The initial current vector generation unit 136 outputs the information indicating the current ratio for the same the ratio to the current amplitude control unit 15. Accordingly, the current amplitude control unit 15 supplies the current $I_i(0)$ of the same phase with the same amplitude to the parent device 2-i. The process then proceeds to step S1003.

(Step S1003) The current vector generation unit 137 stores the information indicating the current ratio output in step S1002 and the information indicating the current ratio determined in step S1005. The process then proceeds to step S1004.

(Step S1004) The current vector generation unit 137 writes the complex voltage information input from the complex voltage detection unit 11 to the storage unit 16. Here, when the number of repetitions is k, a component of the same phase as the current measured by the complex current detection unit 12 is indicated by $V_i(k)$ at the voltage measured by the ammeter 24-i of the parent device 2-i. The process then proceeds to step S1005.

(Step S1005) The current vector generation unit 137 determines an i component $I_i(k+1)$ of the current vector I(k+1) using Equation (28) below.

$$I_i(k+1) = I_{max}\left(\frac{V_i(k)}{V_{max}(k)}\right) = \alpha(k)V_i(k) = \alpha(k)\sum_{j=1}^{N} \text{Re}(Z_{ij})I_j(k) \quad (28)$$

Here, $V_{max}(k)$ denotes a maximum value of an absolute value of $V_i(k)$ when i=1 to N. Further, $I_{max}$ is a value determined in advance and is, for example, a maximum rating current of the current amplitude control unit 15. The current vector generation unit 137 determines the current vector component determined using Equation (28) and proceeds to step S1006.

(Step S1006) The current vector generation unit 137 substitutes k+1 for the counter k.

The process then returns to S1003.

<Operational Effects>

Hereinafter, operational effects when the current at the current ratio determined by the current vector generation unit 137 is supplied to the parent device 2-n will be described.

Since the eigenvalue takes a positive value, the eigenvalue $\lambda 0$ satisfies $\lambda 0 > 0$ if there is at least one child device.

$$[Re(Z)/\lambda 0]^{\wedge}k = P\text{diag}((\lambda 0/\lambda 0)^{\wedge}k,(\lambda 1/\lambda 0)^{\wedge}k, \ldots (\lambda(N-1)/\lambda 0)^{\wedge}k)P^{-1} \quad (29)$$

Here, P=(I0, I1, ... , In), in which In denotes an eigenvector (a current vector; column vector of N×1) whose size for the $n^{th}$ eigenvalue is 1, and satisfies Equation (29).

diag(a0, a1, . . . , aN−1) is a diagonal matrix, and a variable indicates a diagonal component. Equation (30) is obtained when a limit as k→∞ is considered.

$$[Re(Z)/\lambda 0]^{\wedge}k = P\text{diag}(1,0, \ldots 0)P^{-1} \quad (30)$$

Thus, the eigenvector other than the maximum eigenvalue converges to 0.

The current vector corresponding to the maximum eigenvalue can be obtained without performing calculation such as a simultaneous equation or diagonalization by performing repetition calculation as will be described below.

First, when a voltage component with the same phase as the flowing current observed in the $n^{th}$ coil is V(0) in a vector indication when a current with the same amplitude and the same phase, i.e., I(0) in a vector indication flows through all the coils, a relationship of Equation (31) is satisfied.

$$V(0)=Re(Z)I(0) \quad (31)$$

Here, k of V(k), I(k) or the like indicates the number of repetition calculations. I(1) is obtained as shown in Equation (32) below by multiplying V(0) calculated herein by a coefficient α(0).

$$I(1)=\alpha(0)V(1) \quad (32)$$

V(1) is obtained as shown in Equation (33) using 41) calculated herein.

$$V(1)=Re(Z)I(1) \quad (33)$$

Hereinafter, I(k) is expressed as shown in Equation (34) through repetition.

$$I(k)=Re(Z)^{\wedge}k\alpha(0) \ldots \alpha(k-1)I(0) \quad (34)$$

Here, α may be determined so that the maximum value of the current component is a rating current or may be determined so that a sum of N transmission powers is a rating. A ratio between the respective current components is determined according to the equation. I(k) determined in this way converges on an eigenvector of the maximum eigenvalue.

As described above, the current distribution determination unit 13b converges I(k) on the eigenvector of the maximum eigenvalue by repeating the current determination process. In other words, the current distribution determination unit $13b$ determines the power to be supplied to the coil $23\text{-}n$ in the parent device $2\text{-}n$ to converge on the eigenvector of the impedance matrix Z. In other words, the current distribution determination unit $13b$ supplies the power to the coil $23\text{-}n$ in the parent device $2\text{-}n$ so that a real component of the impedance matrix Z has a maximum eigenvalue.

Thus, according to the present embodiment, in the wireless power transfer system, the parent device $2\text{-}n$ determines the power to be supplied to the coil $23\text{-}n$ to converge on the eigenvector of the impedance matrix Z. Accordingly, in the wireless power transfer system, it is possible to improve efficiency of power transmission from the plurality of parent devices $2\text{-}n$ to the child device $3\text{-}m$.

Figure 12A:
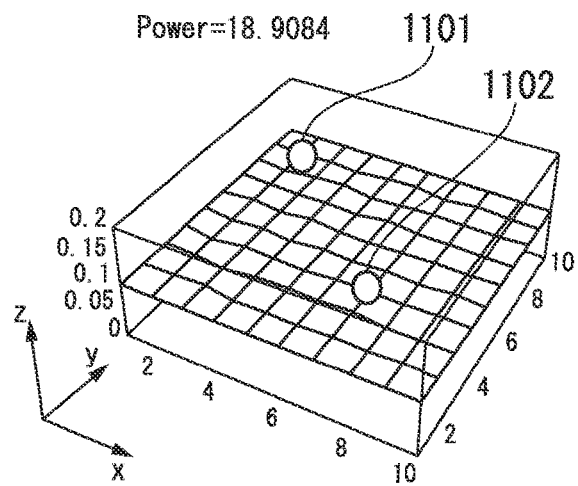
FIG. 12A is a diagram illustrating a result of simulation according to the present embodiment.
Figure 12B:
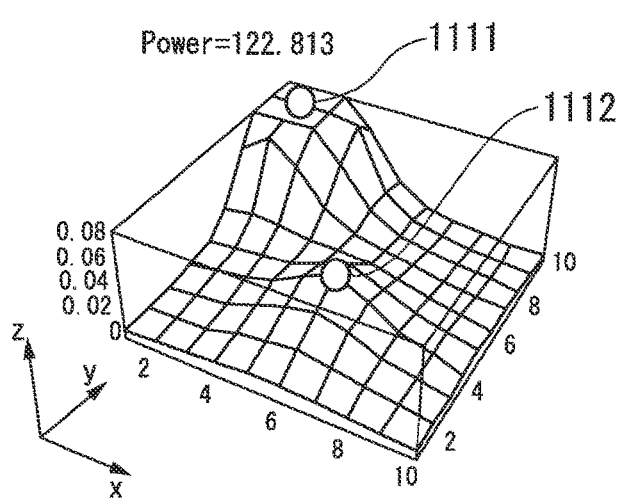
FIG. 12B is a diagram illustrating a result of simulation according to the present embodiment.
Figure 12C:
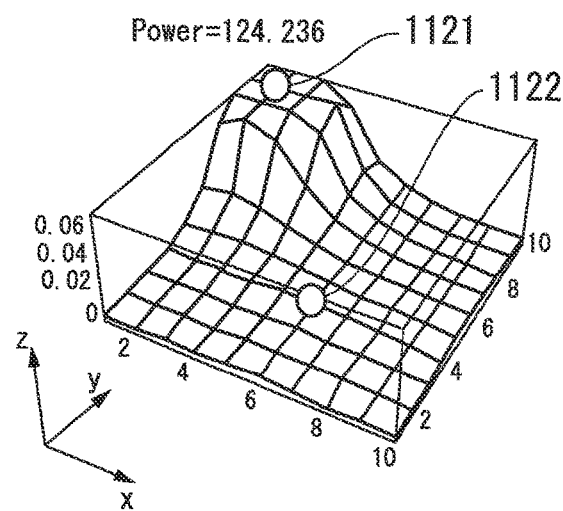
FIG. 12C is a diagram illustrating a result of simulation according to the present embodiment.

FIGS. 12A, 12B and 12C are diagrams illustrating results of simulation according to the present embodiment. In FIGS. 12A, 12B and 12C, an x-axis and a y-axis indicate spatial coordinates, and an xy plane is a surface which is parallel to a floor. A z-axis indicates a magnitude of a power. In the simulations of FIGS. 12A, 12B and 12C, current patterns when 10×10 coils $23\text{-}n$ (at intervals of 450 mm) are provided in the floor and power is transmitted to child device antennas in positions of 1 m and 0.5 m from the floor are shown. In the simulations of FIGS. 12A, 12B and 12C, the sizes of the coils $23\text{-}n$ and $31\text{-}m$ are equal in the parent device $2\text{-}n$ and the child device $3\text{-}m$, and calculation is performed on the assumption that a diameter of the coil is sufficiently small.

In FIGS. 12A, 12B and 12C, the child device 3-1 is installed at a height at which a distance from the floor is 0.5 m at a point 1101 denoted with a reference number 1101, a point 1111 denoted with a reference number 1111, and a point 1121 denoted with a reference number 1121. The child device 3-2 is installed at a height at which a distance from the floor is 1 m at a point 1102 denoted with a reference number 1102, a point 1112 denoted with a reference number 1112, and a point 1122 denoted with a reference number 1122.

FIG. 12A is a diagram when the initial current vector generation unit 136 selects the current vector I which transmits the same amplitude and the same phase to all the coils $23\text{-}n$. In FIG. 12A, uniform power is transmitted on the xy plane.

FIG. 12B illustrates a current pattern after the current vector generation unit 137 has performed a first repetition calculation. It is shown that the power is transmitted to the point 1112 as well as the point 1111.

FIG. 12C illustrates a current pattern after the current vector generation unit 137 has performed a second repetition calculation. It is shown that the power is transmitted to only a point 1121. In FIG. 12C, the power in the child device 3-1 was 124.236 on any scale. This is substantially equal to the power in the child device 3-1 illustrated in FIG. 6A and shows that repetition calculation converges.

Third Embodiment

Hereinafter, a third embodiment of the present invention will be described. In a wireless power transfer system according to the present embodiment, one high frequency power supply is shared among N parent devices. In other words, a current supplied to the parent devices is supplied from the number of high frequency power supplies fewer than the number of parent devices. The parent device controls a current supplied to the coil of the parent device by limiting the current supplied from the high frequency power supply.

Figure 13A:
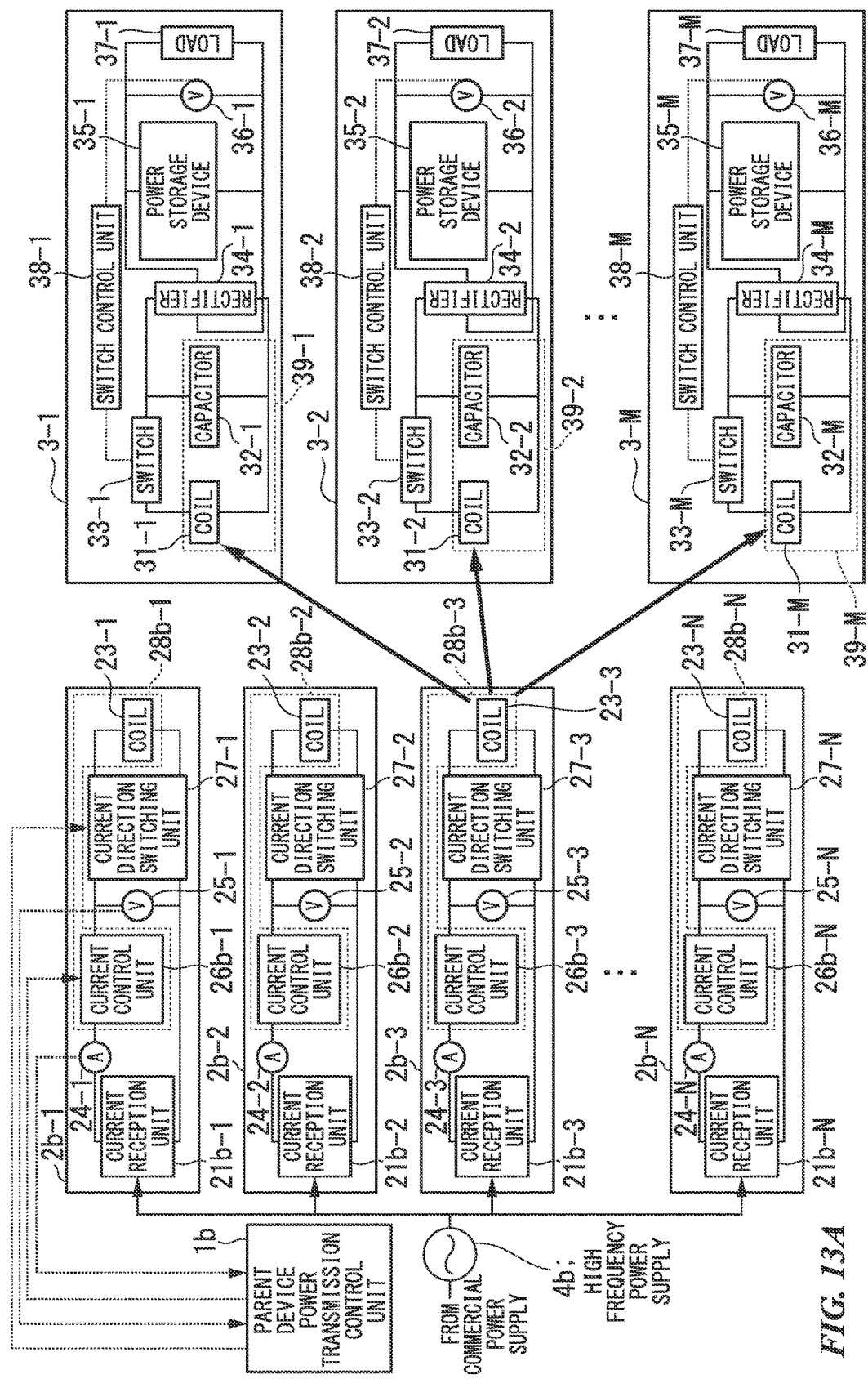
FIG. 13A is a schematic block diagram illustrating a configuration of a parent device and a child device according to a third embodiment of the present invention.

FIG. 13A is a schematic block diagram illustrating a configuration of a parent device $2b\text{-}n$ and a child device $3\text{-}m$ according to the present embodiment. Since a configuration other than a parent device power transmission control unit $1b$, a high frequency power supply $4b$, a current reception unit $21b\text{-}n$, a current control unit (control unit) $26b\text{-}n$ and a current direction switching unit $27\text{-}n$ in the present embodiment are the same as those in the first embodiment, an explanation thereof is omitted. Further, in FIG. 13A, while signal lines indicate only a connection between the parent device power transmission control unit $1b$ and the parent device $2b\text{-}1$, the signal lines are similarly connected to the parent device power transmission control unit $1b$ and the other parent device $2b\text{-}n$ and synchronization is made. Further, a current reception unit $21b\text{-}n$ may be a connector which receives a current input from the parent device power transmission control unit $1b$.

The high frequency power supply $4b$ converts power received from a commercial power supply to a high-frequency current and outputs the converted high-frequency current to the current reception units $21b\text{-}1$ to $21b\text{-}N$.

The current reception unit $21b\text{-}n$ supplies a high-frequency current input from the high frequency power supply $4b$ to the current control unit $26b\text{-}n$.

The parent device power transmission control unit $1b$ generates a selector switching signal based on the current measured by the ammeter $24\text{-}n$ and the voltage measured by the voltmeter $25\text{-}n$. Further, the parent device power transmission control unit $1b$ sets a current based on the current measured by the ammeter $24\text{-}n$ and the voltage measured by the voltmeter $25\text{-}n$ and generates a current direction switching signal according to the set positive or negative current.

The current control unit $26b\text{-}n$ controls a current flowing through the coil $23\text{-}n$ by limiting a current input from current reception unit $21b\text{-}n$ based on the selector switching signal generated by the parent device power transmission control unit $1b$.

The current direction switching unit $27\text{-}n$ switches the direction of the current flowing through the coil $23\text{-}n$ based on the current direction switching signal generated by the parent device power transmission control unit $1b$.

The ammeter 24-1 is an instrument which measures a complex current and can measure a current amplitude and phase of the complex current at the same time. The voltmeter 25-1 is an instrument which measures the complex voltage and can measure a voltage amplitude and phase of the complex voltage at the same time.

Figure 13B:
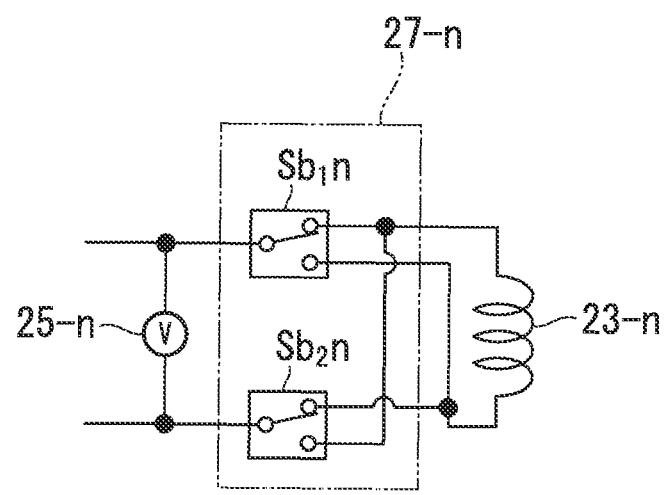
FIG. 13B is a schematic circuit diagram illustrating a configuration of a current direction switching unit according to the third embodiment of the present invention.

FIG. 13B is a schematic circuit diagram illustrating a configuration of the current direction switching unit $27\text{-}n$ according to the present embodiment. The current direction switching unit $27\text{-}n$ includes selectors $Sb_1n$ and $Sb_2n$, as illustrated in FIG. 13B. For example, for switching of the selectors $Sb_1n$ and $Sb_2n$, a direction of a current flowing through the ammeter $24\text{-}n$ (FIG. 13A) is acquired and the current direction switching unit $27\text{-}n$ switches the direction of the current flowing through the coil $23\text{-}n$. The selectors $Sb_1n$ and $Sb_2n$ are, for example, relays.

The selectors $Sb_1n$ and $Sb_2n$ have three ports, as illustrated in FIG. 13B. In the selector $Sb_1n$, its input terminal is connected to one terminal of the voltmeter $25\text{-}n$, one of output terminals is connected to one terminal of the coil $23\text{-}n$, and the other of the output terminals is connected to the other terminal of the coil $23\text{-}n$. In the selector $Sb_2n$, its input terminal is connected to the other terminal of the voltmeter $25\text{-}n$, one of output terminals is connected to the other terminal of the coil $23\text{-}n$, and the other of the output terminals is connected to one terminal of the coil $23\text{-}n$.

Figure 14:
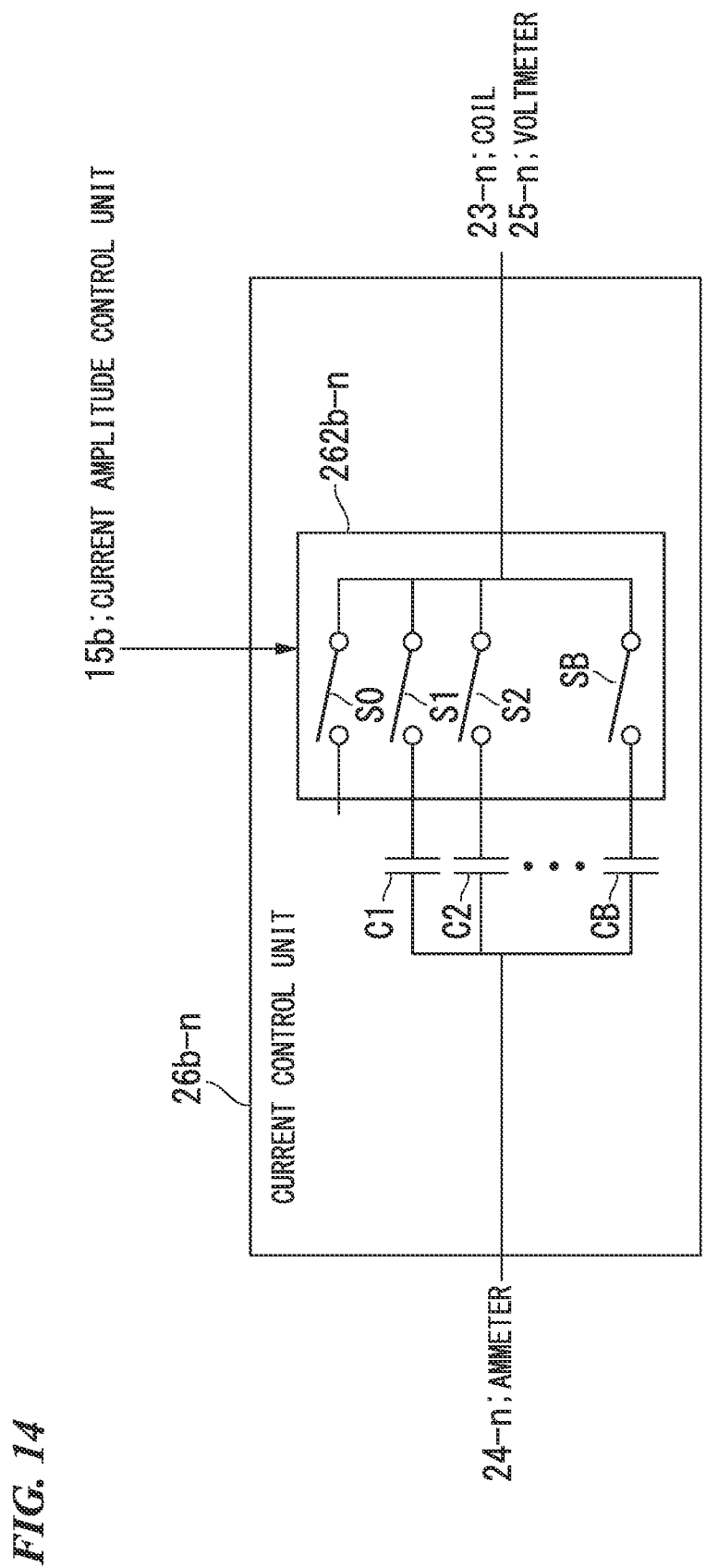
FIG. 14 is a schematic block diagram illustrating a configuration of a current control unit according to the present embodiment.

FIG. 14 is a block diagram illustrating a configuration of the current control unit 26b-n according to the present embodiment. The current control unit 26b-n includes B capacitors C1 to CB and a selector 262b-n. The capacitance $C_b$ (1≤b≤B) of each capacitor is expressed by Equation (35). In other words, capacitances $C_1$ to $C_B$ of the capacitors C1 to CB differ.

$$C_b = \frac{1}{\omega^2 L_{an}} \left(1 + \frac{B}{\alpha b}\right)^{-1} \qquad (35)$$

Here, α denotes any constant (in the present embodiment, α=0.1), ω denotes an angular frequency at a high frequency output by the high frequency power supply 4b, B denotes the number of the capacitors, and $L_{an}$ denotes the inductance of the coil of the parent device 2-n. However, since $C_b$ increases and the phase of a current flowing through the coil is shifted if α is too great, it is preferable that α≤0.5.

One terminal of each of the B capacitors C1 to CB is connected to the ammeter 24-n. The other terminals of the B capacitors C1 to CB are connected to terminals S1 to SB denoted with signs S1 to SB. Here, the terminal is a terminal of the selector (switching unit) 262b-n. Further, a terminal S0 denoted with a sign S0 is open. This switch is a switch which does not perform a function, but when only the switch enters an on state, this indicates that the current is cut off, and software can be simplified. The other terminal of the selector 262b-n is connected to one terminal of each of the coil 23-n and the voltmeter 25-n. The current control unit 26b-n switches a connection of the selector 262b-n according to the selector switching signal input from the current distribution determination unit 13b. Here, the current control unit 26b-n connects one of the terminals S1 to SB with the selector 262b-n. In other words, the switch switching signal is a signal indicating which of the capacitors C1 to CB is connected to the coil 23-n. However, the present invention is not limited thereto, and the selector 262b-n may be connected to two or more terminals S1 to SB. Further, for a negative current, the current direction switching unit 27-n reverses the direction of the current.

Figure 15:
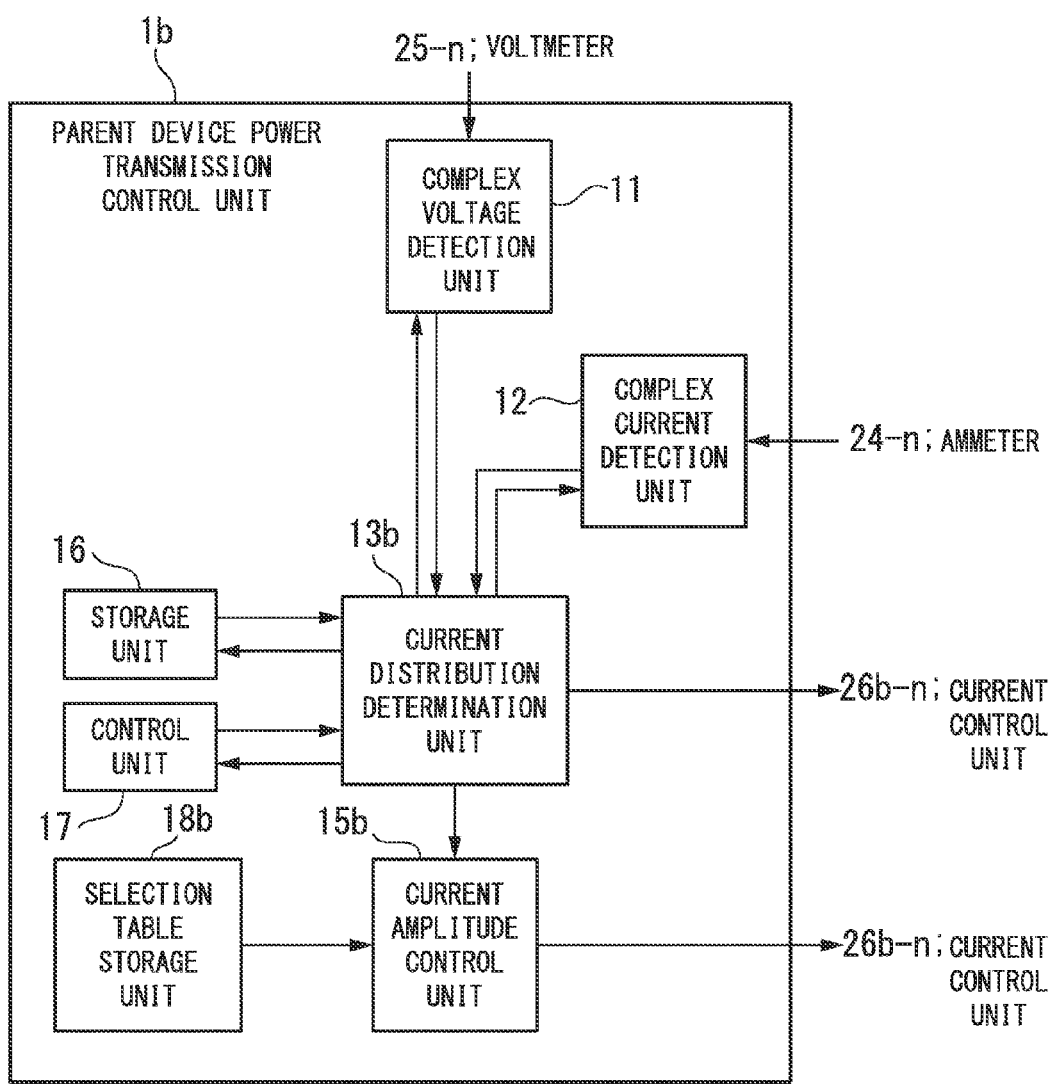
FIG. 15 is a schematic block diagram illustrating a configuration of a parent device power transmission control unit according to the present embodiment.

FIG. 15 is a block diagram illustrating a configuration of the parent device power transmission control unit 1b according to the present embodiment. Since a configuration other than a current distribution determination unit 13b, a current amplitude control unit 15b and a selection table storage unit 18b in the present embodiment is the same as the parent device power transmission control unit 1 in the first embodiment, an explanation thereof is omitted.

When an update command is input from a control unit 17, the current distribution determination unit 13b outputs a selector switching signal to the current control unit 26b-n. Here, the selector switching signal is a selector switching signal for connecting only the selector 262b-j of one parent device 2b-j to the terminal SB and the selector 262b-i (n≠j) of the other parent device 2b-n (n≠j) to the terminal S0.

When the selector 262b-j is connected to the terminal SB based on the selector switching signal, the current distribution determination unit 13b writes information measured by the parent device 2b-j (j=1 to N) to the storage unit 16. Specifically, when the selector 262b-j is connected to the terminal SS based on the selector switching signal, the current distribution determination unit 13b writes the complex voltage information (a magnitude of the voltage measured by the voltmeter 25-i is indicated by $V_{ij}$) input from the complex voltage detection unit 11 and the complex current information (a magnitude of the current measured by the ammeter 24-i is indicated by $I_{ij}$, the present embodiment, $I_{ii}=I_0$) input from the complex current detection unit 12 to the storage unit 16.

After outputting the selector switching signal, the current distribution determination unit 13b reads the complex voltage information and the complex current information from the storage unit 16. The current distribution determination unit 13b determines a current ratio for supply to each of a plurality of parent devices 2b-n based on the read information. The current distribution determination unit 13b outputs information indicating the determined current ratio to the current amplitude control unit 15b.

The current amplitude control unit 15b generates the selector switching signal based on the current ratio indicated by the information indicating the current ratio input from the current distribution determination unit 13b. Specifically, the current amplitude control unit 15b generates the selector switching signal of each current control unit 26b-n based on the selection table stored in the selection table storage unit 18b. Details of the selection table will be described below.

The current amplitude control unit 15b outputs the generated selector switching signal to the current control unit 26b-n. The current amplitude control unit 15b outputs the selector switching signal for controlling the amplitude, but does not output a signal for controlling the phase. This is because the current phase can be controlled and a current with substantially the same phase as the current supplied to the current reception unit 21b-n flows through the coil 23-n if Cb is sufficiently small in the present embodiment.

The selection table storage unit 18b stores the selection table.

Figures 16, 17:
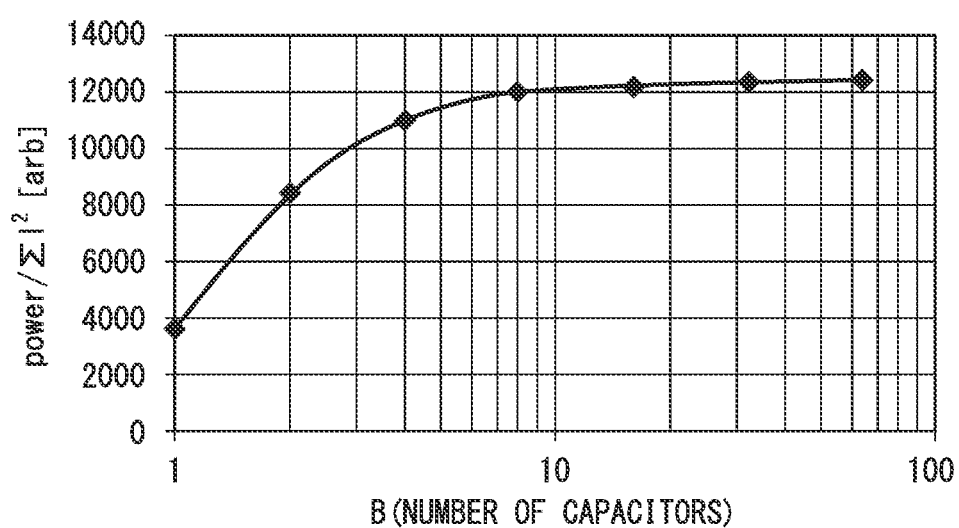
FIG. 16 is a schematic diagram illustrating an example of a selection table stored in a selection table storage unit according to the present embodiment.
FIG. 17 is a graph indicating a relationship of the number of capacitors and transmission efficiency of energy from a parent device to a child device according to the present embodiment.

FIG. 16 is a schematic diagram illustrating an example of the selection table stored in the selection table storage unit 18b. In the example illustrated in FIG. 16, the diagram is a diagram illustrating an example in which B=10 in FIG. 14. The selection table has the current ratio γ and a column of respective items of the selector terminals, as illustrated. The selection table is data in a two-dimensional table format including rows and columns, in which selector selection information is stored for each current ratio.

The data denoted with a sign P1 indicates that the selector 262b-n selects the terminal S0 when the current ratio γ is 0. The data denoted with a sign P2 indicates that the selector 262b-n selects the terminal S1 when the current ratio γ is greater than 0 and equal to or less than 0.1. The data denoted with a sign P10 indicates that the selector 262b-n selects the terminal S10 when the current ratio γ is greater than 0.9 and equal to or less than 1.

FIG. 17 is a graph indicating a relationship between the number B of capacitors and efficiency of energy transmission from the parent device to the child device. A vertical axis indicates the transmission efficiency (any scale), and a horizontal axis indicates the number B of capacitors.

Here, the transmission efficiency is a value obtained by dividing a sum of energies transmitted from all parent devices to all child devices by a sum of squares of the current flowing through the coil 23-n of the parent device (Joule heat consumed in the coil). In other words, the transmission efficiency is a value obtained by dividing the sum of the energies transmitted from all parent devices to all child devices by a sum of ohm losses of the coils.

The transmission efficiency increases as the number B of capacitors increases and is saturated when B is equal to about 8. In other words, it is shown that about 8 capacitors are sufficient.

Thus, in the present embodiment, the current control unit 26b-n generates an electrical signal determined by the current distribution determination unit 13b by limiting the power to be supplied from the high frequency power supply 4b. According to the configuration described above, in the present embodiment, the high frequency power supply can be shared among the respective parent devices 2b-n. Since the current control unit 26b-n includes the switches and the capacitors, cost can be reduced compared to a case in which a high frequency power supply is included in each parent device 2b-n.

Figure 18:
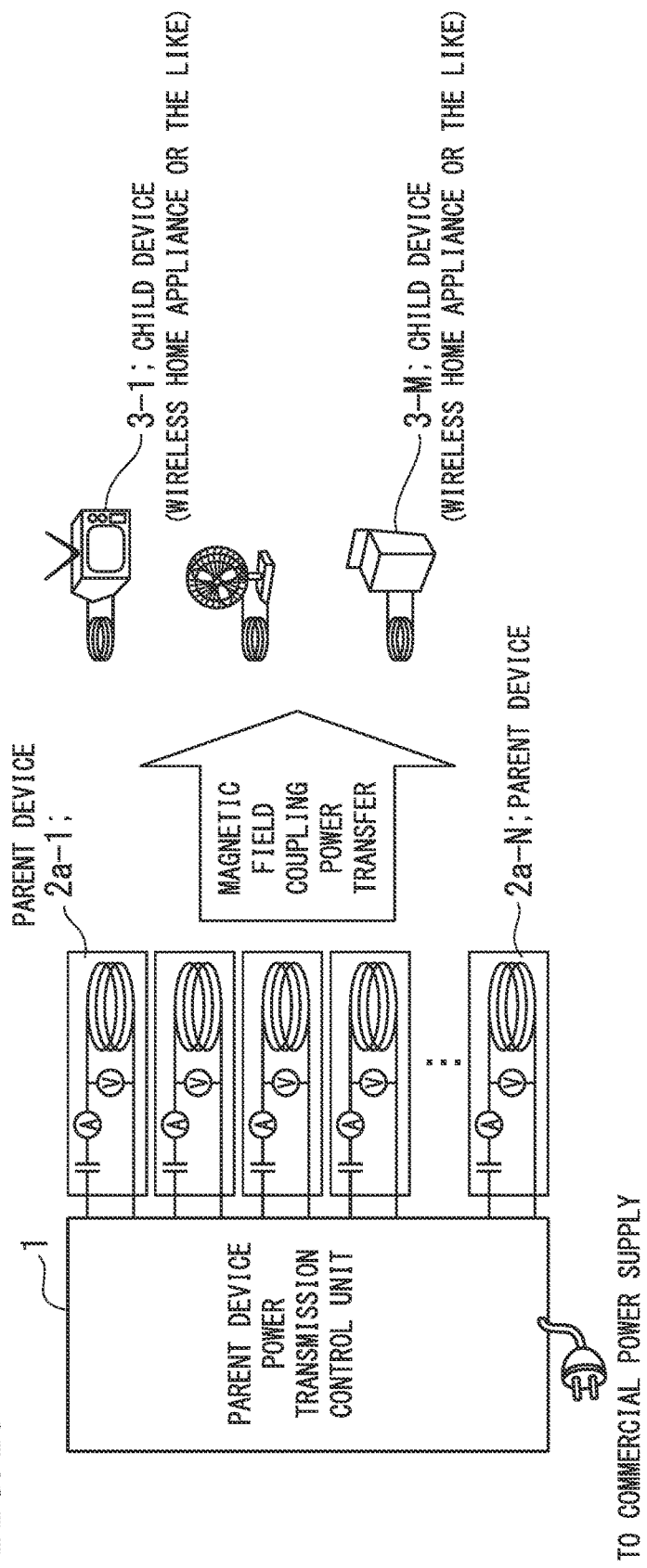
FIG. 18 is a schematic diagram of a wireless power transfer system according to a modification of FIG. 1.
Figure 19:
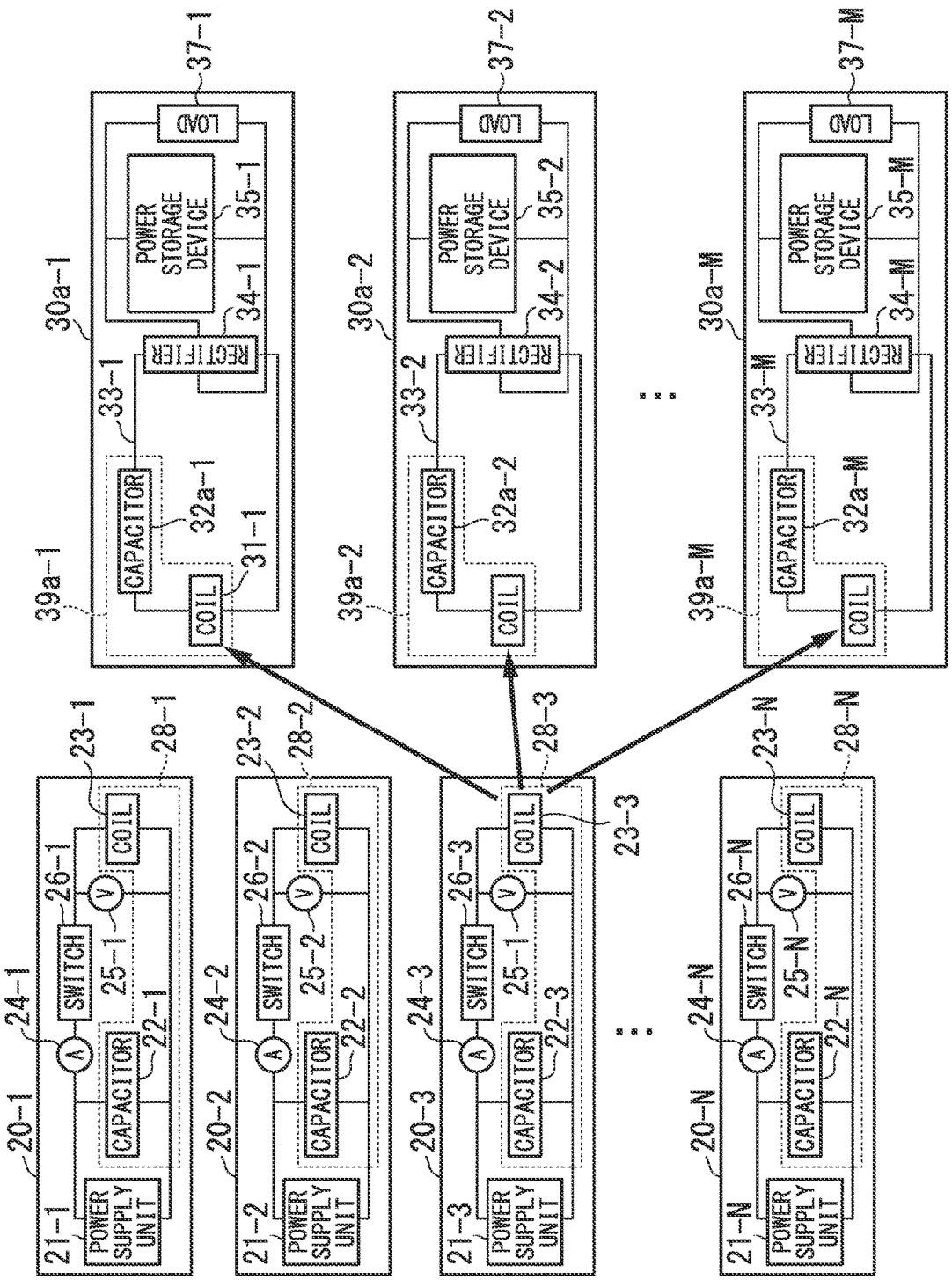
FIG. 19 is a schematic diagram of a wireless power transfer system according to a modification of FIG. 9.
Figure 20:
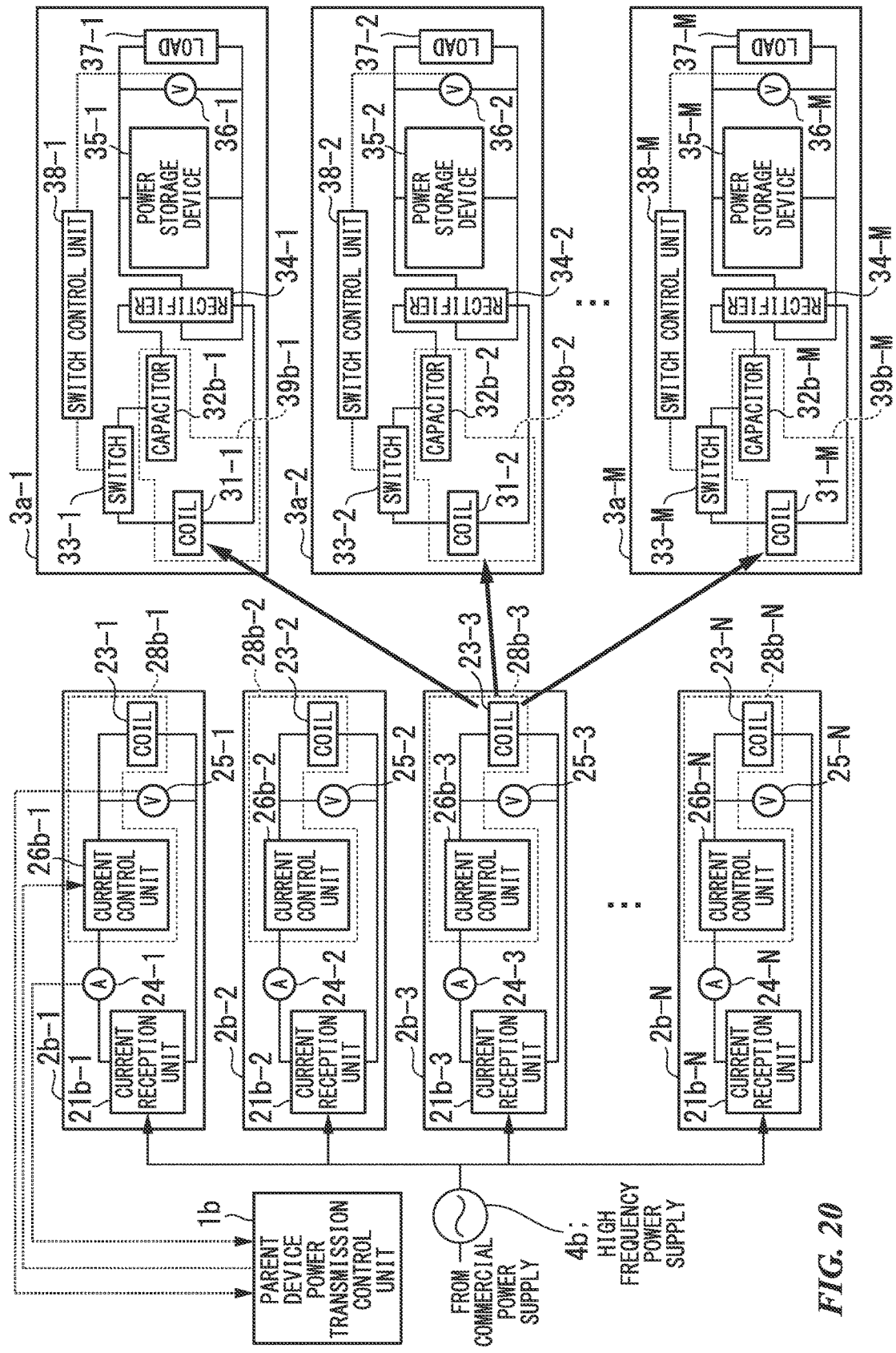
FIG. 20 is a schematic diagram of a wireless power transfer system according to a modification of FIG. 13A.

In the embodiment described above, while the example in which the coil and the capacitor are connected in parallel for resonance has been described, the coil and the capacitor may be connected in series, as illustrated in FIGS. 18 to 20. FIG. 18 is a schematic diagram of a wireless power transfer system according to a modification of FIG. 1. FIG. 19 is a schematic block diagram illustrating a configuration of parent devices and the child devices according to a modification of FIG. 9. FIG. 20 is a schematic block diagram illustrating a configuration of parent devices and the child devices according to a modification of FIG. 13A. Further, in FIG. 19, the power supply unit 21-n may be a connector which receives the current input from the parent device power transmission control unit 1. In FIG. 20, the current reception unit 21b-n may be a connector which receives the current input from the parent device power transmission control unit 1b.

The wireless power transfer system includes a parent device power transmission control unit 1, N parent devices 2a-1 to 2a-N (each referred to as a parent device 2a-n), and M child devices 3-1 to 3-M (each referred to as a child device 3-m), as illustrated in FIG. 18. In FIG. 18, an ammeter is an instrument which measures a complex current and can measure a current amplitude and phase of the complex current at the same time. A voltmeter is an instrument which measures a complex voltage and can measure a voltage amplitude and phase of the complex voltage at the same time.

As in FIG. 18, in the parent device 2a-n, a capacitor is connected in series with a coil via the ammeter.

Each of the M child devices 30a-1 to 30a-M (each referred to as a child device 30a-m) includes a rectifier 34-m, a power storage device 35-m, a load 37-m, and a power reception unit 39a-m-n, as illustrated in FIG. 19. The power reception unit 39a-m includes a coil 31-m, and a capacitor 32a-m. The configuration of the N parent device 20-1 to 20-N is the same as that in FIG. 9. In FIG. 19, signal lines of the parent device power transmission control unit 1 and the parent device 20-n, which are not illustrated, are connected, similar to FIG. 9, and synchronization is made. Further, the ammeter 24-1 is an instrument which measures a complex current and can measure a current amplitude and phase of the complex current at the same time. The voltmeter 25-1 is an instrument which measures a complex voltage and can measure a voltage amplitude and phase of the complex voltage at the same time.

As in FIG. 19, in the capacitor 32a-m, one terminal of the capacitor 32a-m is connected in series with one terminal of the coil 31-m, and the other terminal of the capacitor 32a-m is connected to one terminal of the input side of the rectifier 34-m.

Each of the M child devices 3a-1 to 3a-M (each referred to as a child device 3a-m) includes a switch 33-m, a rectifier 34-m, a power storage device 35-m, a voltmeter 36-m, a load 37-m, a switch control unit 38-m, and a power reception unit 39b-m, as illustrated in FIG. 20. The power reception unit 39a-m includes a coil 31-m and a capacitor 32b-m. The configuration of the N parent devices 2b-1 to 2b-N is the same as that in FIG. 13A. In FIG. 20, while signal lines indicate only a connection between the parent device power transmission control unit 1b and the parent device 2b-1, the signal lines are similarly connected to the parent device power transmission control unit 1b and the other parent device 2b-n and synchronization is made. Further, the ammeter 24-1 is an instrument which measures a complex current and can measure a current amplitude and phase of the complex current at the same time. The voltmeter 25-1 is an instrument which measures a complex voltage and can measure a voltage amplitude and phase of the complex voltage at the same time.

As in FIG. 20, the capacitor 32b-m is connected in series with the coil 31-m via the switch 33-m. In the capacitor 32b-m, one terminal of the capacitor 32b-m is connected to the other terminal of the switch 33-m, and the other terminal of the capacitor 32b-m is connected to one terminal of the input side of the rectifier 34-m.

In the embodiment described above, in the contactless power transfer system including the N parent device power transmission units (1 or 1b) (N is an integer equal to or more than 1), at least one child device power reception unit (child device 3-n), and the distribution determination unit (the current distribution determination unit 13) which determines the electrical signal to be supplied to the plurality of parent device power transmission units, the electrical signal has the current, the voltage or the linear combination amount of the current and the voltage as a component, the distribution determination unit determines the electrical signal to be supplied to the N parent device power transmission units to be proportional to the component of the eigenvalue vector for the non-zero eigenvalue of the matrix B when the matrix based on the matrix B of the real part of the impedance matrix or the real part of the admittance matrix when there is a child device power reception unit and on the electrical signal indicates dissipation of the energy.

The current distribution determination unit 13 makes a determination of the electrical signal to be supplied to the plurality of parent devices 2-n, for example, as follows.

When $Z_0$ is an impedance matrix when there is no child device 3-n and Z is an impedance matrix when there is the child device 3-n, the transmission loss Loss is expressed as shown in Equation (36) below and the transmission power Power is expressed as Equation (37) below.

$$\text{Loss} = \tilde{I}^* Re(Z_0) \vec{I} \quad (36)$$

$$\text{Power} = \tilde{I}^* Re(Z) \vec{I} \quad (37)$$

In Equations (36) and (37), I is a matrix having currents $I_1, \ldots, I_N$ as elements as shown in Equation (38) below. Further, the "~ (tilde)" above I denotes a transposed matrix, and the "* (asterisk)" to the upper right of I denotes a complex conjugate.

$$I = \begin{bmatrix} I_1 \\ \vdots \\ I_N \end{bmatrix} \quad (38)$$

When there is the child device 3-n, the current distribution determination unit 13 determines a current I vector (current pattern) to maximize the transmission power Power when the transmission loss Loss is constant. For example, the current distribution determination unit 13 drives the coil 23-$n$ of the parent device 2-$n$ using the current I vector to maximize a value obtained by dividing the transmission power Power by the transmission loss Loss.

Further, in the embodiment described above, the example in which the condition of constant loss is imposed as a condition of the current vector in which the energy P is maximized when the coils between the parent devices 2-$n$ are the same in Equation (22) has been described, but the present invention is not limited thereto. The coils between the parent device 2-$n$ may differ.

Next, a case in which the coils between the parent device 2-$n$ differ will be described.

First, an impedance matrix when there is no child device 3-$n$ is $Z_0$. Further, a real part $\mathrm{Re}(Z_0)$ of $Z_0$ is a Hermitian matrix. Therefore, an eigenvalue $\rho_1, \ldots, \rho_N$ of $\mathrm{Re}(Z_0)$ is a real number and has a value equal to or more than 0. In many cases, since $\rho_n = 0$ indicates resistance 0, $\rho_n$ is practically greater than 0. Therefore, $\mathrm{Re}(Z_0)$ may be considered to be regularized. The eigenvalue of the real part $\mathrm{Re}(Z_0)$ of $Z_0$ is indicated by $\rho_1, \ldots, \rho_N$ (where $\rho_1, \ldots, \rho_N$ are values equal to or more than 0) and a standardized eigenvalue vector is expressed as shown in Equation (39) below. N is the number of parent devices 2-$n$. The matrix J is a unitary N×N matrix.

$$J = [J_1 \ldots J_N] \tag{39}$$

Using Equation (22), $\mathrm{Re}(Z_0)$ is expressed as shown in Equation (40) below.

$$\mathrm{Re}(Z_0) = J \begin{bmatrix} \sqrt{\rho_1} & & \\ & \ddots & \\ & & \sqrt{\rho_N} \end{bmatrix} \begin{bmatrix} \sqrt{\rho_1} & & \\ & \ddots & \\ & & \sqrt{\rho_N} \end{bmatrix} J^{-1} \tag{40}$$

$$= \sqrt{\tilde{\rho}}^* \sqrt{\rho}$$

$$= \sqrt{\tilde{\rho}} \sqrt{\rho}$$

However, in Equation (40), $\sqrt{\rho}$ is expressed by Equation (41) below. In Equations (39) and (40), the impedance matrix $Z_0$ is stored as a table in the storage unit 16 in advance. The current distribution determination unit 13 calculates the eigenvalue of the $\mathrm{Re}(Z_0)$ and a standardized eigenvalue vector using the impedance matrix $Z_0$ stored in the storage unit 16.

$$\sqrt{\rho} \equiv \begin{bmatrix} \sqrt{\rho_1} & & \\ & \ddots & \\ & & \sqrt{\rho_N} \end{bmatrix} J^{-1} \tag{41}$$

Then, the impedance matrix when there is the child device 3-$n$ is Z. This impedance matrix Z is a value changed with an arrangement or the number of the child devices 3-$n$. Therefore, the current distribution determination unit 13 calculates the impedance matrix Z using the measured current and voltage values. Here, energy T is expressed as shown in Equation (42) below and the eigenvector a for the maximum eigenvalue of the energy T is expressed as shown in Equation (43) below.

$$T \equiv \left(\sqrt{\tilde{\rho}}^*\right)^{-1} \mathrm{Re}(Z) \sqrt{\rho}^{-1} \tag{42}$$

$$= \begin{bmatrix} \sqrt{\rho_1}^{-1} & & \\ & \ddots & \\ & & \sqrt{\rho_N}^{-1} \end{bmatrix} J^{-1} \mathrm{Re}(Z) J \begin{bmatrix} \sqrt{\rho_1}^{-1} & & \\ & \ddots & \\ & & \sqrt{\rho_N}^{-1} \end{bmatrix}$$

$$a \equiv \sqrt{\rho} I \tag{43}$$

$$= \begin{bmatrix} \sqrt{\rho_1} & & \\ & \ddots & \\ & & \sqrt{\rho_N} \end{bmatrix} J^{-1} I$$

Further, in Equation (43), I denotes a column vector of the current flowing through the parent device 2-$n$ when there is the child device 3-$n$.

Here, when the transmission loss Loss is approximately expressed as shown in Equation (44) below and has a constant value, maximizing the transmission power Power expressed as shown in Equation (45) below corresponds to maximizing the transmission power Power of Equation (47) below expressed using the eigenvector a and the energy T under a condition that the transmission Loss of Equation (46) below expressed using the eigenvector a be constant.

$$\mathrm{Loss} = \tilde{I}^* \mathrm{Re}(Z_0) I \tag{44}$$

$$\mathrm{Power} = \tilde{I}^* \mathrm{Re}(Z) I \tag{45}$$

$$\mathrm{Loss} = \tilde{I}^* \mathrm{Re}(Z_0) I \tag{46}$$
$$= \tilde{a}^* a$$

$$\mathrm{Power} = \tilde{I}^* \mathrm{Re}(Z) I \tag{47}$$
$$= \tilde{a}^* T a$$

The current distribution determination unit 13 calculates the energy T using Equation (42) to calculate the eigenvalue of this energy T. Also, the current distribution determination unit 13 extracts a maximum eigenvalue from among the eigenvalues and calculates the eigenvector a for the extracted maximum eigenvalue. The current distribution determination unit 13 substitutes the calculated eigenvector a into the following Equation (48) obtained by expressing Equation (43) using I to calculate a matrix I of a current component.

$$I = J \begin{bmatrix} \sqrt{\rho_1}^{-1} & & \\ & \ddots & \\ & & \sqrt{\rho_N}^{-1} \end{bmatrix} a \tag{48}$$

Even when the coils between the parent devices 2-$n$ differ, it is possible to maximize the transmission power Power per energy dissipated in the coil of the parent device 2-$n$ when there is no child device 3-$m$ by applying the matrix I of the current component calculated in this way to the parent device 2-$n$.

As described above, according to the present invention, in the contactless power transfer system including the N (N is an integer equal to or more than 2) parent device power transmission units (parent device 2-$n$), at least one child device power reception unit (child device 3-$m$), and the distribution determination unit (current distribution determination unit 13) which determines the electrical signal to be supplied to the N parent device power transmission units, the electrical signal has a current, a voltage or a linear combination amount of the current and the voltage as a component, and when an N-dimensional vector of N rows×1 column having the electrical signal supplied to each parent device power transmission unit as a component is X, the distribution determination unit sets a matrix A (a matrix producing a quadratic form) as a regularized Hermitian matrix of N rows×N columns, and when a scalar of Equation (1) is positive, a quadratic form matrix of the electrical signal when the child device power reception unit functions is a matrix B which expresses dissipation of the energy and is Hermite of N rows×N columns having a coefficient thereof as a component, a scalar of Equation (2) indicates energy consumption, and the matrix A is expressed as shown in Equation (3), the distribution determination unit determines an electrical signal to be proportional to a component of a vector $C^{-1}Y$ obtained by multiplying a linear combination of an eigenvector Y for the non-zero eigenvalue of the matrix D (energy T (Expression 42)) expressed by Equation (4) by a matrix C ($\sqrt{\rho}$) to the power of minus one from the left.

Here, if an element of the matrix X is $x_n$ (n=1, ..., N) and an element of the matrix A is $a_{ij}$ ($a_{ij}=a_{ji}*$), Equation (1) is expressed as shown in Equation (49) below.

$$\sum_{i=1}^{N}\sum_{j=1}^{N} a_{ij} x_i^* x_j \qquad (49)$$

Further, if an element of the matrix B is $b_{ij}$ ($b_{ij}=b_{ji}*$), Equation (2) is expressed as shown in Equation (50) below.

$$\sum_{i=1}^{N}\sum_{j=1}^{N} b_{ij} x_i^* x_j \qquad (50)$$

In this case, the matrix A is E (unit matrix). The matrix C is the same as a complex conjugate of the transposed matrix of the matrix C and as the unit matrix E. The matrix D is the same as a matrix obtained by multiplying of the unit matrix E from the right and left of Re(Z), that is, is the same as Re(Z). Since Y is an eigenvector of Re(Z), the vector $C^{-1}Y$ is the same as the vector EY, that is, is the same as the eigenvector Y.

Further, when the coils 23-n between the parent devices 2-n are the same, the matrix A and the matrix B described above are unit matrices, respectively. Further, the matrix A is a real part $Re(Z_0)$ of the impedance matrix $Z_0$ when there is no child device. Further, the matrix A is a real part of an inductance matrix of an antenna based on the coil 23-n. Further, the matrix A is a matrix in which Equation (49) is a sum of energies of a field accumulated in a space of a certain specific area.

While the method of determining a maximum amount of energy per loss has been described above, this may be a quadratic form (reference matrix) with definite positive values (eigenvalues all being positive) even when it is not defined by the loss. For example, a case in which replacing with $Re(Z_0)$ (reference matrix) described above is performed and a value obtained by multiplying a mutual inductance matrix (reference matrix) between the parent devices 2-n expressed as shown in Equation (51) below by ½ is introduced will be described.

$$\frac{1}{2}L = \frac{1}{2}\begin{bmatrix} L_{11} & \cdots & L_{1N} \\ \vdots & \ddots & \vdots \\ L_{N1} & \cdots & L_{NN} \end{bmatrix} \qquad (51)$$

Further, the energy E shown in Equation (52) below indicates energy of the magnetic field induced by the parent device 2-n, which is accumulated in the entire space.

$$E = \frac{1}{2}\tilde{I}^* L I \qquad (52)$$

Therefore, replacing with $Re(Z_0)$ and rewriting as (½)L of Equation (51) resolves a problem associated with maximum transmission power when the energy accumulated in the magnetic field induced by the parent device 2-n and accumulated in the entire space is constant.

Further, when energy E' of the magnetic field accumulated in a certain specific space (not the entire space) is expressed as shown in Equation (53) below, the problem associated with the maximum transmission power problem when the magnetic field energy accumulated in the specific space is constant is resolved.

This energy E' is energy of the magnetic field induced by only the parent device 2-n if L is an inductance matrix when there is no child device herein. Further, the energy E' is energy of the magnetic field induced by the parent device 2-n and the child device 3-m if L is an inductance matrix when there is a child device.

$$E = \frac{1}{2}\tilde{I}^* L' I \qquad (53)$$

However, in Equation (53), L' is expressed by Equation (54) below.

$$L' = \begin{bmatrix} L'_{11} & \cdots & L'_{1N} \\ \vdots & \ddots & \vdots \\ L'_{N1} & \cdots & L'_{NN} \end{bmatrix} \qquad (54)$$

Fourth Embodiment

Hereinafter, a fourth embodiment of the present invention will be described. In a wireless power transfer system according to the present embodiment, one high frequency power supply is shared among N parent devices, similar to the third embodiment. In the present embodiment, an example in which a current control unit includes a resonant circuit will be described.

Figure 21:
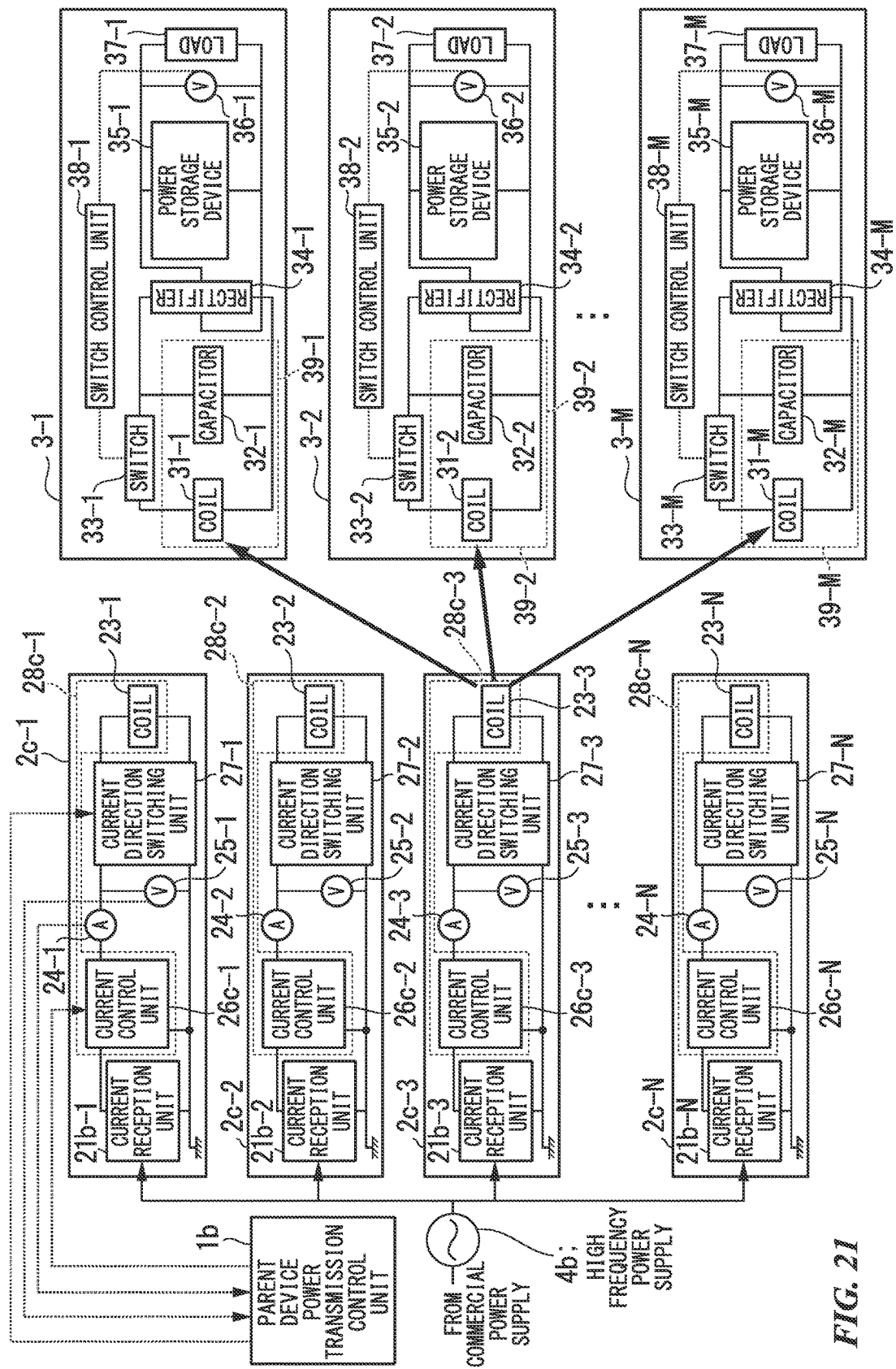
FIG. 21 is a schematic block diagram illustrating a configuration of a parent device and a child device according to a fourth embodiment of the present invention.

FIG. 21 is a schematic block diagram illustrating a configuration of a parent device 2c-n and a child device 3-m according to the present embodiment. Since a configuration other than parent device 2c-n in the present embodiment is the same as in the third embodiment, an explanation thereof is omitted.

Each of the N parent devices 2c-1 to 2c-N (each referred to as a parent device 2c-n) includes a current reception unit 21b-n, an ammeter 24-n, a voltmeter 25-n, a current direction switching unit 27-n and a power transmission unit 28c-n, as illustrated in FIG. 21. The power transmission unit 28c-n includes a current control unit (control unit) 26c-n and a coil 23-n. In the third embodiment, one terminal of the current control unit 26b-n is connected to one terminal of the current reception unit 21b-n via the ammeter 24-1, and the other terminal is connected to one terminal of the voltmeter 25-n and one terminal of the coil 23-n (see FIG. 13A). On the other hand, in the present embodiment, one terminal of the current control unit 26c-n is directly connected to one terminal of the current reception unit 21b-n, and the other terminal is connected to one terminal of the voltmeter 25-n and one terminal of the coil 23-n via the ammeter 24-1. In FIG. 21, signal lines indicate only connection between the parent device power transmission control unit 1b and the parent device 2c-1, but the signal lines are similarly connected to the parent device power transmission control unit 1b and the other parent device 2c-n and synchronization is made. Further, the ammeter 24-1 is an instrument which measures a complex current and can measure a current amplitude and phase of the complex current at the same time. The voltmeter 25-1 is an instrument which measures a complex voltage and can measure a voltage amplitude and phase of the complex voltage at the same time. Further, the current reception unit 21b-n may be a connector which receives a current input from the parent device power transmission control unit 1b.

The current control unit 26c-n controls a current flowing through the coil 23-n by limiting a current input from current reception unit 21b-n based on the selector switching signal generated by the parent device power transmission control unit 1b.

The current direction switching unit 27-n switches the direction of the current flowing through the coil 23-n based on the current direction switching signal generated by the parent device power transmission control unit 1b.

Figure 22:
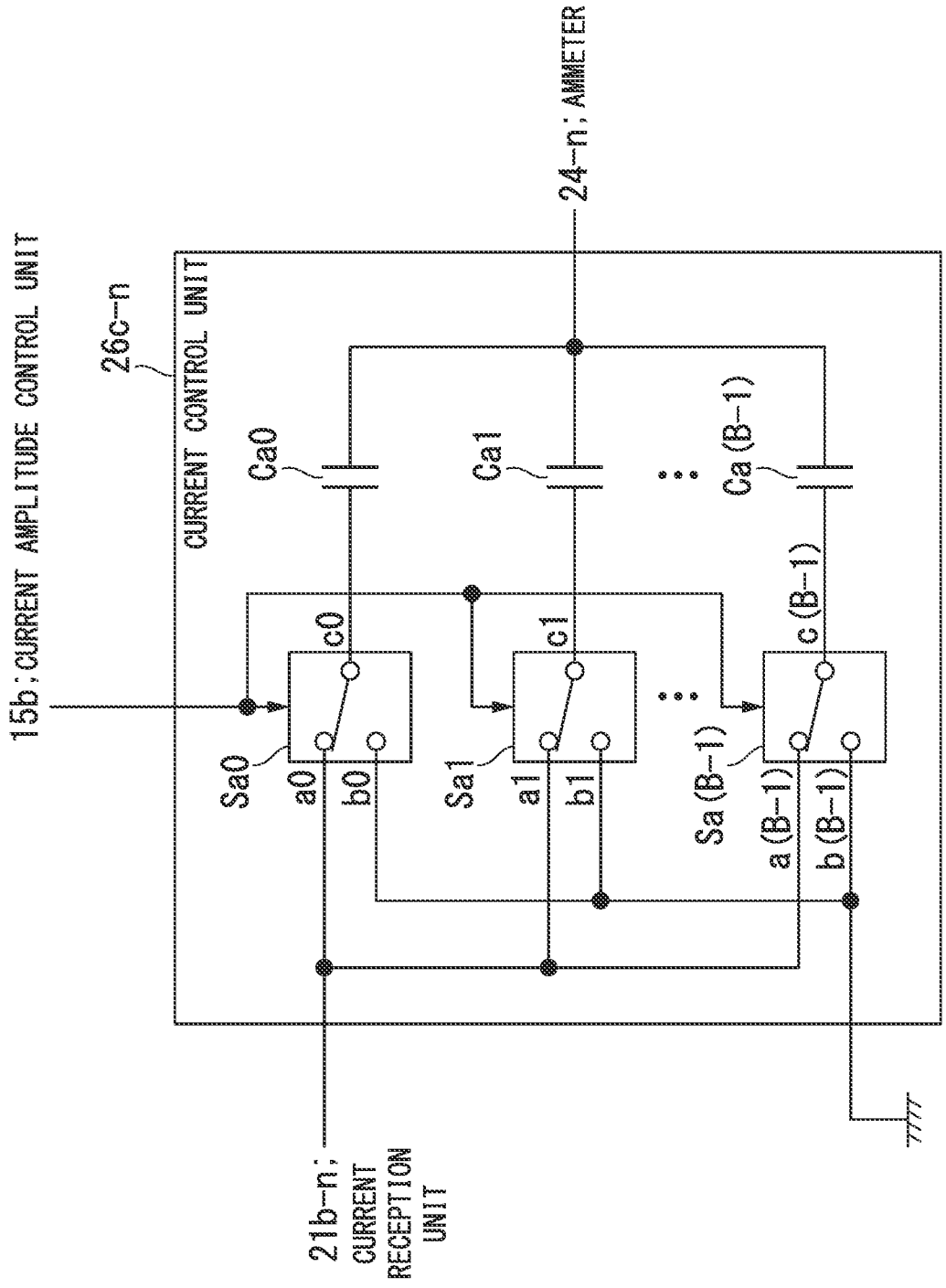
FIG. 22 is a block diagram illustrating a configuration of a current control unit according to the present embodiment.

FIG. 22 is a block diagram illustrating a configuration of the current control unit 26c-n according to the present embodiment. The current control unit 26c-n includes B capacitors Ca0 to Ca(B−1) (B is a positive integer) and B selectors (switching units) Sa0 to Sa(B−1).

The selectors Sa0 to Sa(B−1) include two input terminals (a first port and a second port) a (a0, a1, . . . , a(B−1)) and b (b0, b1, b(B−1)), one output terminal (a third port) c (c0, c1, c(B−1)), and a port switching switch which switches to connect one of the input terminals to the output terminal. In the selectors Sa0 to Sa(B−1), one input terminal a or b is connected to the output terminal according to the selector switching signal generated by the current amplitude control unit 15b of the parent device power transmission control unit 1b. The selector Sa0 includes one input terminal a0 connected to one terminal of the current reception unit 21b-n, the other input terminal b0 connected to the other terminal of the current reception unit 21b-n and grounded, and an output terminal c0 connected to one terminal of the capacitor Ca0. Similarly, the selector Sak (k is an integer ranging from 1 to B−1) includes one input terminal ak connected to the one terminal of the current reception unit 21b-n, the other input terminal bk that is connected to the other terminal of the current reception unit 21b-n and grounded, and an output terminal ck connected to one terminal of the coil Cak. The selectors Sa0 to Sa(B−1) are, for example, relays.

The other terminals of the capacitors Ca0 to Ca(B−1) are connected and a connection point thereof is connected to the ammeter 24-n.

The selector and the capacitor in the parent device 2-n when the selectors Sa0 to Sa(B−1) are switched according to the selector switching signal will be described herein. When the selectors Sa0 to Sa(B−1) are switched, one terminal of the capacitors Ca0 to Ca(B−1) is connected to the current reception unit 21b-n or grounded. Therefore, the selectors Sa0 to Sa(B−1) and the capacitors Ca0 to Ca(B−1) indicate an equivalent circuit of a variable capacitor connected in series with the coil Ln connected via the ammeter 24-n and a variable capacitor connected in parallel with the coil Ln.

Figure 23:
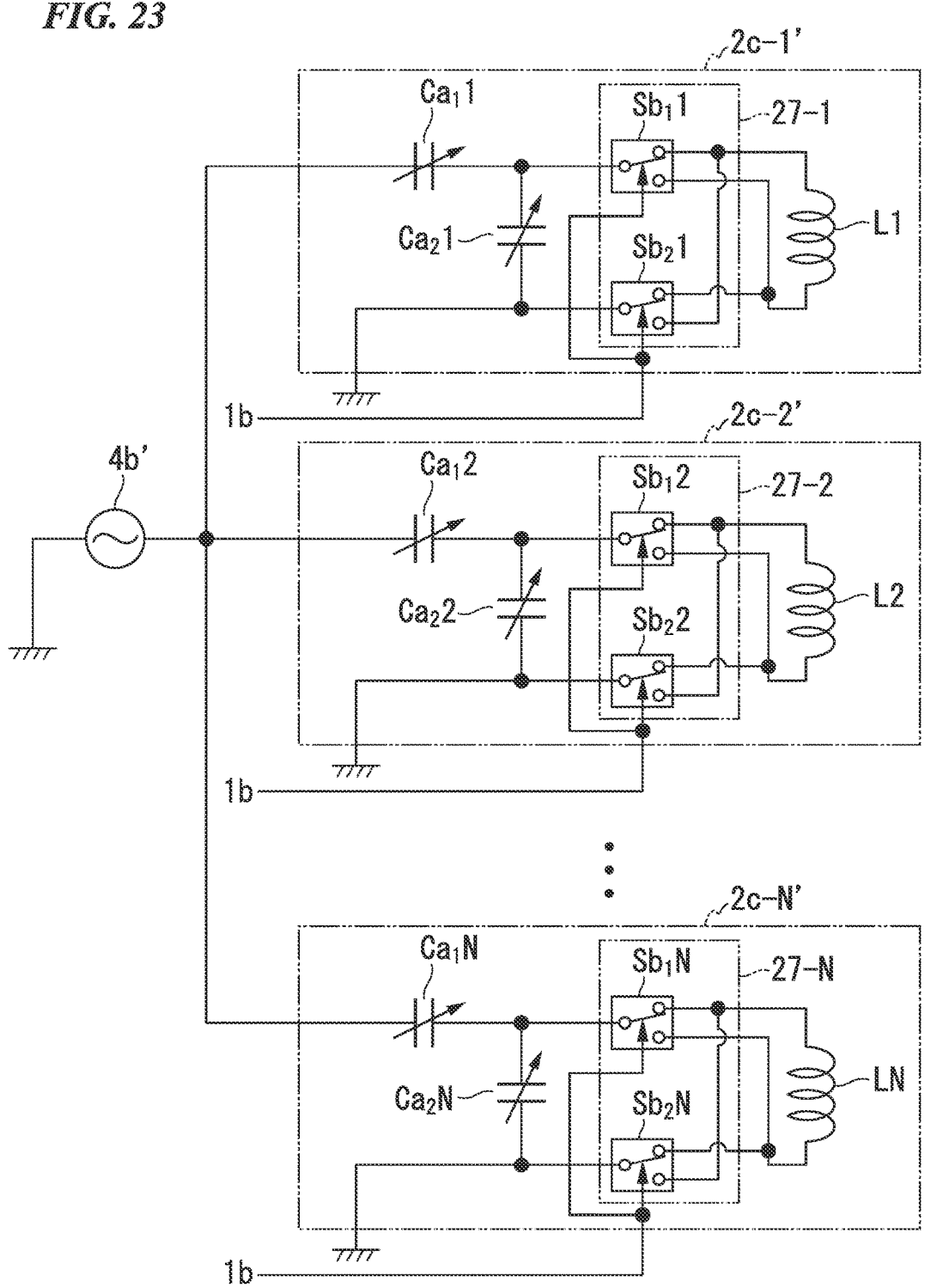
FIG. 23 is an equivalent circuit diagram of a parent device according to the present embodiment.

FIG. 23 is an equivalent circuit diagram of the parent device 2c-n according to the present embodiment. Each of N parent devices 2c-1' to 2c-N' (each referred to as a parent device 2c-n') including a resonant circuit includes a variable capacitor $Ca_1n$, a variable capacitor $Ca_2n$, a coil Ln, and a current direction switching unit 27-n.

The current direction switching unit 27-n includes selectors $Sb_1n$ and $Sb_2n$. For switching of the selectors $Sb_1n$ and $Sb_2n$, the current direction switching unit 27-n switches the direction of the current flowing through the coil 23-n in conjunction based on the current direction switching signal generated by the parent device power transmission control unit 1b. For example, the selectors $Sb_1n$ and $Sb_2n$ are relays.

The variable capacitor $Ca_1n$ may be expressed by an equivalent circuit in which one terminal is connected to one terminal of (a current reception unit including) a high frequency power supply 4b', and the other terminal is connected to one terminal of the variable capacitor $Ca_2n$ and one terminal of the coil Ln.

As illustrated in FIG. 23, a resonant frequency $\omega_1$ of the parent device 2c-1' is $1/(\sqrt{(L1(Ca_11+Ca_21))})$. Similarly, it is desirable for a resonant frequency $\omega_2$ of the parent device 2c-2' to be $1/(\sqrt{(L2(Ca_12+Ca_22))})$, a resonant frequency $\omega_N$ of the parent device 2c-N' to be $1/(\sqrt{(LN(Ca_1N+Ca_2N))})$, and the respective resonance frequencies $\omega_n$ to be equal. Further, it is desirable for the mutual inductance between the parent devices 2c-n to be smaller than the mutual inductance between the parent device 2c-n and the child device 3-m.

In other words, in FIG. 22, when it is considered that total capacitances of the capacitors Ca0 to Ca(B−1) included in the current control unit 26c-n of each parent device 2c-n are equal to each other, inductances of the coils L0 to L(B−1) are equal to each other, and impedance of the output unit of the current reception unit 21b-n connected to one terminal of the capacitors Ca0 to Ca(B−1) is about 0, the resonance frequencies w of the respective parent devices 2c-n are equal even when the selectors Sa0 to Sa(B−1) are switched. A square $(\omega_n^2)$ of the resonant frequency $\omega_n$ of each parent device 2c-n is expressed as shown in Equation (55) below. Further, when the voltage of the high frequency power supply 4b is $V_0$, a voltage $V_1$ applied to each coil 23-n of each parent device 2c-n is expressed as shown in Equation (56) below.

$$\omega^2 = L\left(\sum_{i=0}^{B-1} C_i\right) \tag{55}$$

$$V_l = \frac{\sum (\text{total capacitance of capacitor connected to power supply})}{\sum_{i=1}^{B} C_i} V_0 \tag{56}$$

The current distribution determination unit 13b sequentially switches the selectors Sa0 to Sa(B−1) of the parent device 2c-1. For example, only the selector Sa0 is switched to the current reception unit 21b-n and the other selectors Sa1 to Sa(B−1) are switched to be grounded. The current distribution determination unit 13b writes complex current information based on a measurement value of the ammeter 24-n in this case to the storage unit 16. The current distribution determination unit 13b switches the selectors Sa1 to Sa(B−1) so that a current flowing through a connection point (a second connection point) between the capacitors Ca0 to Ca(B−1) and the coil L(B−1) is a desired current, based on the value stored in the storage unit 16. After the selectors Sa1 to Sa(B−1) are switched, for example, the current amplitude control unit 15b acquires the voltage applied to the coil L(B−1) using the voltmeter 25-n, and determines a current ratio for supply to the parent device 2c-n as described above based on the acquired current and voltage values. The current distribution determination unit 13b outputs information indicating the determined current ratio to the current amplitude control unit 15b.

When the resonant circuit is not included, it may be difficult for the current to flow if a voltage value input for resonance does not increase (for example, the third embodiment). On the other hand, according to the present embodiment, since the resonant circuit is included, there is an effect that the current flows even when the voltage value is not increased. Further, in the present embodiment, it is possible to realize a constant resonant frequency of the parent device 2c-n.

Further, in the present embodiment, the parent device power transmission control unit 1b measures the current value flowing through the ammeter 24-1 and switches the selectors Sa0 to Sa(B−1) of the parent device 2c-n so that a predetermined current flows, such that the parent device 2c-n can serve as a current source. Further, in FIG. 22, the capacitance of the capacitor is $C_{i+1}=C_i \times 2$ (i is an integer equal to or more than 0), such that a number of voltage values or current values can be selected by a small number of capacitors and selectors.

Further, control can be performed using the two variable capacitors Ca$_1$n and Ca$_2$n of the equivalent circuit illustrated in FIG. 23. In this case, the parent device power transmission control unit 1b performs control so that a total capacitance of the variable capacitors Ca$_1$n and Ca$_2$n is constant.

Fifth Embodiment

Figure 24:
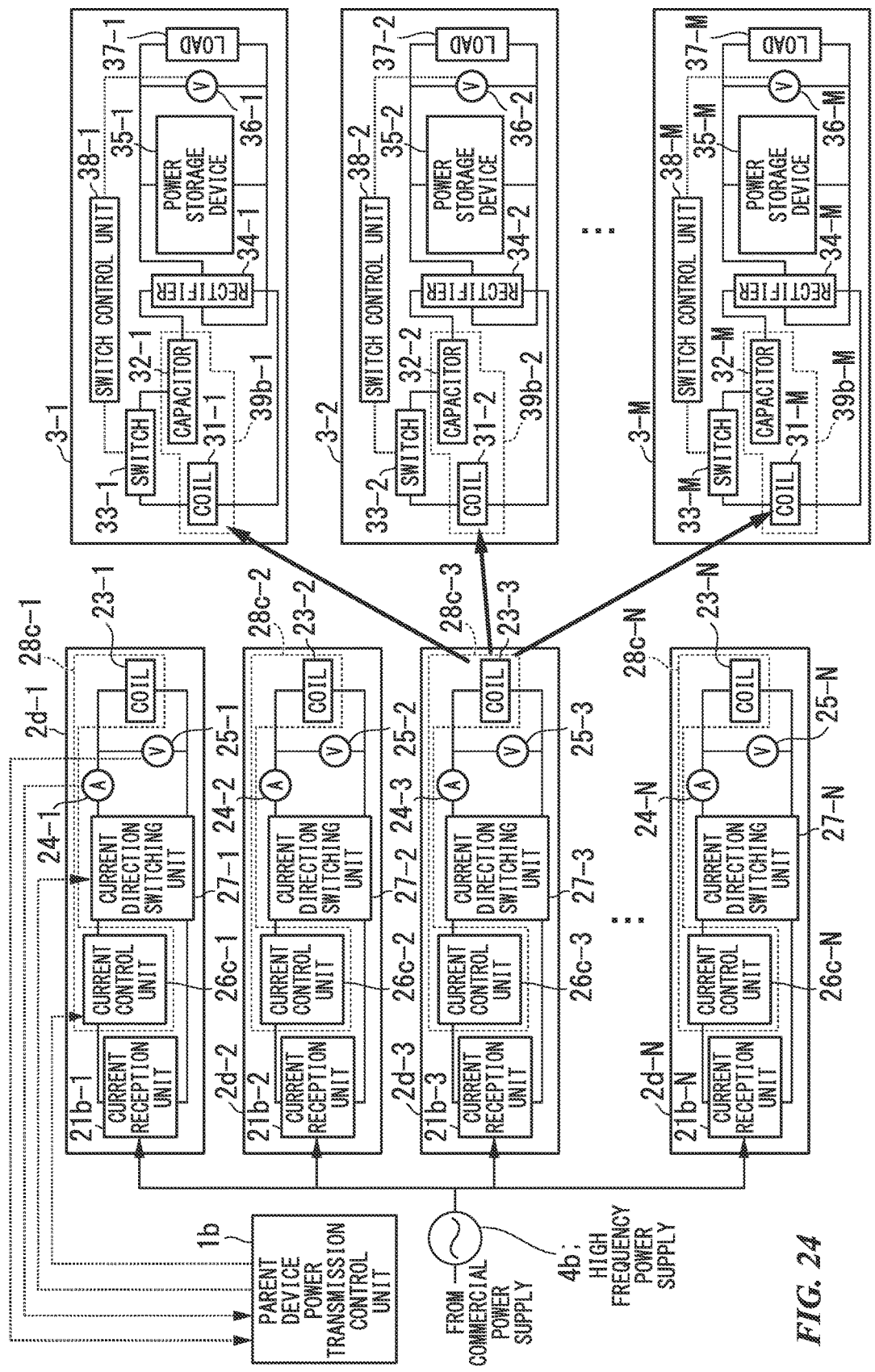
FIG. 24 is a schematic block diagram illustrating a configuration of a parent device and a child device according to a fifth embodiment of the present invention.

Hereinafter, a fifth embodiment of the present invention will be described. FIG. 24 is a schematic block diagram illustrating a configuration of the parent device 2d-n and the child device 3-m according to the present embodiment. Since a configuration other than parent device 2d-n in the present embodiment is the same as that in the third embodiment, an explanation thereof is omitted. Further, the configuration of the child device 3-m is the same as that in FIG. 20. Further, the current reception unit 21b-n may be a connector which receives a current input from the parent device power transmission control unit 1b.

Each of the N parent devices 2d-1 to 2d-N (each referred to as a parent device 2d-n) includes a current reception unit 21b-n, an ammeter 24-n, a voltmeter 25-n, a current direction switching unit 27-n and a power transmission unit 28c-n, as illustrated in FIG. 24. Also, the power transmission unit 28c-n includes a current control unit (a control unit) 26c-n and a coil 23-n.

In FIG. 24, signal lines indicate only a connection between the parent device power transmission control unit 1b and the parent device 2d-1, but the signal lines are similarly connected to the parent device power transmission control unit 1b and the other parent device 2d-n and synchronization is made. Further, the ammeter 24-1 is an instrument which measures a complex current and can measure a current amplitude and phase of the complex current at the same time. The voltmeter 25-1 is an instrument which measures a complex voltage and can measure a voltage amplitude and phase of the complex voltage at the same time.

Further, a configuration of the current control unit 26c-n in FIG. 24 is the same configuration as that in FIG. 22 of the fourth embodiment. The configuration of the current direction switching unit 27-n is the same as that in FIG. 23 in the fourth embodiment.

In the fourth embodiment (FIG. 21), if the measurement and the switching of the switch are repeated as described in the second embodiment, procedures are as follows.

First, the parent device power transmission control unit 1b measures a current flowing through the coil 23-n using the ammeter 24-n. Then, the parent device power transmission control unit 1b switches the selectors Sa0 to Sa(B−1) (see FIG. 22) of the current control unit 26c-n based on the measured current, such that the current value is a desired value. Then, the parent device power transmission control unit 1b measures the voltage with the same phase applied to the coil 23-n in this case and uses the repeating method described in the second embodiment.

However, since it is necessary to quickly switch the selector of the current control unit 26c-n in order to control the current value into a desired value, realization is somewhat difficult when the selector is a mechanical relay.

Therefore, a calculation method applicable even when the selector is a mechanical relay will be described in the fourth embodiment.

Main procedures are as follows.

Procedure (1): The parent device power transmission control unit 1b controls to cause all the output terminals c0 to c(B−1) of the selectors Sa0 to Sa(B−1) in the current control unit 26c-n to be connected to the power supply.

Procedure (2): Next, the parent device power transmission control unit 1b determines $V_{(k+1)}$ so that a next current flowing through the connection point of the capacitors Ca0 to Ca(B−1) of the current control unit 26c-n is as shown in Equation (57) below. Further, k is an integer equal to or more than 0.

$$V_{(k+1)}=\alpha_{(k)}(V_{(k)}-\beta I_{(k)}) \quad (57)$$

Procedure (3): Procedure (2) is repeated.

Next, a convergence state when (3) is repeated will be described.

In FIG. 24, when the parent device 2d-n and the child device 3-m are matched together and magnetic field coupling between the parent devices 2d-n and between the child devices 3-m is small, expression can be made using an (N×M)×(N×M) matrix, as shown in Equation (58) below.

$$\begin{bmatrix} V_P \\ -RI_c \end{bmatrix} = \begin{bmatrix} \gamma & j\omega L_{PC} \\ j\omega L_{CP} & 0 \end{bmatrix} \begin{bmatrix} I_P \\ I_C \end{bmatrix} \quad (58)$$

In Equation (58), $I_P$ is an (N×1) matrix having a current flowing through the coil 23-n of the parent device 2d-n as a component, and $I_C$ is an (M×1) matrix having a current flowing through the coil 31-m of the child device 3-m as a component, and a current flowing from the load of the child device 3-m to the coil 23-m is assumed to be positive. $V_P$ is a voltage applied to the coil 23-n of the parent device 2d-n. Further, R is a load matrix of the child device 3-m. Further, $L_{PC}$ is a mutual inductance between the coils 23-n of the respective parent devices 2d-n viewed from the coil 31-m of the child device 3-m. $L_{CP}$ is a mutual inductance between the coils 31-m of the child devices 3-m viewed from the coil 23-n of each parent device 2d-n. γ is a real diagonal matrix having an ohm loss of the coil 23-n as a diagonal component.

Further, a transposed matrix of $L_{PC}$ is the same as $L_{PC}$. Further, in Equation (58), an upper left N×M matrix being the real diagonal matrix indicates that coupling of the coils 23-$n$ between the parent devices 2$d$-$n$ is negligible and the capacitors Ca0 to Ca(B−1) of the current control unit 26$c$-$n$ match the coil 23-$n$. Further, resistance of the coil 31-$m$ of the child device 3-$m$ is excluded herein for simplification.

When $I_C$ is removed from Equation (58) to obtain a relationship between $V_P$ and $I_P$, the relationship is as shown in Equation (59) below.

$$V_P = (r + \omega^2 L_{PC} R^{-1} L_{CP}) I_P \qquad (59)$$
$$= (\text{Re}(Y)) I_P$$

Here, when the equation is solved for $I_P$, $I_P$ is as shown in Equation (60) below.

$$I_P = Y \cdot V_P \qquad (60)$$

In Equation (60), the admittance Y is as shown in Equation (61) below.

$$Y \equiv (r + \omega^2 L_{PC} R^{-1} L_{CP})^{-1} \qquad (61)$$

In Equation (61), since the admittance Y is a real diagonal matrix, this is written as Re(Y). Therefore, $V_P$ may be expressed as a product of Re(Y) and as $I_P$, shown in Equation (59).

If the voltage $V_P$ is a real number since Re(Y) is a real number as shown in Equation (61), the current $I_P$ is a real number. Therefore, $\alpha_{(k)}$ and $\beta$ of Equation (57) are real numbers too. When $I_P = I_{(k)}$, $V_{(k+1)}$ is expressed as shown in Equation (62) below.

$$V_{(k+1)} = \alpha_{(k)} (V_{(k)} - \beta I_{(k)}) \qquad (62)$$
$$= \alpha_{(k)} (1 - \beta \text{Re}(Y)) I_{(k)}$$

$V_{(k)}$ is expressed as shown in Equation (63) below from Equation (62).

$$V_{(k)} = \alpha_{(k)} (1 - \beta \text{Re}(Y)) \alpha_{(k-1)} (1 - \beta \text{Re}(Y)) \ldots \alpha_{(0)} (1 - \beta \text{Re}(Y)) I_{(0)} \qquad (63)$$
$$= \alpha_{(k)} \alpha_{(k-1)} \ldots \alpha_{(0)} (1 - \beta \text{Re}(Y))^k I_{(0)}$$

When the eigenvalue of Re(Y) is λn in Equation (63), the eigenvalue of (1−βRe(Y)) is as shown in Equation (64) below since λn is a real number and is equal to or more than 0.

$$1 - \beta \lambda_n \qquad (64)$$

Figure 25:
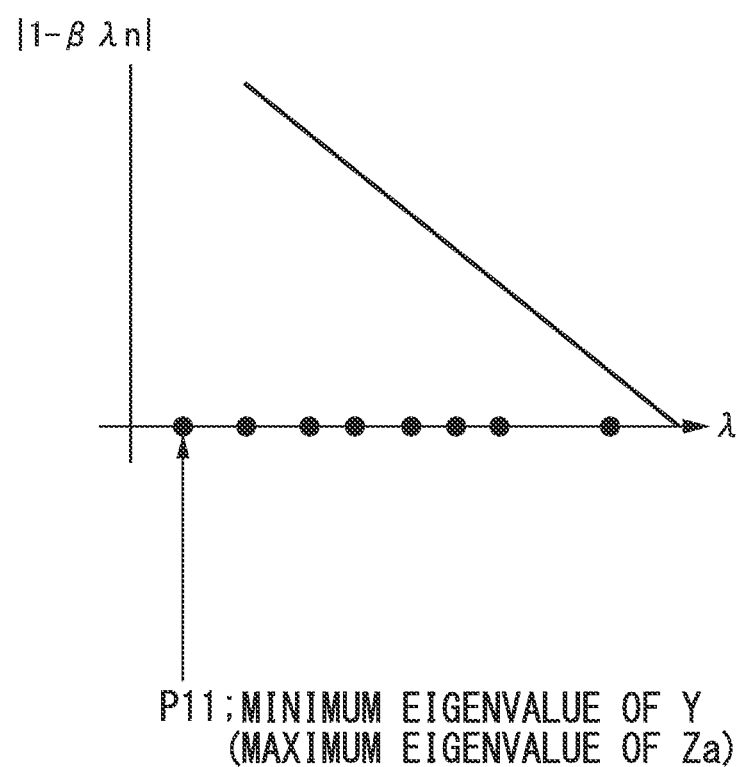
FIG. 25 is a diagram illustrating a relationship between an eigenvalue $\lambda$ of Re(Y) and $|1-\beta\lambda_n|$.

FIG. 25 is a diagram illustrating a relationship between the eigenvalue λ of Re(Y) and $|1-\beta\lambda_n|$. In FIG. 25, a horizontal axis is a fixed value λ, and a vertical axis is $|1-\beta\lambda_n|$.

As in FIG. 25, Equation (65) below converges on the eigenvector taking a maximum value. As a result, if β is determined so that Equation (65) is maximized in the minimum eigenvalue (P11) of the admittance Y, the converging vector converges on the maximum eigenvalue of the impedance $Z_A$ of the coil 23-$n$.

$$|1-\beta\lambda_n| \qquad (65)$$

As described above, according to the present embodiment, since the selector need not be frequently switched for the current value to be a desired value, it is applicable even when the selector is a mechanical relay.

Further, in each embodiment described above, it is preferable for the output of the high frequency power supply 4$b$ to be "0" before the switch switching signal is output. Accordingly, it is possible to prevent sparking due to a high voltage applied to a contact point at the time of the switch switching and increase a lifespan of the switch. Further, for example, semiconductor switches may be used for the switch 26-$n$ of FIG. 2, the switch 26-$n$ of FIG. 9, the selector 262$b$-$n$ of FIG. 14, and the switch 26-$n$ and the selectors Sa0 to Sa(B−1) of FIG. 19.

Further, the current control unit 26$b$-$n$ may connect the plurality of terminals S1 to SB and the coil 23-$n$ at the same time.

Further, in the current control unit 26$b$-$n$, control of the current may be performed using an element such as a transistor or an FET (Field Effect Transistor) in place of the capacitor. If these elements are used, the energy dissipation in the current control unit 26$b$-$n$ is negligible in comparison with the power supplied to the coil.

Further, in the embodiment described above, while the example in which one high frequency power supply 4$b$ is used has been shown, the number of power supplies may not be 1. In this case, it is preferable for the plurality of power supplies to be able to output the same current amount, but the present invention is not necessarily limited thereto.

In each embodiment described above, while the example in which the current amplitude control unit 15 in the parent device power transmission control unit 1 outputs the power to the parent device has been shown, the part which controls the amplitude of the power supply may be built in each parent device 2-$n$. In this case, the information indicating the current ratio determined by the current distribution determination unit 13 may be transmitted as a signal to each parent device 2-$n$ and the amplitude may be controlled in each parent device 2-$n$.

Further, in each embodiment described above, while the case in which the current to be supplied to the parent device 2-$n$ is controlled has been described, the present invention is not limited thereto and the voltage to be applied to the parent device 2-$n$ may be controlled.

Further, in the embodiment described above, the power input to the child device 3-$m$ is accumulated in the power storage battery 35 and supplied as DC power to the load, but AC power may be supplied to the load by further including a DC-AC converter.

Further, in each embodiment described above, the parent device 2-$n$ may include an antenna in place of the coil 23-$n$, and the child device 3-$m$ may include an antenna in place of the coil 31-$m$.

Further, the electrical signal used with each embodiment described above is a multi-bit control value or a control value of a continuous value rather than the signal for switching an on state and an off state.

Further, in the first to fifth embodiments, while the example in which the impedance matrix Z is used has been described, an admittance matrix, an inductance matrix or a capacitance matrix may be used in place of the impedance matrix Z.

Further, in the present invention, the magnetic field coupling is made by the resonance based on the inductance of the power transmission unit 28-$n$ included in each parent device (2-$n$, 2$b$-$n$, 20-$n$, or 2$a$-$n$) and the inductance of the power reception unit 39-*m* included in each child device (3-*m*, 30-*m*, 30*a*-*m*, or 3*a*-*m*).

Further, in the present invention, the capacitive coupling is made by the resonance based on the capacitance of the power transmission unit 28-*n* included in each parent device (2-*n*, 2*b*-*n*, 20-*n*, or 2*a*-*n*) and the capacitance of the power reception unit 39-*m* included in each child device (3-*m*, 30-*m*, 30*a*-*m*, or 3*a*-*m*).

Further, some of the parent device power transmission control units 1, 1*a*, and 1*b* in the respective embodiments described above may be realized by a computer. In this case, a program for realizing this control function may be recorded in a computer-readable recording medium, and the program recorded in this recording medium may be loaded and executed on a computer system for realization. Further, the "computer system" referred to herein is a computer system including the parent device power transmission control unit 1, 1*a* or 1*b* built therein and including hardware such as an OS or peripheral devices. Further, the "computer-readable recording medium" refers to a portable medium such as a flexible disk, a magnetic optical disc, a ROM, or a CD-ROM, or a storage device such as a hard disk embedded in a computer system. Further, the "computer-readable recording medium" also includes a recording medium that dynamically holds a program for a short period of time, such as a communication line when a program is transmitted via a network such as the Internet or a communication line such as telephone line, or a recording medium that holds a program for a predetermined time, such as a volatile memory inside a computer system including a server and a client in that case. Also, the above-described program may be a program for realizing some of the above-described functions. Alternatively, the program may be a program capable of realizing the above-described functions through a combination with a program previously recorded in a computer system.

Further, some or all the parent device power transmission control units 1, 1*a* and 1*b* in the embodiments described above may be realized as an integrated circuit such as an LSI (Large Scale Integration). Respective functional blocks of the parent device power transmission control units 1, 1*a*, and 1*b* may be individual processors or some or all of the functional blocks may be integrated as processors. Further, a scheme of realizing an integrated circuit is not limited to the LSI, and the units may be realized as dedicated circuits or general-purpose processors. Further, when an integrated circuit technology for replacing the LSI emerges due to the advance of semiconductor technology, an integrated circuit based on the technique may be used.

Further, in the respective embodiments described above, the same control can be performed by changing the impedance into admittance, the voltage into a current, and the current into a voltage.

REFERENCE SYMBOLS 1, 1*b* . . . Parent device power transmission control unit, 2-*n*, 2*b*-*n*, 20-*n*, 2*a*-*n* (n=1 to N) . . . Parent device, 3-*m*, 30-*m*, 30*a*-*m*, 3*a*-*m* (m=1 to M) . . . Child device, 4*b* . . . High frequency power supply, 11 . . . Complex voltage detection unit, 12 . . . Complex current detection unit, 13, 13*a*, 13*b* . . . Current distribution determination unit (distribution determination unit), 15, 15*b* . . . Current amplitude control unit, 16 . . . Storage unit, 17 . . . Control unit, 18, 18*b* . . . Selection table storage unit, 21-*n* . . . Power supply unit, 21*b*-*n* . . . Current reception unit, 22-*n* . . . Capacitor, 23-*n* . . . Coil, 24-*n* . . . Ammeter, 25-*n* . . . Voltmeter, 26-*n* . . . Switch, 26*b*-*n*, 26*c*-*n* . . . Current control unit, 27-*n* . . . Current direction switching unit, 28-*n* . . . Power transmission unit, 31-*m* . . . Coil, 32-*m*, 32*a*-*m*, 32*b*-*m* . . . Capacitor, 33-*m* . . . Switch, 34-*m* . . . Rectifier, 35-*m* . . . Power storage battery, 36-*m* . . . Voltmeter, 37-*m* . . . Load, 38-*m* . . . Switch control unit, 39-*m* . . . Power reception unit, 131, 131*a* . . . Energized parent device selection unit, 132 . . . Measured parent device selection unit, 133 . . . Voltage and current input unit, 134, 134*a* . . . Impedance matrix generation unit, 135 . . . Current vector generation unit, 136 . . . Initial current vector generation unit, 137 . . . Current vector generation unit, CB . . . Capacitor, 262*b*-*n*, Sa0 to SaB . . . Selector

The invention claimed is:

1. A contactless power transfer system comprising:
    N parent device power transmission units (N is an integer equal to or more than 2);
    at least one child device power reception unit; and
    a distribution determination unit configured to determine an electrical signal to be supplied to the N parent device power transmission units, wherein
    the electrical signal has a current, a voltage or a linear combination amount of the current and the voltage as a component,
    in case that an N-dimensional vector having the electrical signal to be supplied to each parent device power transmission unit as a component is X, the distribution determination unit is configured to set a matrix A as a regularized Hermitian matrix of N rows×N columns, and $$\tilde{X}^*AX \tag{1}$$

in case that a scalar of Equation (1) (~ denotes a transposed matrix and * denotes a complex conjugate) is non-negative, a quadratic form matrix of the electrical signal in case that the child device power reception unit functions is a matrix B which expresses dissipation of energy and which is Hermite of N rows×N columns having a coefficient thereof as a component, a scalar of Equation (2) expresses energy consumption, $$\tilde{X}^*BX \tag{2}$$

and the matrix A is expressed as shown in Equation (3), $$A=\tilde{C}^*C \tag{3}$$

the distribution determination unit is configured to determine the electrical signal to be proportional to a component of a vector $C^{-1}Y$ obtained by multiplying a linear combination of an eigenvector Y for a non-zero eigenvalue of a matrix D expressed by Equation (4) by the matrix $C^{-1}$ from the left $$D=\tilde{C}^{*-1}BC^{-1} \tag{4}.$$

2. The contactless power transfer system according to claim 1, wherein
    the matrix B is a matrix of a real part of an impedance matrix or a real part of an admittance matrix for a terminal of each parent device power transmission unit in case that the child device power reception unit functions, and
    the distribution determination unit is configured to determine the electrical signal to be supplied to the N parent device power transmission units based on a reference matrix which is a Hermitian matrix with definite positive values indicating a quadratic form of the electrical signal and the matrix B.

3. The contactless power transfer system according to claim 2, wherein
the distribution determination unit is configured to determine the electrical signal to be supplied to the N parent device power transmission units to be proportional to a component of the vector $C^{-1}Y$ calculated based on the eigenvector Y for a maximum eigenvalue of the matrix D or to be proportional to the component of the vector $C^{-1}Y$ calculated based on the eigenvector Y for a minimum eigenvalue of the matrix D.

4. The contactless power transfer system according to claim 1, wherein
the matrix A is a unit matrix.

5. The contactless power transfer system according to claim 1, wherein
the matrix A is a real part of the impedance matrix or a real part of the admittance matrix in case that there is no child device power reception unit.

6. The contactless power transfer system according to claim 1, wherein
the matrix A is one of an imaginary part of the impedance matrix, a real part of the capacitance matrix, and a real part of the inductance matrix of each parent device power transmission unit.

7. The contactless power transfer system according to claim 1, wherein
the scalar of Equation (1) of the quadratic form is a sum of energies of a field accumulated in a space of a specific area.

8. The contactless power transfer system according to claim 1, wherein
the distribution determination unit is configured to determine the electrical signal to be supplied to the N parent device power transmission units so that a current corresponding to a component having a maximum absolute value among components of the eigenvector is a current rating or so that a voltage corresponding to a component having a maximum absolute value among components of the eigenvector is a voltage rating.

9. The contactless power transfer system according to claim 2, wherein
the reference matrix is a real part of the impedance matrix or a real part of the admittance matrix in case that there is no child device power reception unit or a real part of the inductance matrix between the N parent device power transmission units, or an imaginary part of the impedance matrix between the parent device power transmission units or an imaginary part of the admittance matrix between the parent device power transmission units is a Hermitian coefficient matrix in case that energy induced to a specific area in a space is expressed in a quadratic form of the electrical signal.

10. The contactless power transfer system according to claim 1, wherein
the vector Y in the distribution determination unit determines the electrical signal to be supplied to the N parent device power transmission units to converge on the eigenvector of the matrix D.

11. The contactless power transfer system according to claim 1, wherein
the child device power reception unit has a power reception refusal mode to limit power transfer from the N parent device power transmission units.

12. The contactless power transfer system according to claim 1, wherein
the contactless power transfer system comprises a control unit configured to limit the supplied electrical signal and output a resultant electrical signal to the parent device power transmission unit.

13. The contactless power transfer system according to claim 12, wherein
the control unit is configured to limit the electrical signal using an element whose energy dissipation is negligible in comparison with the energy of the electrical signal.

14. The contactless power transfer system according to claim 1, wherein
the parent device power transmission unit comprises a power transmission unit,
the child device power reception unit comprises a power reception unit,
each of the power transmission unit and the power reception unit comprises an inductor, and
magnetic field coupling is made by resonance based on the inductor of the power transmission unit and the inductor of the power reception unit.

15. The contactless power transfer system according to claim 1, wherein
the parent device power transmission unit comprises a power transmission unit,
the child device power reception unit comprises a power reception unit,
each of the power transmission unit and the power reception unit comprises a capacitor, and
capacitive coupling is made by resonance based on the capacitor of the power transmission unit and the capacitor of the power reception unit.

16. The contactless power transfer system according to claim 12, wherein
the control unit comprises a plurality of capacitors and a plurality of switching units,
the plurality of capacitors comprises one terminals connected to one another, and other terminals connected to input terminals of the respective switching units,
output terminals of the plurality of switching units are connected to one another, and a connection point thereof is connected to a coil, and
the distribution determination unit is configured to determine distribution of the electrical signal to be supplied to the N parent device power transmission units, based on information indicating a voltage applied to the coil in case that the switching units are sequentially switched and information indicating a current flowing through the capacitor.

17. The contactless power transfer system according to claim 12, wherein
the control unit comprises:
a plurality of capacitors; and
a plurality of switching units each comprising first to third ports and comprising a port switching switch configured to switch a connection between the first or second port with the third port among first to third ports,
in the plurality of switching units, the first ports are connected to one another, a first connection point thereof is connected to a power supply unit, the second ports are connected to one another, each second port is grounded, and the third port is connected to one terminal of one of the plurality of capacitors,
in the plurality of capacitors, the other terminals are connected to one another, and a second connection point thereof is connected to a coil, and
the switching unit is configured to determine distribution of the electrical signal to be supplied to the N parent device power transmission units based on information indicating a current flowing through the second connection point in case that the switching units are sequentially switched and information indicating a voltage applied to a coil.

18. The contactless power transfer system according to claim 1, wherein
the electrical signal is supplied from a smaller number of power supplies than the number of parent device power transmission units.

19. A contactless power transfer system comprising:
N parent device power transmission units (N is an integer equal to or more than 2);
at least one child device power reception unit; and
a distribution determination unit configured to determine an electrical signal to be supplied to the N parent device power transmission units, wherein
the electrical signal has a current, a voltage or a linear combination amount of the current and the voltage as a component, and
the distribution determination unit is configured to determine the electrical signal to be supplied to the N parent device power transmission units to be proportional to a component of an eigenvalue vector for a non-zero eigenvalue of a matrix B of a real part of an impedance matrix or a real part of an admittance matrix in case that there is a child device power reception unit.

20. A contactless power transfer device comprising:
N parent device power transmission units (N is an integer equal to or more than 2);
at least one child device power reception unit; and
a distribution determination unit configured to determine an electrical signal to be supplied to the N parent device power transmission units, wherein
the electrical signal has a current, a voltage or a linear combination amount of the current and the voltage as a component,
in case that an N-dimensional vector of N rows×1 column having the electrical signal to be supplied to each parent device power transmission unit as a component is X, the distribution determination unit is configured to set a matrix A as a regularized Hermitian matrix of N rows×N columns, and $$\tilde{X}^*AX \qquad (5)$$

in case that a scalar of Equation (5) (~ denotes a transposed matrix and * denotes a complex conjugate) is non-negative, a quadratic form matrix of the electrical signal in case that the child device power reception unit functions is a matrix B which expresses dissipation of energy and which is Hermite of N rows×N columns having a coefficient thereof as a component, a scalar of Equation (6) expresses energy consumption, $$\tilde{X}^*BX \qquad (6)$$

and the matrix A is expressed as shown in Equation (7), $$A=\tilde{C}^*C \qquad (7)$$

the distribution determination unit is configured to determine the electrical signal to be proportional to a component of a vector $C^{-1}Y$ obtained by multiplying a linear combination of an eigenvector Y for a non-zero eigenvalue of a matrix D expressed by Equation (8) by the matrix $C^{-1}$ from the left $$D=\tilde{C}^{*-1}BC^{-1} \qquad (8).$$

21. A contactless power transfer device comprising:
N parent device power transmission units (N is an integer equal to or more than 2);
at least one child device power reception unit; and
a distribution determination unit which configured to determine an electrical signal to be supplied to the N parent device power transmission units, wherein
the electrical signal has a current, a voltage or a linear combination amount of the current and the voltage as a component, and
the distribution determination unit is configured to determine the electrical signal to be supplied to the N parent device power transmission units to be proportional to a component of an eigenvalue vector for a non-zero eigenvalue of a matrix B of a real part of an impedance matrix or a real part of an admittance matrix in case that there is a child device power reception unit.

22. A non-transitory computer-readable recording medium storing a contactless power transfer program for causing a computer of a contactless power transfer device of a contactless power transfer system in which an electrical signal has a current, a voltage or a linear combination amount of the current and the voltage as a component and which comprises N parent device power transmission units (N is an integer equal to or more than 2), at least one child device power reception unit, and a distribution determination unit which determines the electrical signal to be supplied to the N parent device power transmission units to execute a procedure in which:
in case that an N-dimensional vector of N rows×1 column having the electrical signal to be supplied to each parent device power transmission unit as a component is X, the distribution determination unit sets a matrix A as a regularized Hermitian matrix of N rows×N columns, and $$\tilde{X}^*AX \qquad (9)$$

in case that a scalar of Equation (9) (~ denotes a transposed matrix and * denotes a complex conjugate) is non-negative, a quadratic form matrix of the electrical signal in case that the child device power reception unit functions is a matrix B which expresses dissipation of energy and which is Hermite of N rows×N columns having a coefficient thereof as a component, a scalar of Equation (10) expresses energy consumption, $$\tilde{X}^*BX \qquad (10)$$

and the matrix A is expressed as shown in Equation (11), $$A=\tilde{C}^*C \qquad (11)$$

the distribution determination unit determines the electrical signal to be proportional to a component of a vector $C^{-1}Y$ obtained by multiplying a linear combination of an eigenvector Y for a non-zero eigenvalue of a matrix D expressed by Equation (12) by the matrix $C^{-1}$ from the left $$D=\tilde{C}^{*-1}BC^{-1} \qquad (12).$$

23. A non-transitory computer-readable recording medium storing a contactless power transfer program for causing a computer of a contactless power transfer device of a contactless power transfer system in which an electrical signal has a current, a voltage or a linear combination amount of the current and the voltage as a component, and which comprises N parent device power transmission units (N is an integer equal to or more than 2), at least one child device power reception unit, and a distribution determination unit which determines an electrical signal to be supplied to the N parent device power transmission units to execute a procedure in which:

the distribution determination unit determines the electrical signal to be supplied to the N parent device power transmission units to be proportional to a component of an eigenvalue vector for a non-zero eigenvalue of a matrix B of a real part of an impedance matrix or a real part of an admittance matrix in case that there is a child device power reception unit.

24. A contactless power transfer method in a contactless power transfer device of a contactless power transfer system in which an electrical signal has a current, a voltage or a linear combination amount of the current and the voltage as a component and which comprises N parent device power transmission units (N is an integer equal to or more than 2), at least one child device power reception unit, and a distribution determination unit which determines an electrical signal to be supplied to the N parent device power transmission units, the contactless power transfer method comprising:

a procedure in which, in case that an N-dimensional vector of N rows×1 column having the electrical signal to be supplied to each parent device power transmission unit as a component is X, the distribution determination unit sets a matrix A as a regularized Hermitian matrix of N rows×N columns, and $$\tilde{X}^*AX \qquad (13)$$

in case that a scalar of Equation (13) (~ denotes a transposed matrix and * denotes a complex conjugate) is non-negative, a quadratic form matrix of the electrical signal in case that the child device power reception unit functions is a matrix B which expresses dissipation of energy and which is Hermite of N rows×N columns having a coefficient thereof as a component, a scalar of Equation (14) expresses energy consumption, $$\tilde{X}^*BX \qquad (14)$$

and the matrix A is expressed as shown in Equation (15), $$A=\tilde{C}^*C \qquad (15)$$

the distribution determination unit determines the electrical signal to be proportional to a component of a vector $C^{-1}Y$ obtained by multiplying a linear combination of an eigenvector Y for a non-zero eigenvalue of a matrix D expressed by Equation (16) by the matrix $C^{-1}$ from the left.

$$D=\tilde{C}^{*-1}BC^{-1} \qquad (16).$$

25. A contactless power transfer method in a contactless power transfer device of a contactless power transfer system in which an electrical signal has a current, a voltage or a linear combination amount of the current and the voltage as a component and which comprises N parent device power transmission units (N is an integer equal to or more than 2), at least one child device power reception unit, and a distribution determination unit which determines the electrical signal to be supplied to the N parent device power transmission units, the contactless power transfer method comprising:

a procedure in which the distribution determination unit determines the electrical signal to be supplied to the N parent device power transmission units to be proportional to a component of an eigenvalue vector for a non-zero eigenvalue of a matrix B of a real part of an impedance matrix or a real part of an admittance matrix in case that there is a child device power reception unit.

\* \* \* \* \*